(12) United States Patent
Sinclair

(10) Patent No.: US 7,204,455 B2
(45) Date of Patent: Apr. 17, 2007

(54) MOTION ASSISTING APPARATUS

(76) Inventor: Peter Logan Sinclair, 133 Fort Road, London (GB) SE1 5PZ ( * ) Notice: Subject to any disclaimer, the term of this patent is extended or adjusted under 35 U.S.C. 154(b) by 168 days.

(21) Appl. No.: 10/481,944

(22) PCT Filed: Jun. 28, 2002

(86) PCT No.: PCT/GB02/02976

§ 371 (c)(1),
(2), (4) Date: Dec. 23, 2003

(87) PCT Pub. No.: WO03/004122

PCT Pub. Date: Jan. 16, 2003

(65) Prior Publication Data

US 2004/0195436 A1    Oct. 7, 2004

(30) Foreign Application Priority Data

| Jun. 30, 2001 | (GB) | 0116106.6 |
| Nov. 12, 2001 | (GB) | 0127134.5 |
| Jan. 24, 2002 | (GB) | 0201625.1 |
| May 3, 2002 | (GB) | 0210231.7 |

(51) Int. Cl.
*B64C 33/02* (2006.01)

(52) U.S. Cl. .................................. 244/72

(58) Field of Classification Search .............. None
See application file for complete search history.

(56) References Cited

U.S. PATENT DOCUMENTS

| 1,135,638 | A | * | 4/1915 | Vorndran | 244/22 |
| 1,884,909 | A | * | 10/1932 | Strobell | 244/22 |
| 4,031,657 | A | * | 6/1977 | Crosman et al. | 446/333 |
| 4,139,171 | A | * | 2/1979 | Harris | 244/22 |
| 4,155,195 | A | * | 5/1979 | Leigh-Hunt | 446/35 |
| 4,605,382 | A | * | 8/1986 | Cook et al. | 446/330 |
| 4,749,149 | A | * | 6/1988 | Gruich | 244/22 |
| 4,793,573 | A | * | 12/1988 | Kelfer | 244/11 |
| 5,320,310 | A | * | 6/1994 | Mitchell | 244/219 |
| 5,458,523 | A | * | 10/1995 | Aoki et al. | 446/246 |
| 5,899,408 | A | * | 5/1999 | Bowers, Jr. | 244/11 |
| 5,915,650 | A | * | 6/1999 | Petrovich | 244/46 |
| 6,012,962 | A | * | 1/2000 | Arriola | 446/376 |
| 6,082,671 | A | * | 7/2000 | Michelson | 244/72 |

(Continued)

FOREIGN PATENT DOCUMENTS

DE          251310     * 10/1912

(Continued)

*Primary Examiner*—J. Woodrow Eldred
*Assistant Examiner*—John A Radi
(74) *Attorney, Agent, or Firm*—Anthony R. Barkume, P.C.

(57) ABSTRACT

A drive assembly for use with a mechanical flying or walking device comprises an articulated member (7) having first and second portions (7a, 7b) arranged such that the portions move relative to each other, and a drive mechanism (9) for imparting motion to the articulated member. The drive mechanism (9) comprises: a drive member for imparting a cyclic motion on the articulated member, and a control member for controlling, in a predetermined manner, the relative position of the first and second portions during each cycle of the cyclic motion of the articulated member. In the case of a mechanical flying device, two such drive assemblies may be provided, the articulated member of each assembly forming a wing.

22 Claims, 35 Drawing Sheets

U.S. PATENT DOCUMENTS

| | | | |
|---|---|---|---|
| 6,206,324 B1 * | 3/2001 | Smith | 244/72 |
| 6,227,483 B1 * | 5/2001 | Therriault | 244/20 |
| 6,565,039 B2 * | 5/2003 | Smith | 244/72 |
| 6,568,634 B2 * | 5/2003 | Smith | 244/72 |
| 6,783,097 B1 * | 8/2004 | Smith | 244/72 |
| 6,840,476 B1 * | 1/2005 | Raney | 244/11 |
| 6,938,853 B2 * | 9/2005 | Pines et al. | 244/11 |
| 2001/0019088 A1 * | 9/2001 | Smith | 244/17.13 |
| 2004/0056149 A1 * | 3/2004 | Pines et al. | 244/11 |

FOREIGN PATENT DOCUMENTS

| | | | |
|---|---|---|---|
| DE | 937143 | * | 1/1956 |
| GB | 1585715 | * | 3/1981 |

* cited by examiner

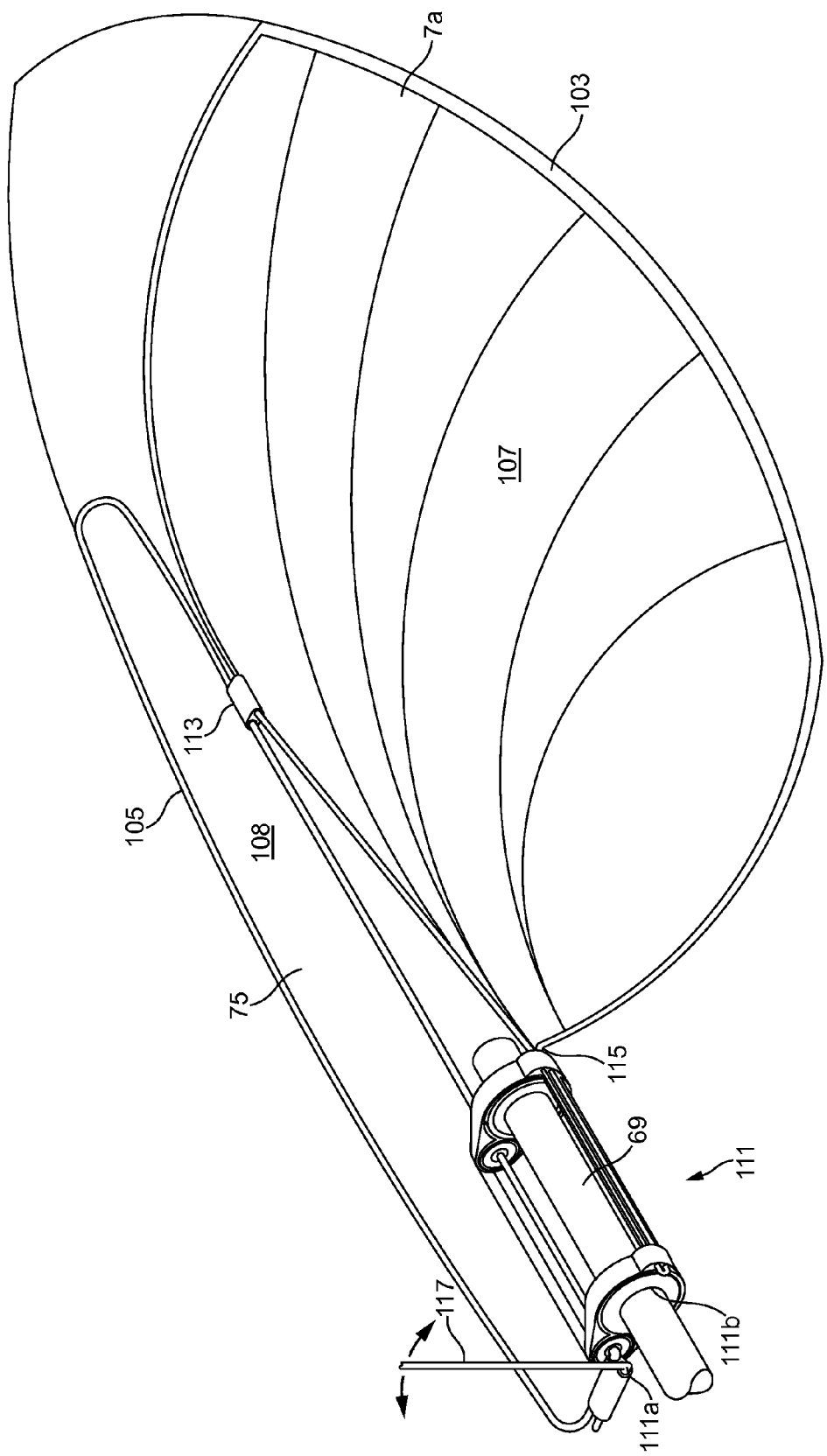

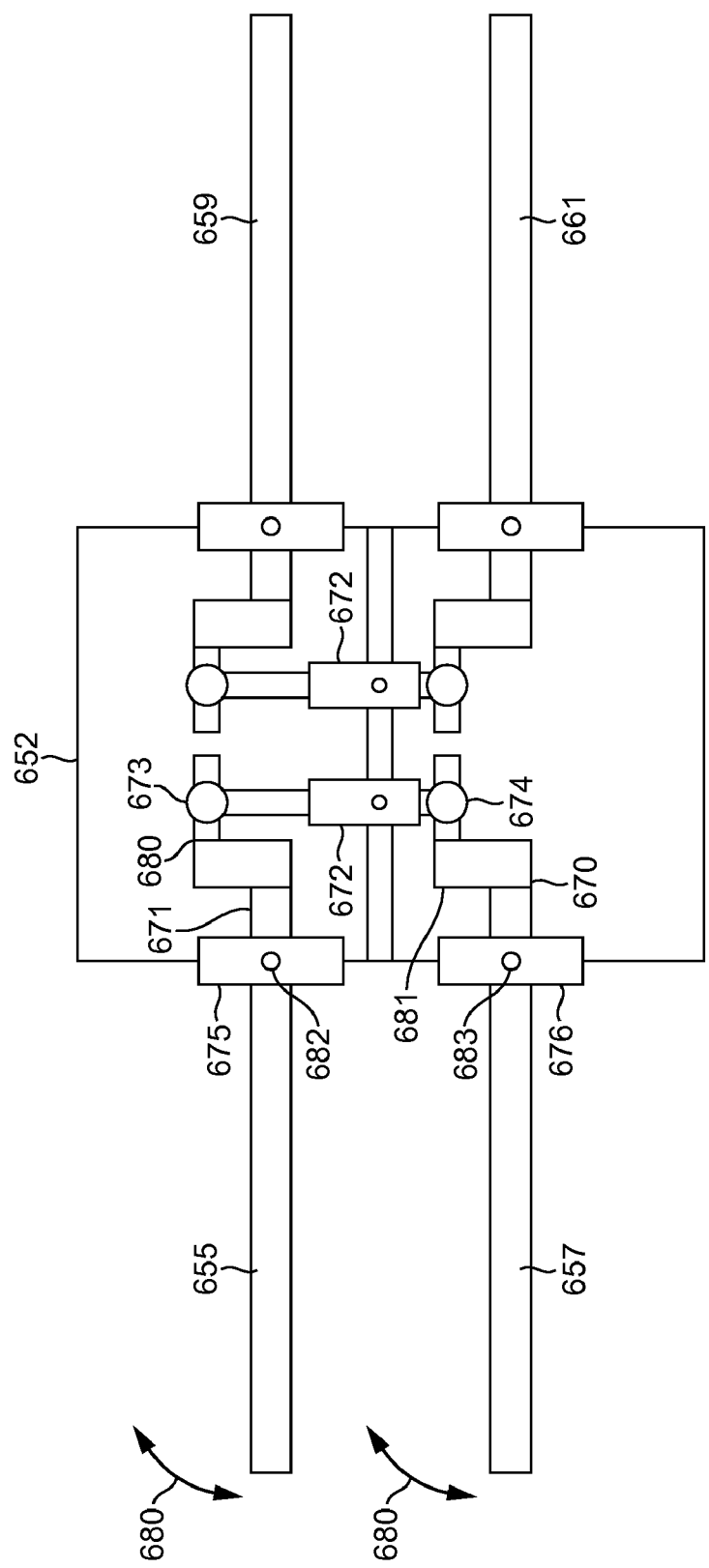

MOTION ASSISTING APPARATUS

This invention relates to motion assisting apparatus. The invention also relates to a drive assembly for a motion assisting apparatus.

It is desirable to provide an apparatus or mechanism which acts to impart motion on a object to which the apparatus or mechanism is attached. For example, a toy car having a number of wheels will include a mechanism which causes the wheels to turn when a battery-powered motor is operated. Aeroplanes and helicopters are examples of objects which have mechanisms arranged to enable the object to lift-off from the ground.

Such mechanisms can be bulky or mechanically complex in nature, which can be particularly disadvantageous where the object is of a fairly small form, e.g. a model or toy. Providing a simplified mechanism may be advantageous where it is desirable to reduce the size of the mechanism, or its cost.

It has also been known to provide small-scale flying devices which can be controlled such that they can perform a range of manoeuvres, including at least forwards movement whilst the device is in the air.

According to a first aspect of the invention, there is provided a drive assembly comprising an articulated member having first and second portions arranged such that the portions move relative to each other, and a drive mechanism for imparting motion to the articulated member, the drive mechanism comprising: a drive member for imparting a cyclic motion on the articulated member; and a control member for controlling, in a predetermined manner, the relative position of the first and second portions during each cycle of the cyclic motion of the articulated member.

Such an assembly, having an articulated member with first and second portions, can be arranged to assist movement of an object or article to which the assembly is attached. The articulated member is moved in a cyclic motion, and, at the same time, the control member controls the relative position of the first and second portions of the articulated member during the cycle. Such an assembly can impart advantageous and efficient motion on, for example, an object which may be required to fly, or simply to move along some surface. The assembly is simple and can be made very small.

The drive mechanism can be arranged such that, during each cycle of the articulated member, the control member operates on the articulated member in two phases, the control member moving in a first direction during the first phase, and in a second, generally opposite direction, during the second phase. The drive mechanism may further comprise an elastic member arranged such that, during the first phase of operation of the control member, the elastic member becomes tensioned due to the motion of the control member, the elastic member thereafter causing the control member to return in the generally opposite direction at the beginning of the second phase of operation of the control member. The elastic member can be, for example, a coil spring. This provides for a sudden or transient return-motion of the control member in the second phase. Such a return motion can be utilised to add an extra impetus to the motion imparted.

The drive mechanism may be arranged such that, during the first phase of operation of the control member, the drive member is engaged with the control member such that the drive member moves in generally the same direction as the control member. The drive mechanism may further be arranged such that, at the beginning of the second phase of operation of the control member, the control member becomes disengaged from the drive member and thereby returns in the second, generally opposite, direction.

Preferably, the drive mechanism is arranged such that the drive member follows a generally rotary, preferably circular cyclic motion. Alternatively, the drive mechanism can be arranged such that the drive member follows a generally linear cyclic motion, for example, a reciprocating forwards-backwards motion.

The drive member may be engaged with the first portion of the articulated member. The drive member may be movably engaged with the first portion of the articulated member such that the first portion can move about the axis of the drive arm in a predetermined manner during each cycle of the cyclic motion of the drive member.

In a preferred embodiment, the articulated member forms an articulated wing, the first and second portions each comprising a frame within which is defined a web, whereby the apparatus is arranged to provide lift. Each web comprises a lightweight plastics material which is secured to the frame.

As an alternative to the wing arrangement, the articulated member may form an articulated leg, the first and second portions moving relative to each other so as to impart movement of the apparatus over any surface in contact with the leg.

As briefly mentioned above, a preferred form of moveable device is a flying device which can comprise first and second apparatus including articulated members each forming an articulated wing.

According to a second aspect of the invention, there is provided a drive assembly comprising: an articulated member having first and second portions arranged such that the portions move relative to each other, and a drive mechanism for imparting motion on the articulated member, the drive mechanism comprising (a) drive means for imparting a cyclic motion on the articulated member, each cycle comprising four phases, and (b) return means, wherein the articulated member, the drive means and the return means are arranged such that: in the first phase of movement, the drive means imparts a cyclic motion on the articulated member, in a first sense, whilst the first and second portions of the articulated member are maintained substantially in a first orientation with respect to each other; in the second phase of movement, the drive means engages and moves the return means, in the first sense, against a resisting force of the return means; in the third phase of movement, the drive means disengages the return means which, due to the resisting force, returns to its previous state, thereby causing (a) the articulated member to be moved in a contrary sense, and (b) the first and second portions of the articulated member to be arranged substantially in a second orientation with respect to each other; and in the fourth phase of movement, the cyclic motion returns the first and second portions of the articulated member back to the first orientation.

The return means may comprise a moveable abutment surface attached to an elastic member fixed to a non-moving part of the assembly, the drive means engaging and moving the abutment surface during the second phase of movement thereby to cause the elastic member to become tensioned, the elastic member thereafter returning the abutment surface back to its original position when the drive means is disengaged from the abutment surface.

The return means may further comprise a universal joint, and the second portion of the articulated member comprises a spar extending from the second portion and having a free end which is slidably located in the universal joint.

The drive means may comprise a longitudinal arm defining an arm axis, the articulated member being attached to the arm by means of a sleeved portion such that the articulated member may rotate about the arm axis during each cycle.

The sleeved portion attachment between the articulated member and the arm may be further arranged such that the articulated member may slidably move along the arm axis during each cycle. The drive means can further comprise a cam arranged to engage and move the abutment surface during the second phase of movement.

In one embodiment, the articulated member comprises an articulated wing, the first and second portions each comprising a frame within which is defined a web, whereby the assembly is arranged to provide lift.

In another embodiment, the articulated member comprises an articulated leg assembly, the first and second portions moving relative to each other so as to impart movement of the assembly over a surface in contact with the leg.

A flying device may be provided which comprises two assemblies as described above, each assembly being mounted substantially symmetrically about a longitudinal axis of the device. The flying device may comprise a motor for driving the two drive means; and a control system for controlling the speed of the motor. The generally opposite articulated wings may be arranged such that their orientation with respect to each other can be varied under the control of the control system.

Preferably, the control system is operated by means of a remote wireless link.

In a third aspect of the present invention, there is provided a flying device, comprising: first and second articulated wings each having first and second portions arranged such that the portions move relative to each other; and first and second drive mechanisms for imparting motion on each respective articulated wing, each drive mechanism comprising (a) a drive means for imparting a cyclic motion on the wing, each cycle comprising four phases, and (b) a return means, wherein the drive means and the return means are arranged such that: in the first phase of movement, the drive means imparts a cyclic motion on the articulated wing, in a first sense, whilst the first and second portions of the articulated wing are maintained substantially in a first orientation with respect to each other; in the second phase of movement, the drive means engages and moves the return means, in the first sense, against a resisting force of the return means; in the third phase of movement, the drive means disengages the return means which, due to the resisting force, returns to its previous state, thereby causing (a) the articulated wing to be moved in a contrary sense, and (b) the first and second portions of the articulated wing to be arranged substantially in a second orientation with respect to each other; and in the fourth phase of movement, the cyclic motion returns the first and second portions of the articulated wing back to the first orientation.

The four phases described need not necessarily be discrete. For example, the first and second phases may be continuous.

Inspiration for such a drive assembly and a flying device utilising a plurality of such drive assemblies comes from the period of time when the amount of oxygen in the air was approximately three times the amount of oxygen present today, and when insects were large, such as the size of a large dog. As with present day insects, these larger insects were able to take off vertically and hover in mid air for extended periods. Observations of different insects in flight provided the inspiration for the present invention.

It has been possible to produce a dove-sized controllable insect wing mechanism that can enable a flying device (which utilises a plurality of these mechanisms) to take off vertically, fly forwards, backwards, turn in mid air, and land. The mechanism is able to reproduce a defined wing-beat pattern of over twenty beats per second. A twelve volt tethered power supply can be used, although it is preferred that the power supply be fitted to a body of the flying device.

The size and shape of wings used with the wing mechanisms has a direct bearing on the wing speed. If sufficient speed is achieved, a pair of wings having an A4 size surface area may be used to lift a man from the ground. The wing membrane can comprise any lightweight flexible material such as polythene, the material simply being glued in place, trimmed, and the ends folded around wing frame portions, e.g. made from carbon fibre rods.

The drive assembly can be controllably operated using a four channel radio control. In order to cause the flying device to take off vertically, power is applied. A control stick may be provided on a control such that the control stick is (i) moved forwards to cause forwards movement, (ii) released to keep the flying device static in mid air, and (iii) moved left or right to rotate the flying device.

The drive assembly can be made from light and strong materials, such as a composite material. The flying device, including drive assembly, can be made as small as an insect, such as a wasp, or large enough to lift a man from the ground. The drive assembly could be driven by a motor or a glow plug engine with extended drive shafts acting as wing shafts, and so eliminating the need for a gear assembly.

An adjustable and deflected angle of rotation can be provided by adding a universal joint on each wing shaft, between the motor/engine and the wing mechanism. This would allow the wing mechanism to be fixed in position, and operated above, below, or to the rear of a central point of rotation. The wing mechanism could be arranged to mimic the movement of any flying insect, from a Damselfly to a Goliath Beetle, or a Humming Bird.

Since the operation of the wing mechanism can be made to mimic nature closely, and since an insect wing is, in fact, a modified insect leg, the drive mechanism can be easily modified to take a leg mechanism instead of a wing mechanism. As will be explained below, a plurality of leg mechanisms can be provided that share a common transmission system, for example, via a multilink worm drive or gearbox.

With the articulated wings described above, the leading edge of the (active) wing can move independently of the trailing half of the wing, thus producing a positive aerofoil shape on the upstroke movement of the wing, and a reverse aerofoil shape on the return "flip" stroke. The angle of the camber can be controlled by the position of the wing on the wing shaft. The design and construction of the wing mechanism and wing assembly can be used as a template to produce any type of insect or bird wing.

With a flying device or personal transport system, multiple wing arrangement can be used, e.g. using four, six or even greater numbers of wing assemblies driven from one or more motors or engines.

As mentioned above, as an alternative to a flying device, a walking device can be provided.

Accordingly, there may be provided a leg drive assembly comprising: an articulated leg comprising first and second portions arranged to move relative to each other; and a leg drive mechanism comprising a drive member which imparts a cyclic motion on the leg member, and a control member for controlling, in a predetermined manner, the relative positions of the first and second portions during each cycle of the cyclic motion of the articulated leg.

As with the wing assembly mentioned above, such a leg drive assembly, having an articulated member with first and second portions, can be arranged to assist movement of an object or article to which the assembly is attached, for example a walking robot device. The articulated leg is moved in a cyclic motion, and, at the same time, the control member controls the relative position of the first and second portions of the articulated leg during the cycle. This has the effect of defining a walking gait which can be modified or tuned to provide efficient movement of an object to which the articulated leg is attached. The assembly can be made simple and very small.

There is also provided a walking device having a plurality of leg drive assemblies, each comprising: an articulated leg comprising first and second portions arranged to move relative to each other; and a leg drive mechanism comprising a drive member which imparts a cyclic motion on the leg member, and a control member for controlling, in a predetermined manner, the relative positions of the first and second portions during each cycle of the cyclic motion of the articulated leg.

The walking device may further include a body to which each leg drive assembly is attached. The body may comprise a plurality of drive portions within which each leg drive assembly is mounted, it being possible to mount two leg assemblies within a single drive portion. Adjacent drive portions may be interconnected by one or more generally longitudinal shafts. In effect, the body may be segmented so as to aid a turning motion of the walking device. For example, one or more servo mechanisms may be fitted to the body so as to cause movement of one segmented portion relative to another. As with the flying device mentioned above, the walking device can be controlled remotely provided a remote receiver is arranged on the device.

The body can be made up of a plurality of detachable body portions. Each body portion may carry one or more leg drive assemblies. In certain circumstances, it may be desirable to detach a body portion, e.g. the rearmost body portion, from the remainder of the body. For example, a walking device may be employed to travel across dangerous terrain, such as a minefield. A camera may be provided on the body of the device to enable personnel to remotely inspect suspect areas located nearby to the device. In the event that a suspected landmine is identified, a body portion can be detached in accordance with a remote control signal. The detached body portion may detonate the landmine as a result of landing on an active part of the mine, or preferably, the body portion will include a small explosive charge that is detonated in accordance with a further remote control signal, the resultant explosion disarming the landmine.

The invention will now be described, by way of example, with reference to the accompanying drawings, in which:

FIG. 6 is a perspective view of a wing of the flying device; and

Figure 9:
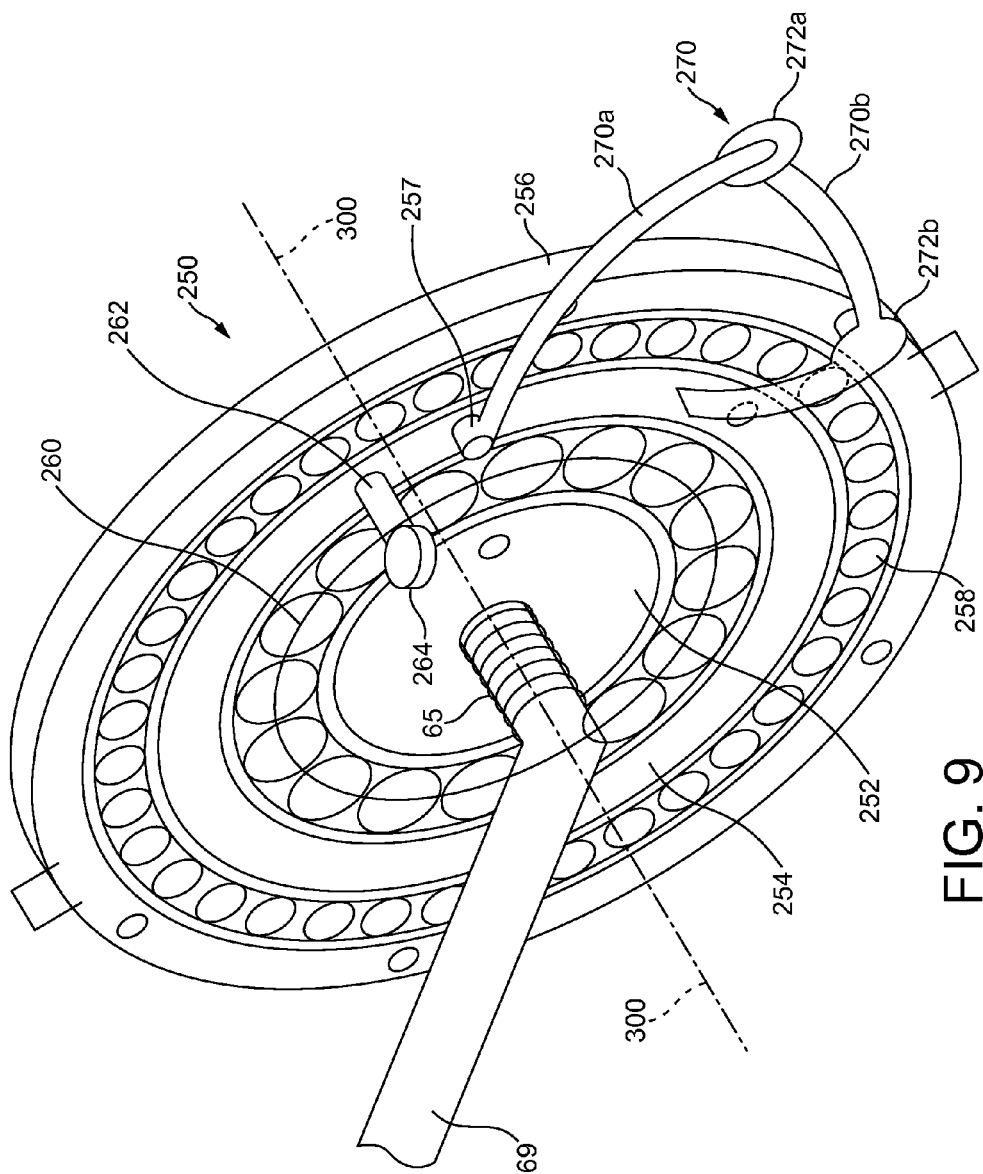
FIG. 9 is a perspective, close-up view of a further wing drive mechanism of the flying device.
Figure 12:
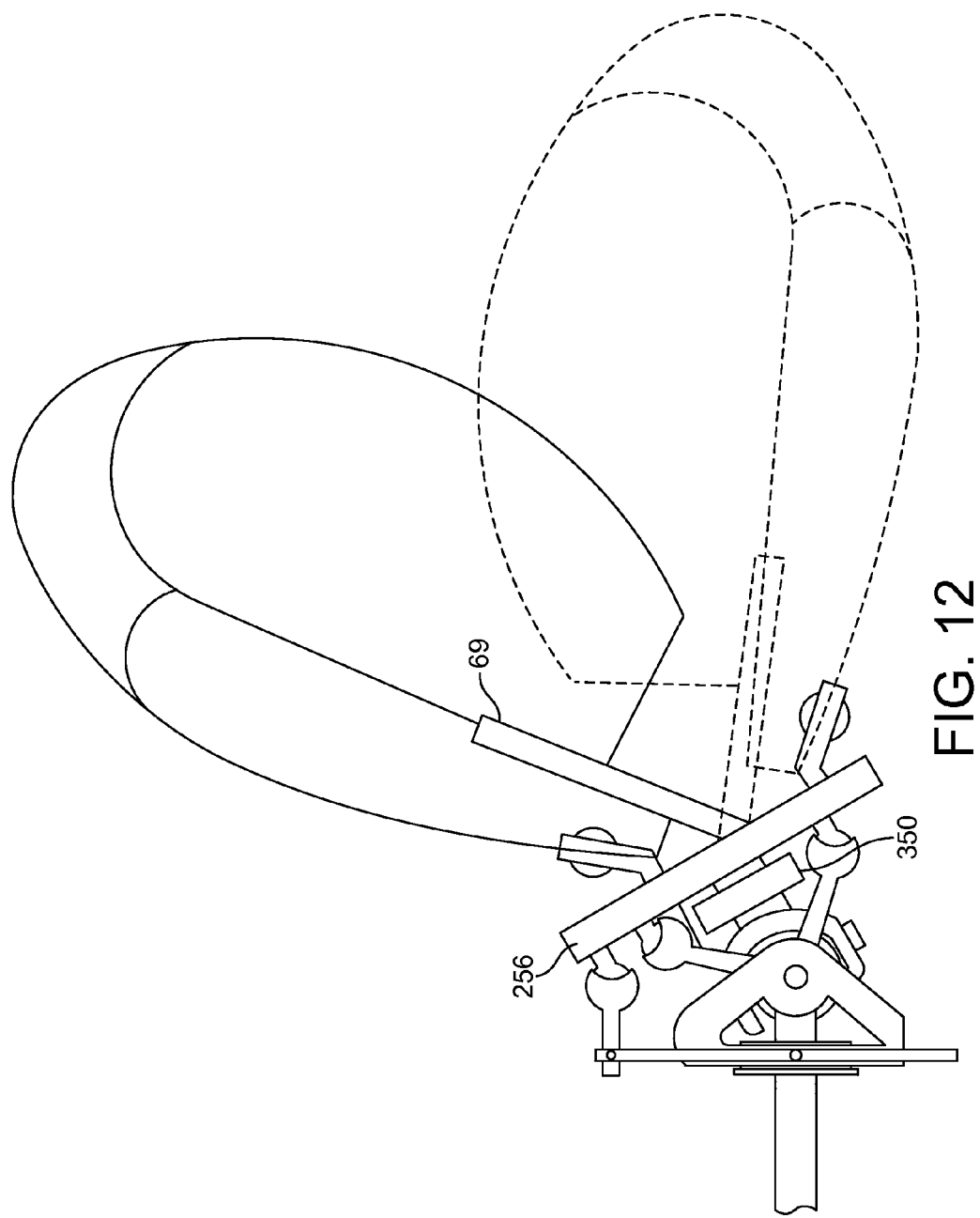
Figure 13:
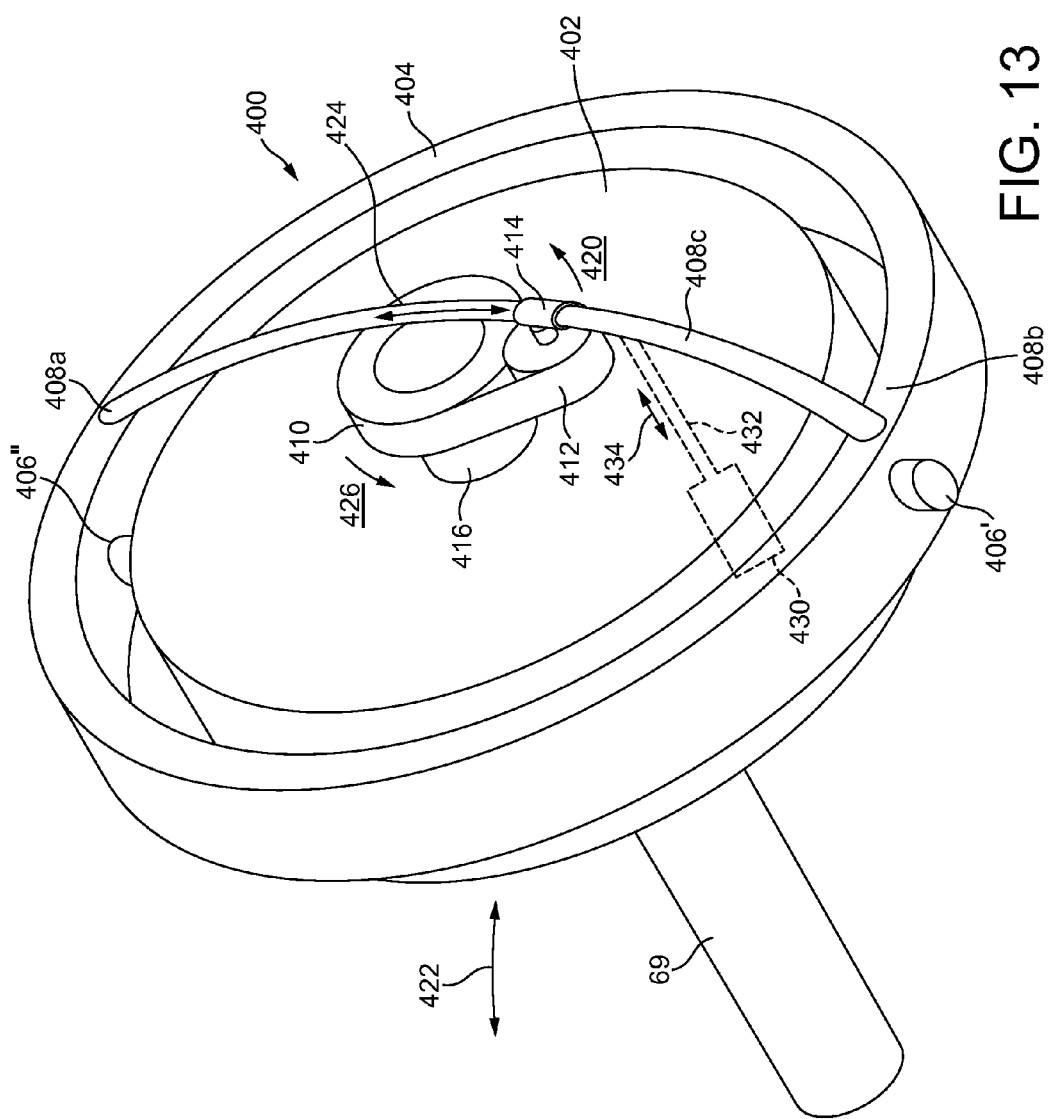
Figure 14:
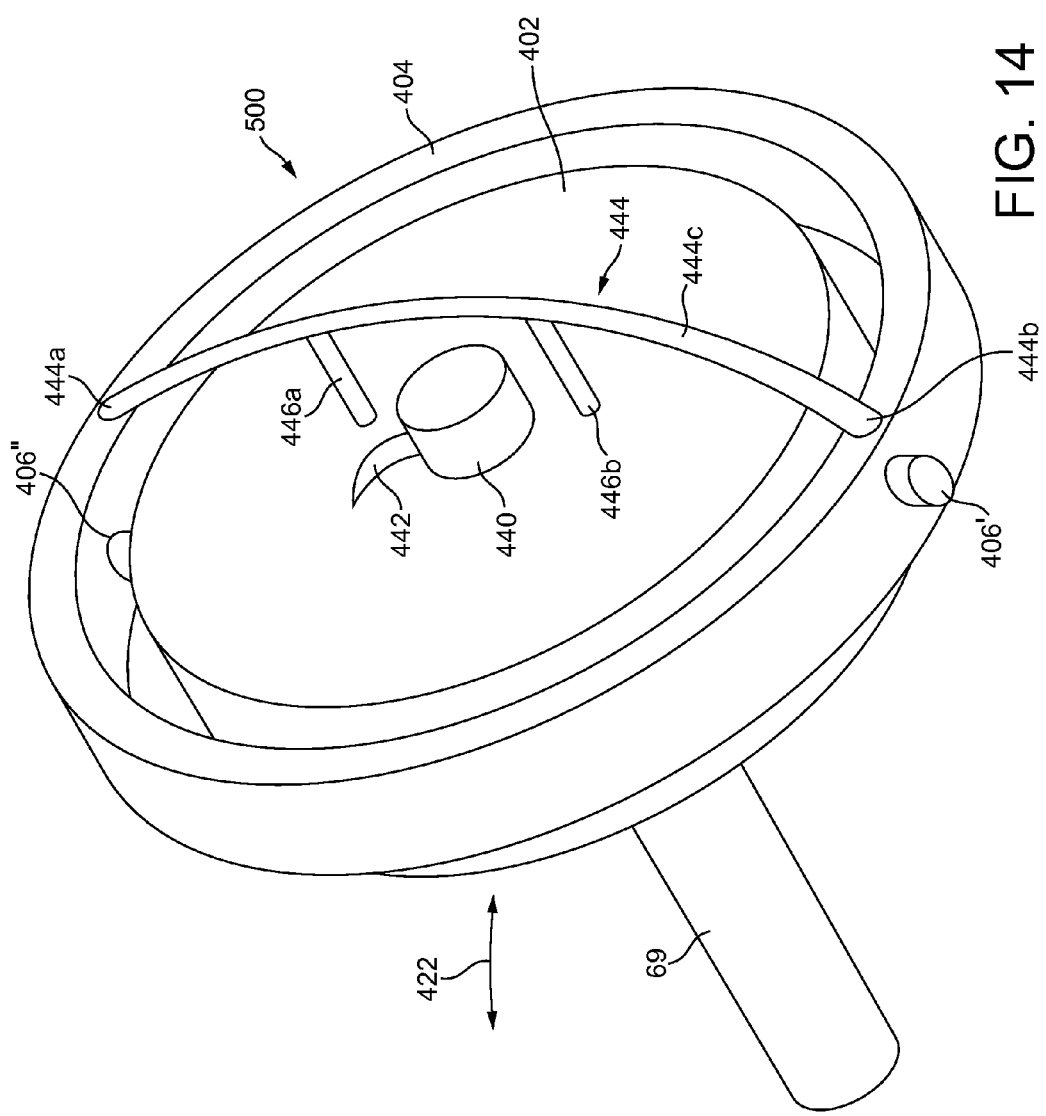
Figure 15:
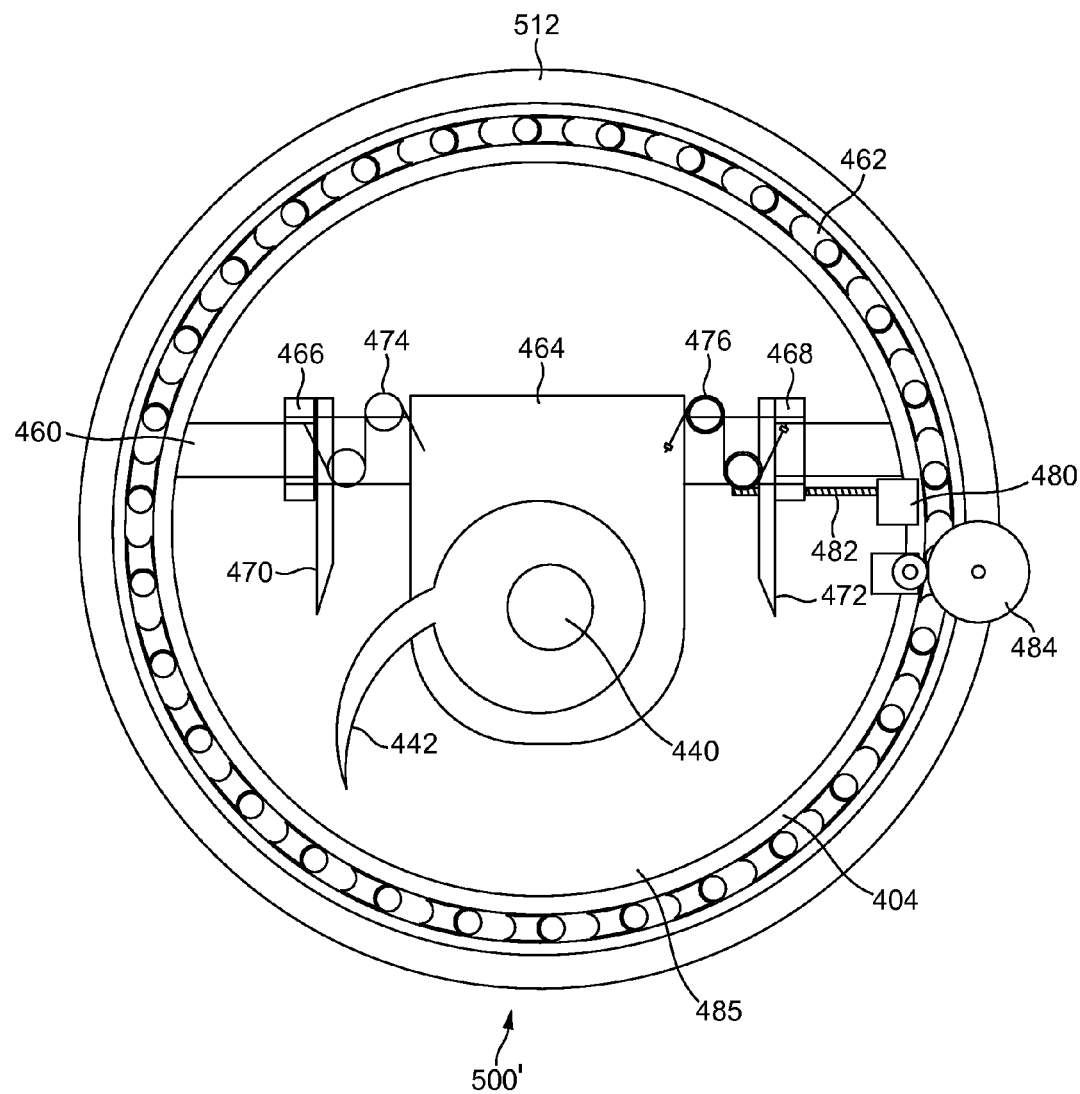
Figure 16A:
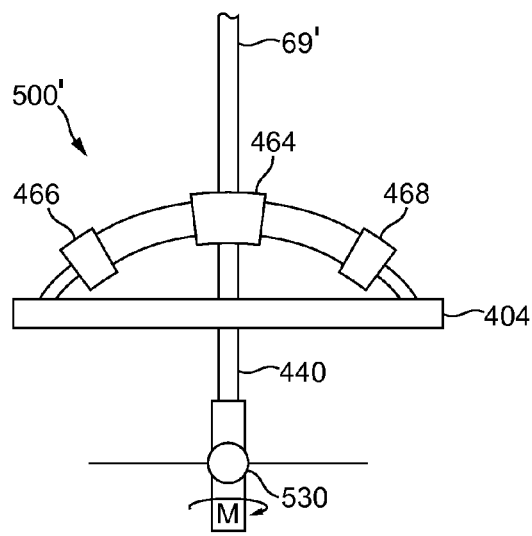
Figure 16B:
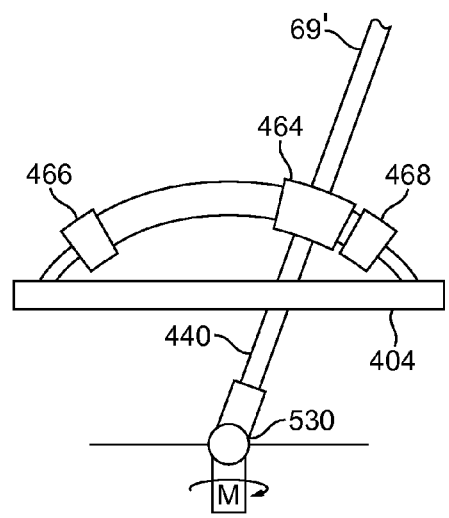
Figure 16C:
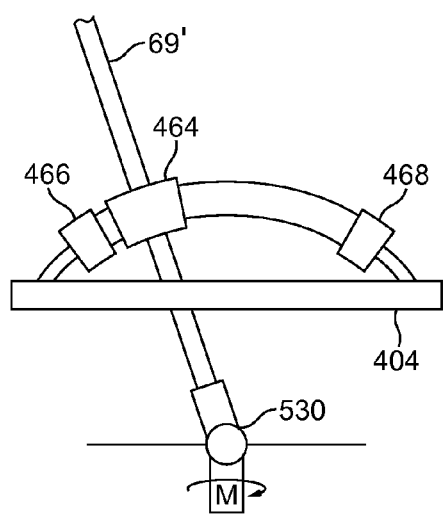
Figure 17:
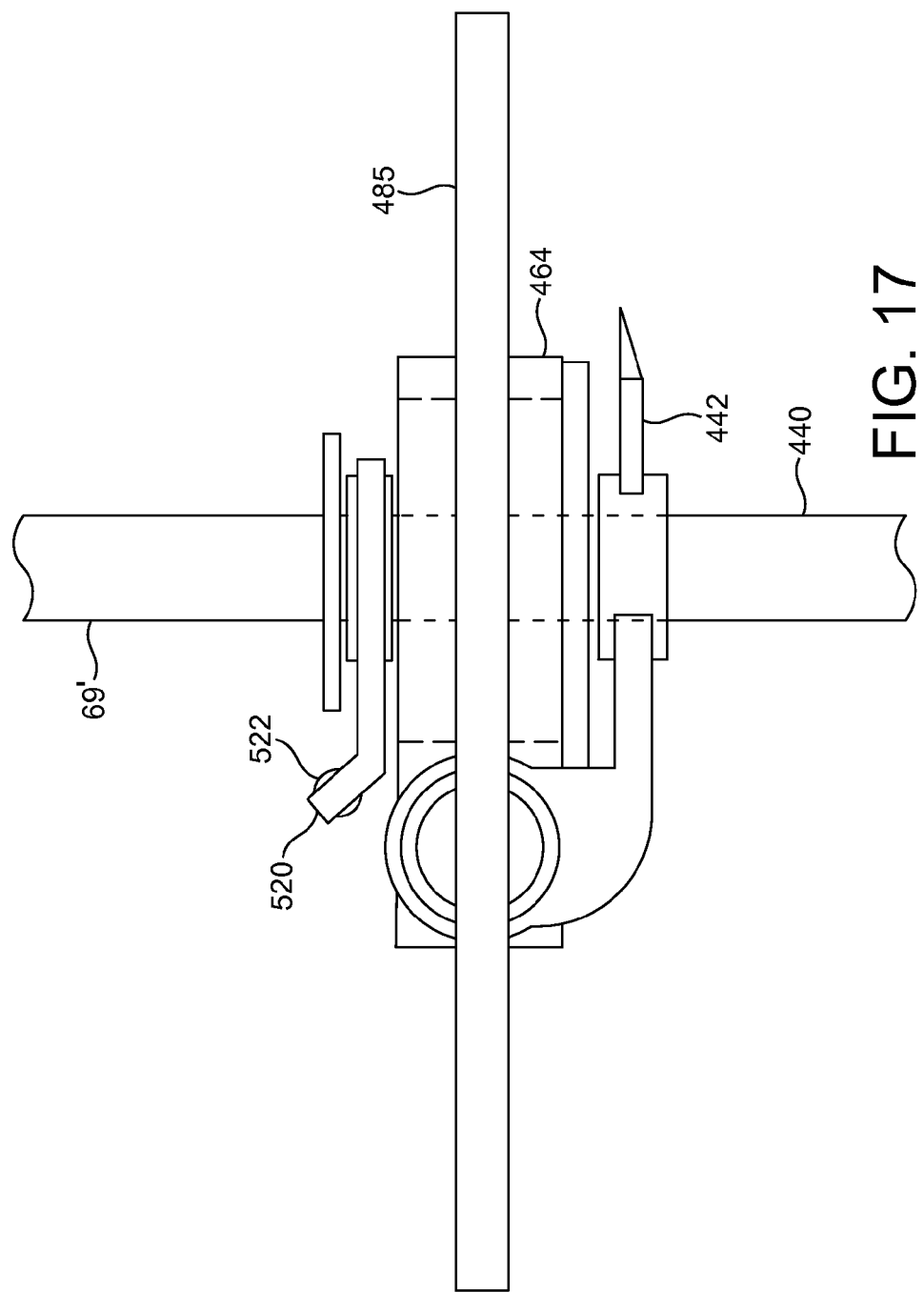
Figure 18:
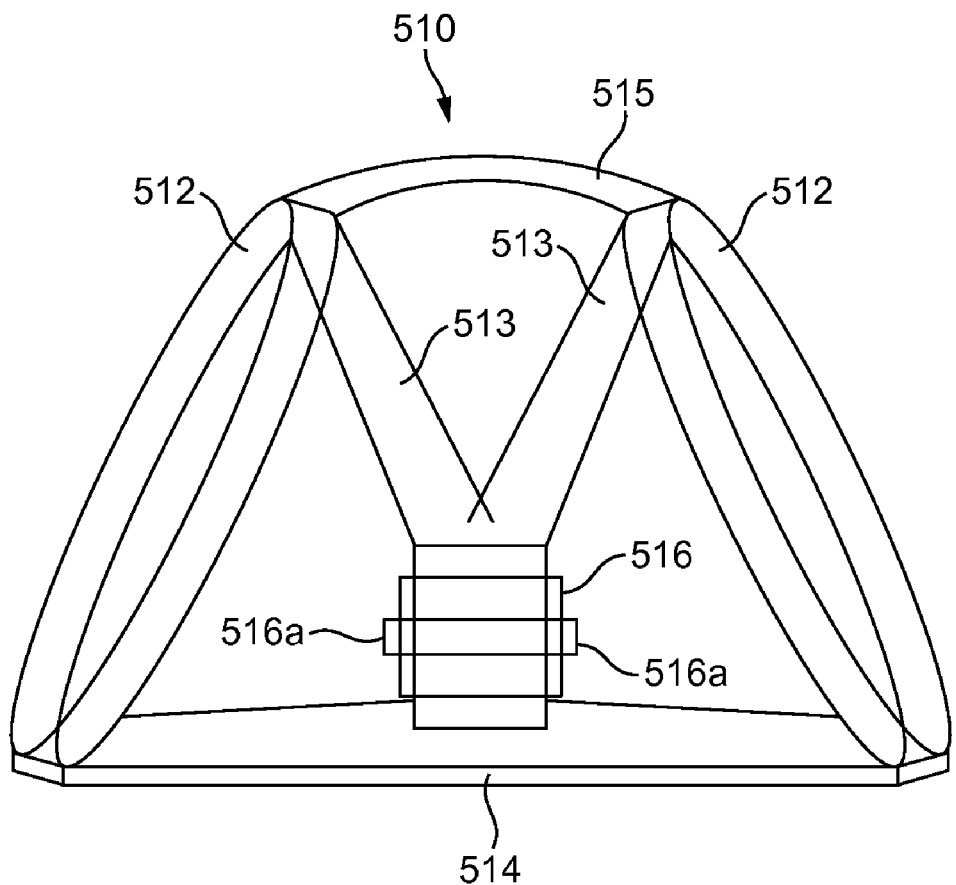
Figure 19:
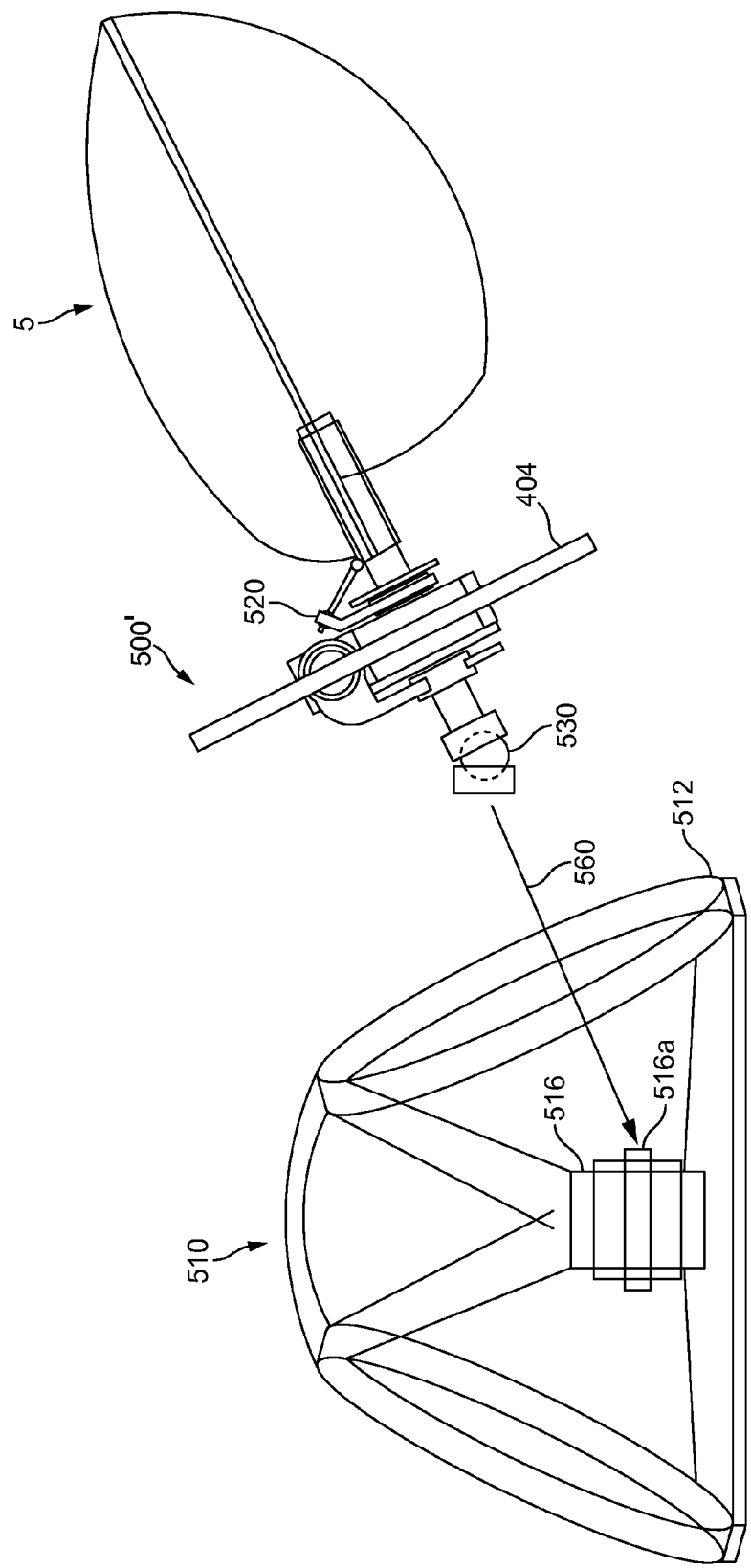
Figure 19A:
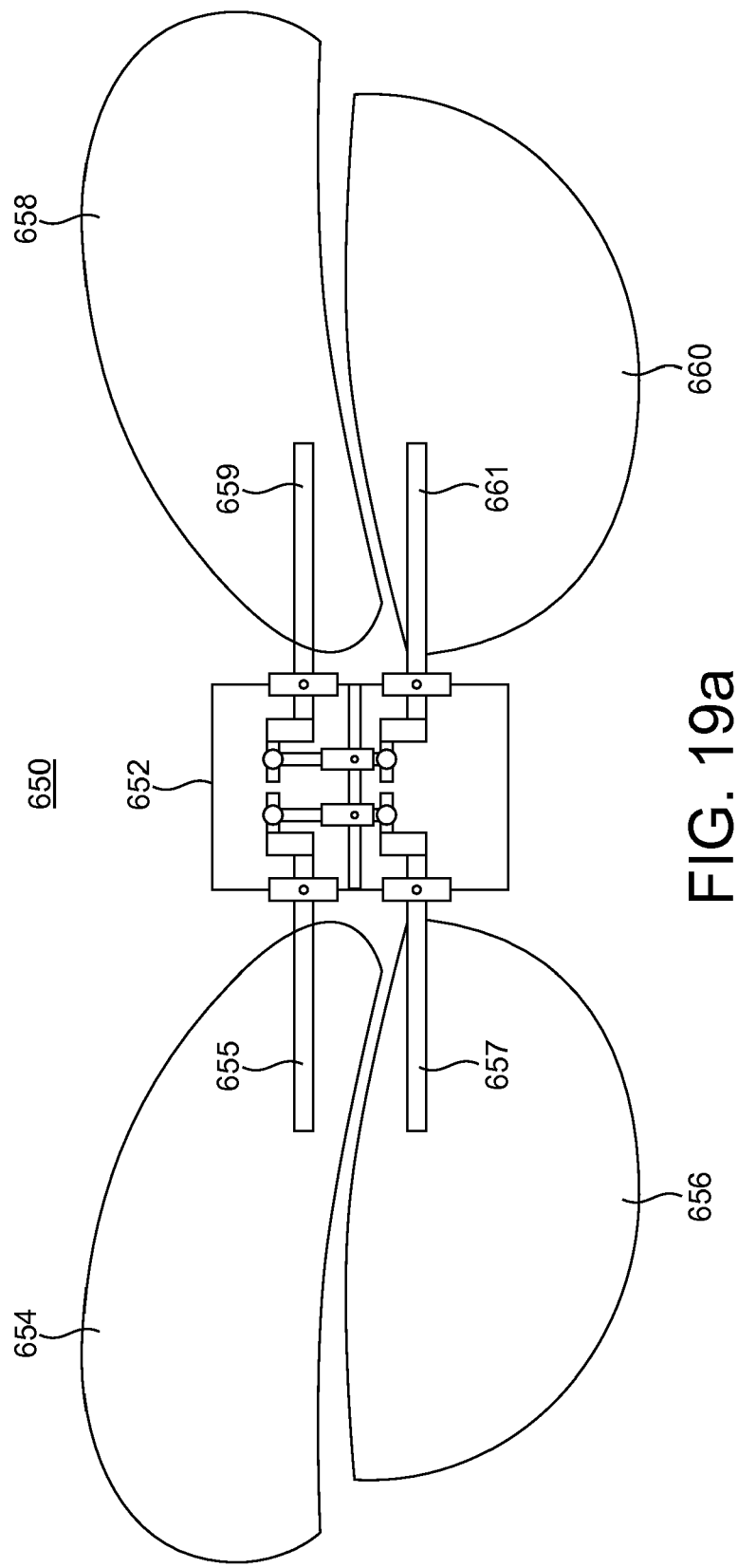
Figure 20:
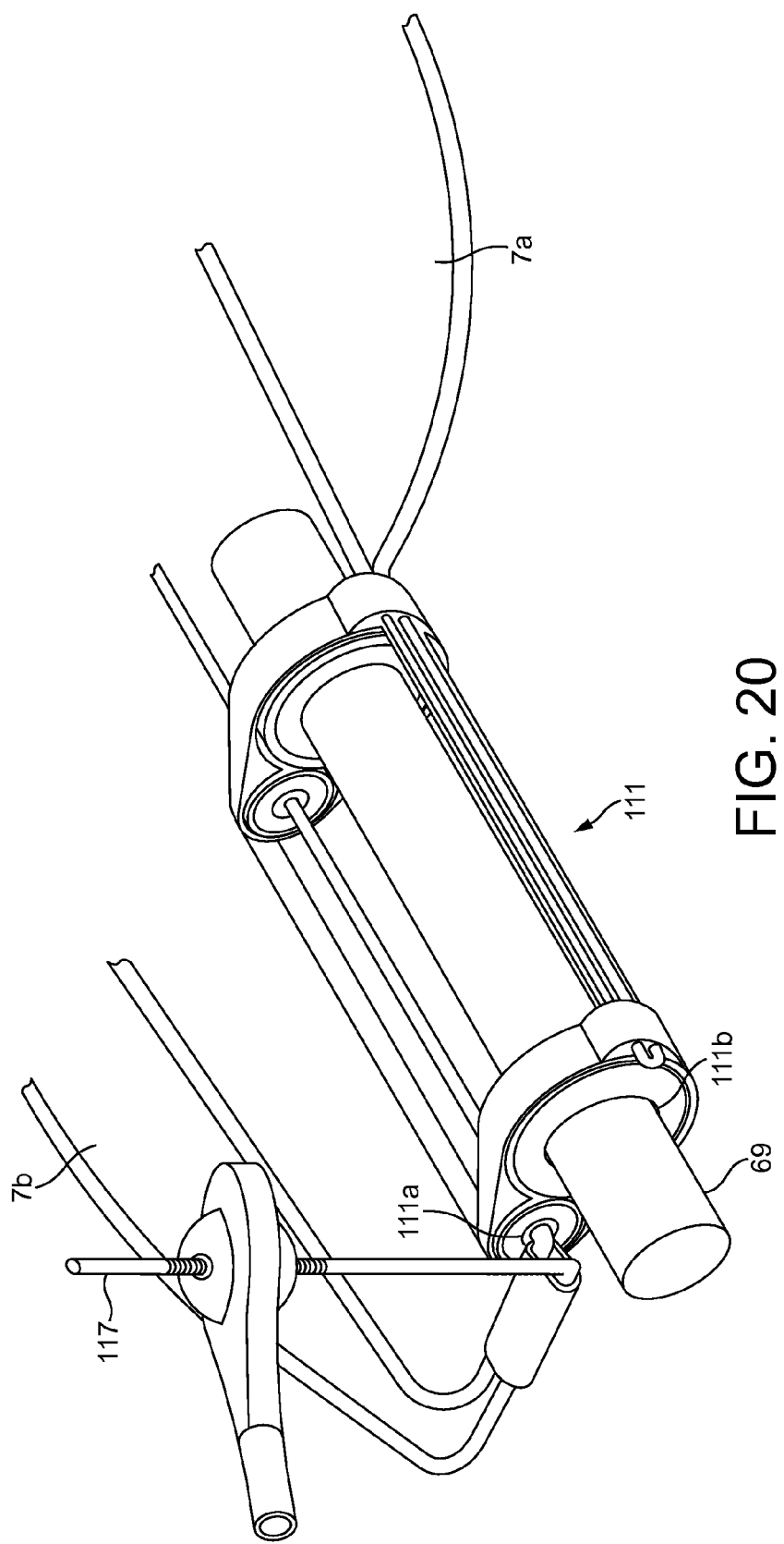
Figure 21:
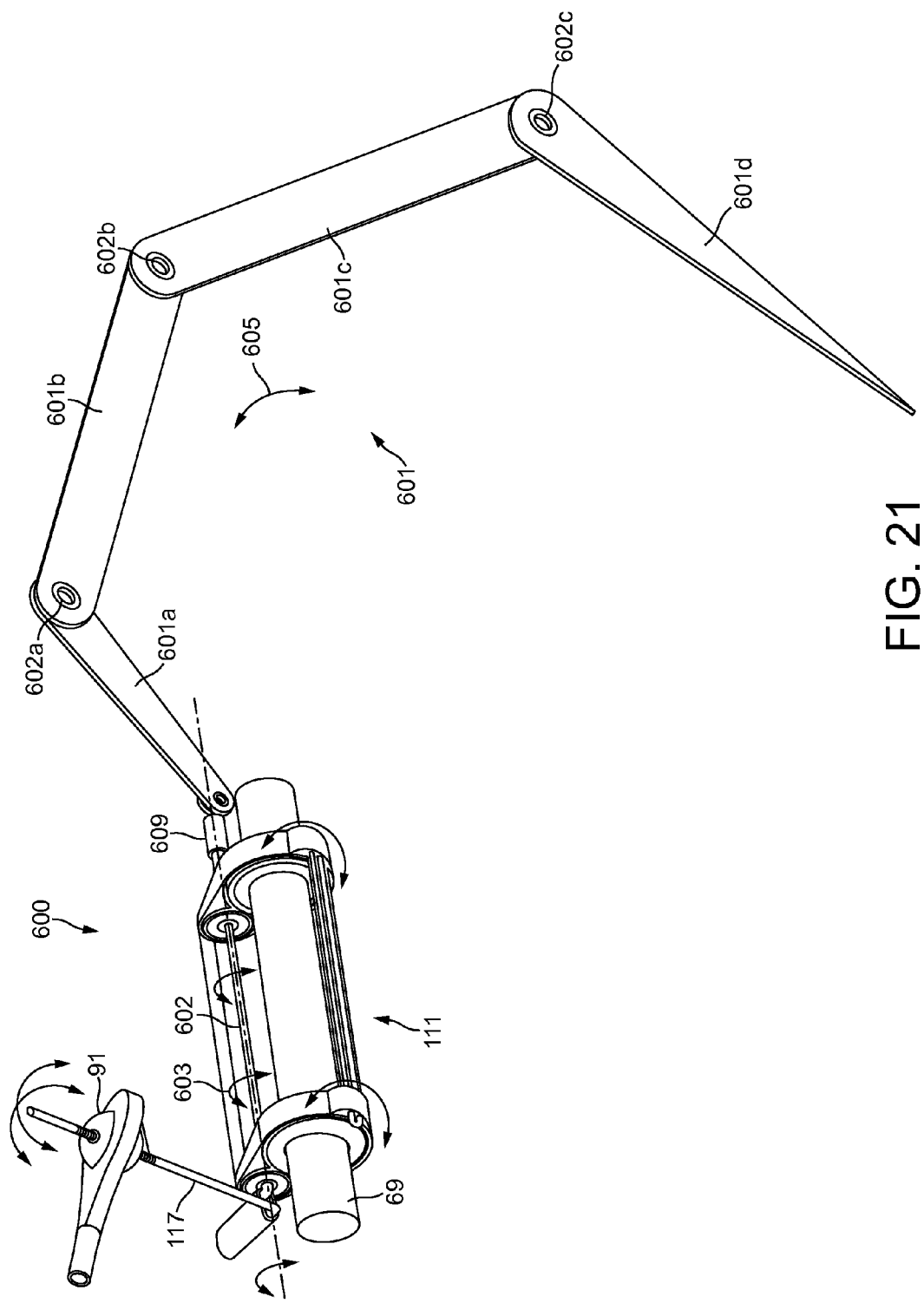
Figure 22A:
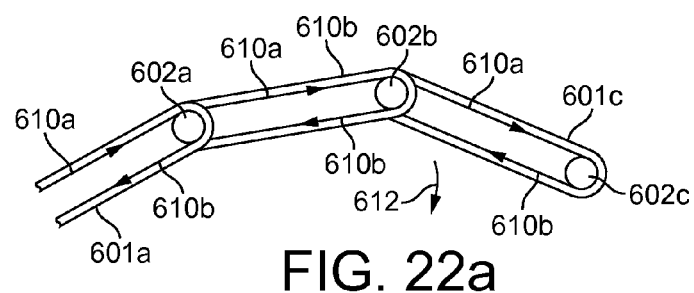
Figure 22B:
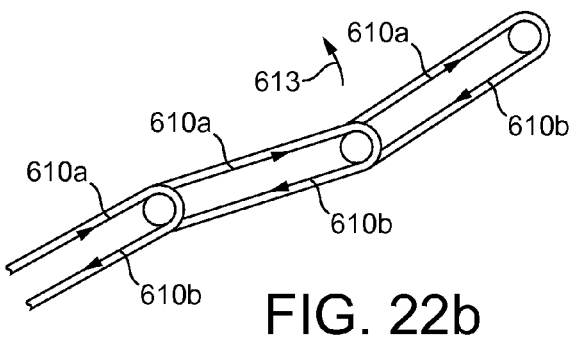
Figure 23A:
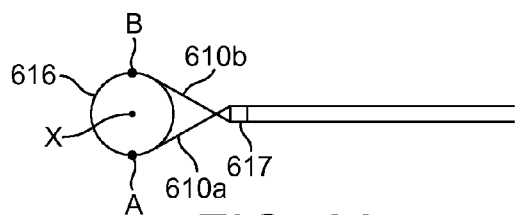
Figure 23B:
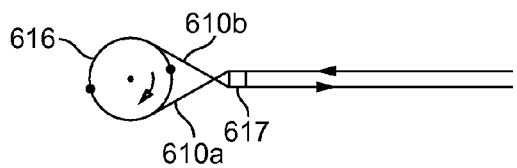
Figure 23C:
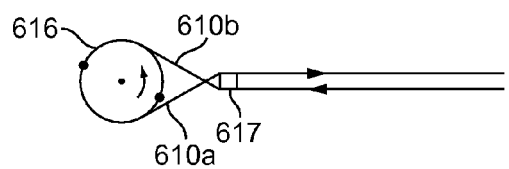
Figure 24:
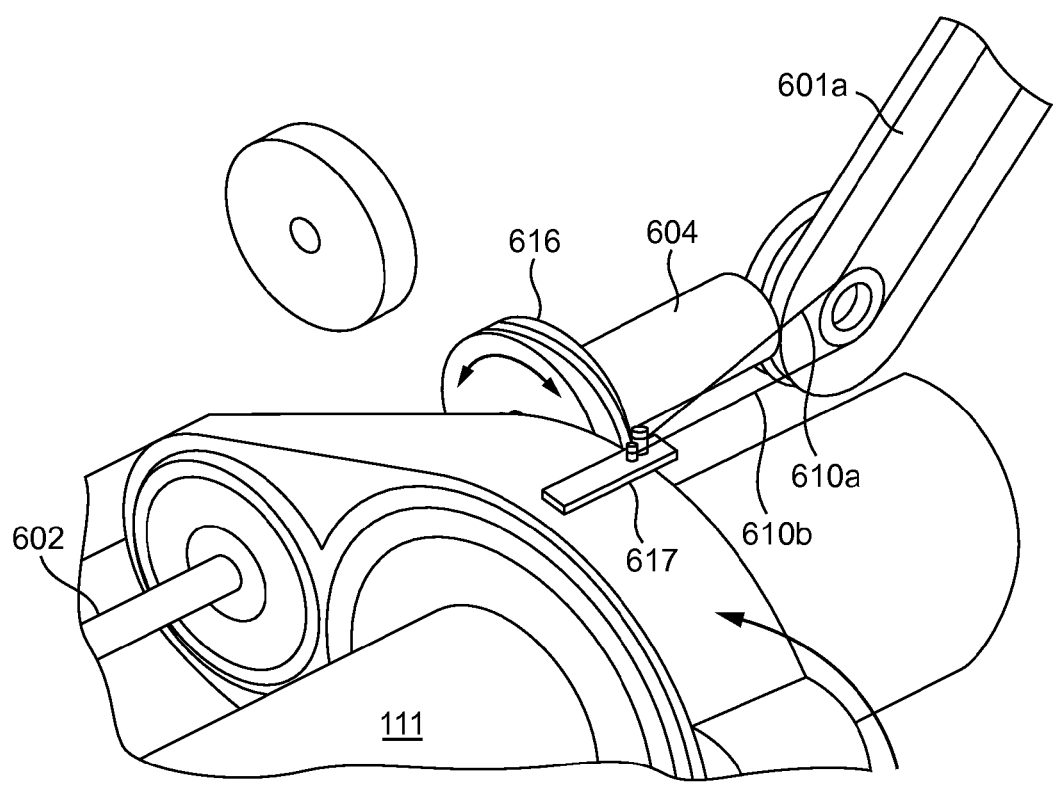
Figure 25:
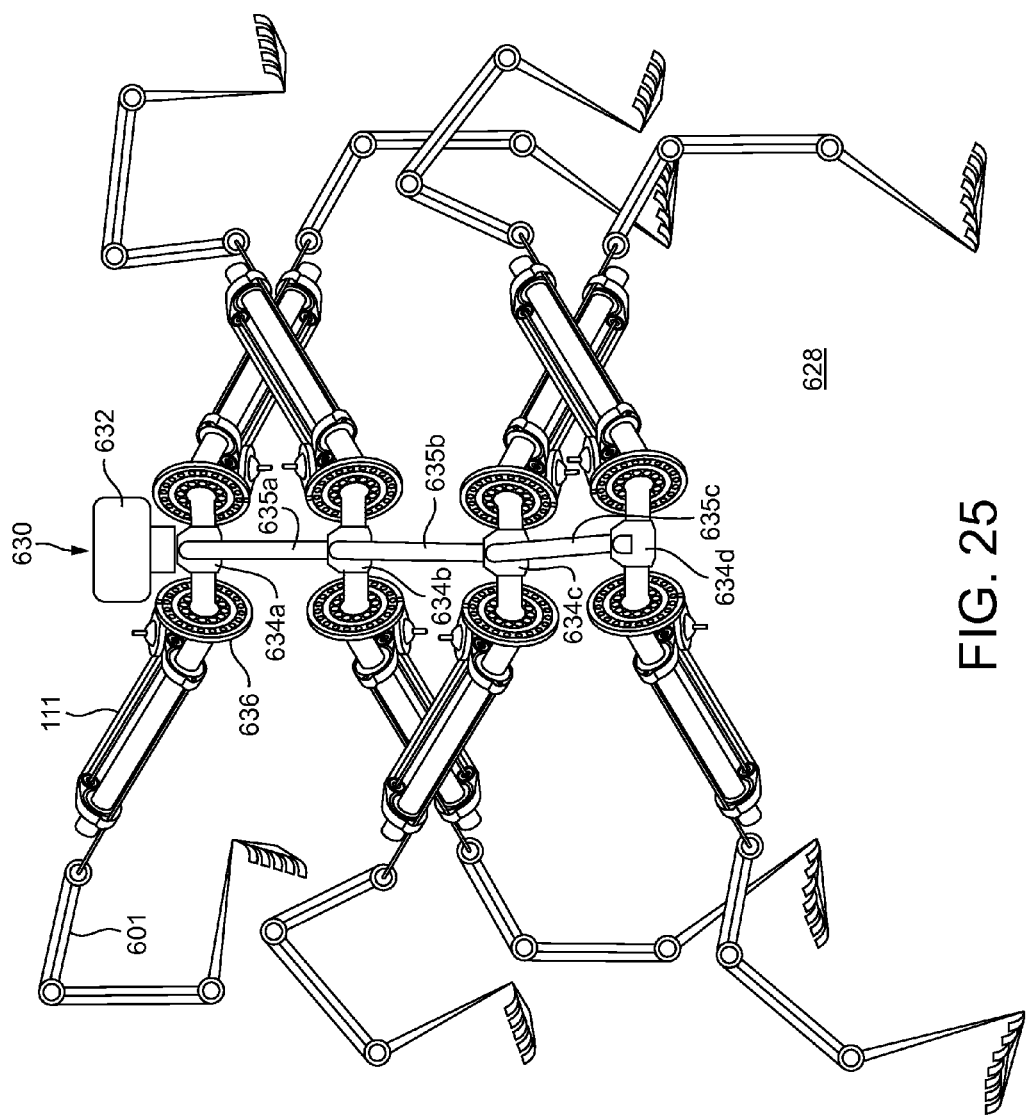
Figure 26:
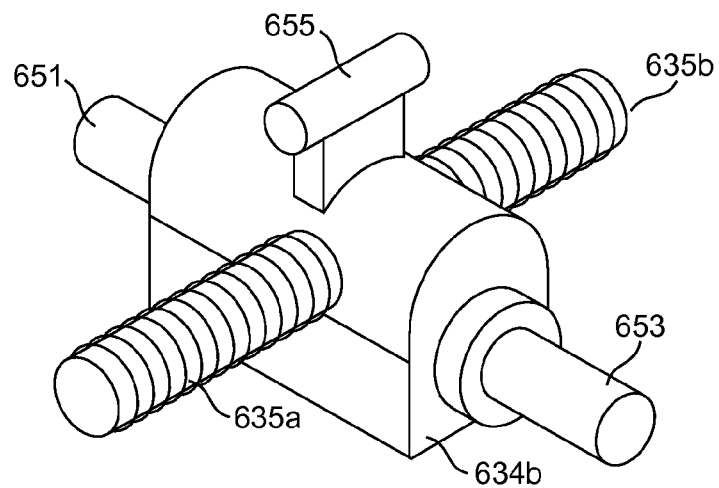
Figure 27:
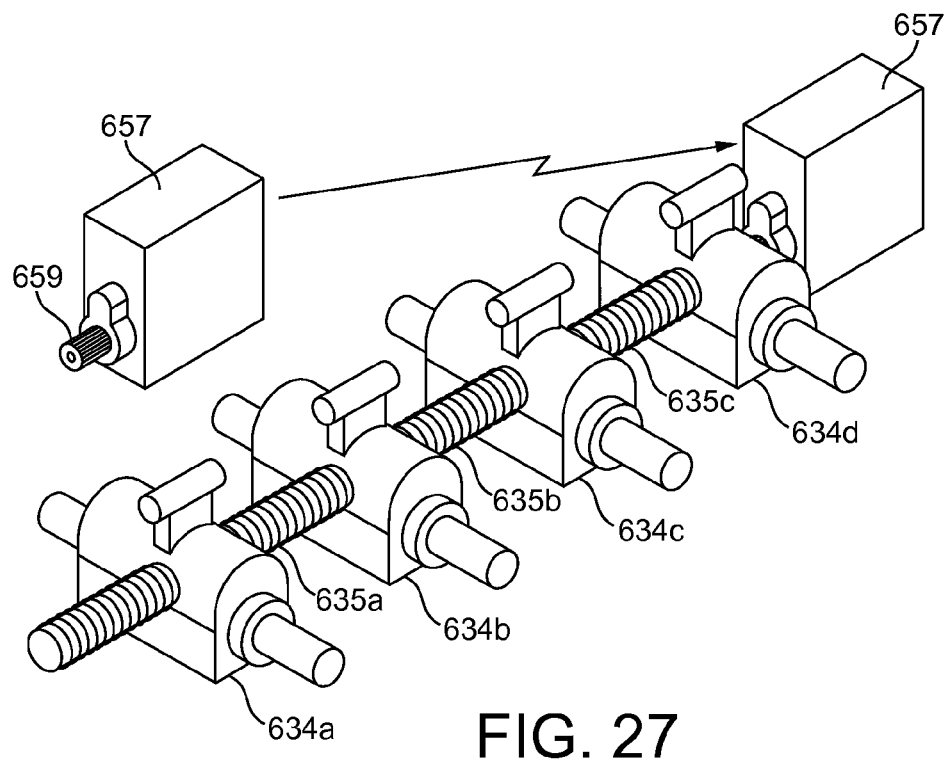
Figure 28:
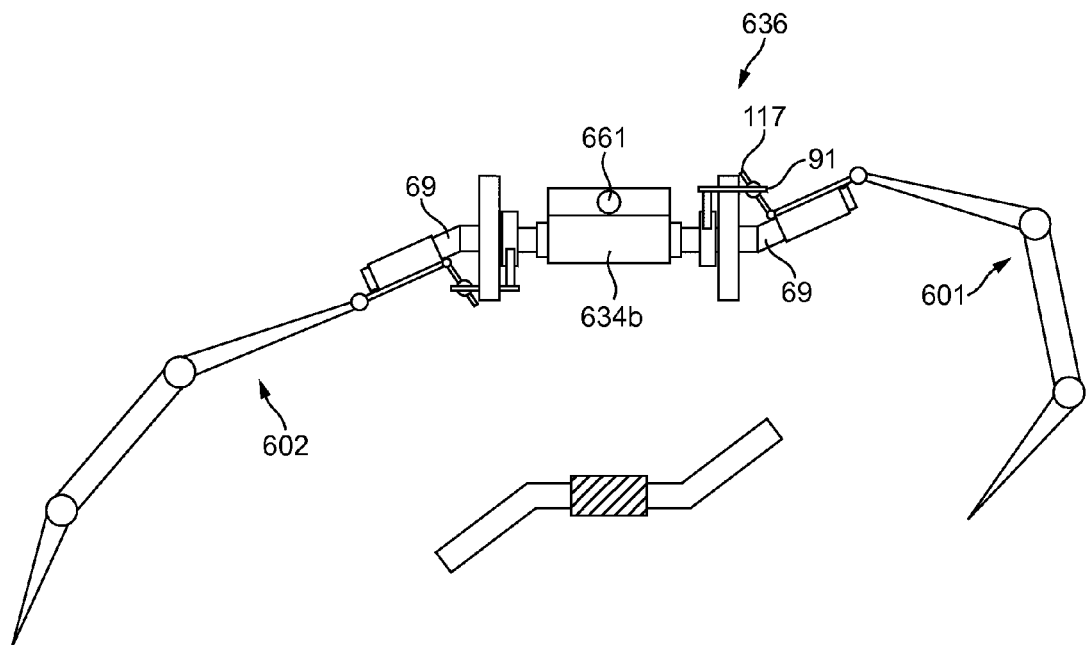
Figure 29:
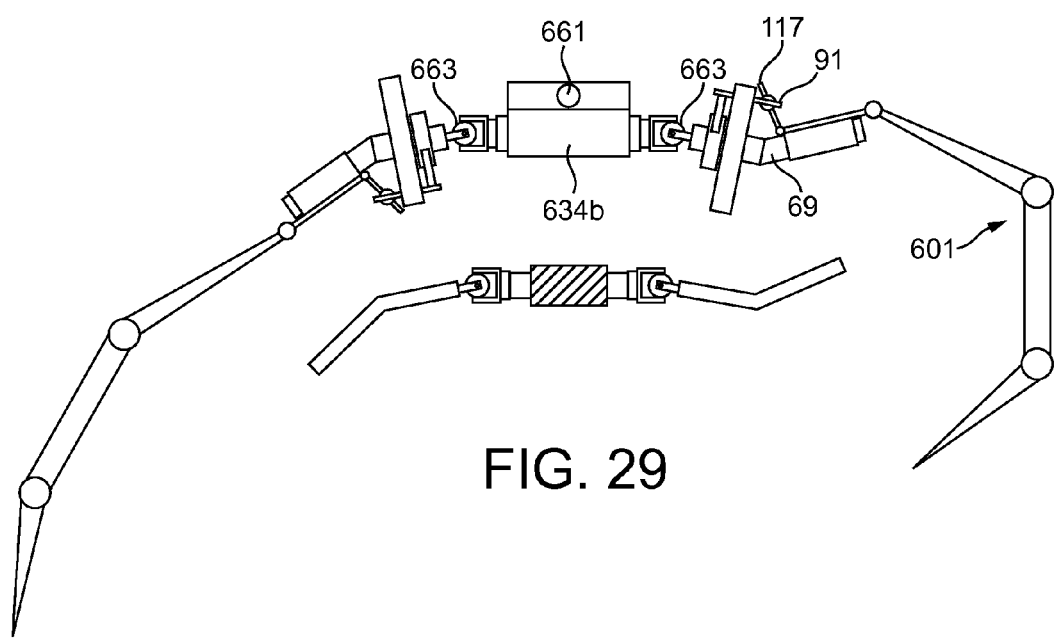
Figure 30:
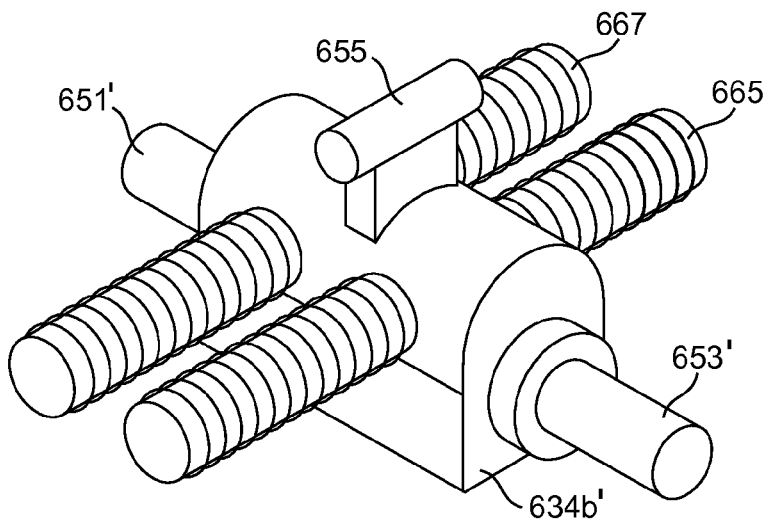
Figure 31:
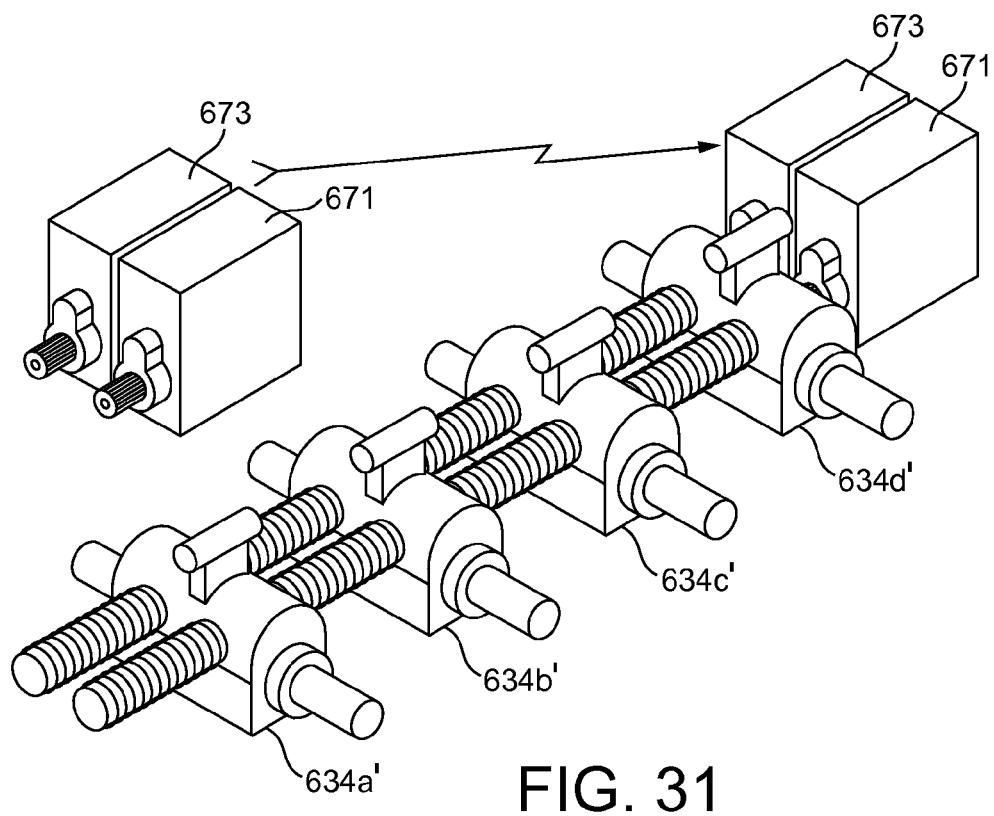
Figure 32:
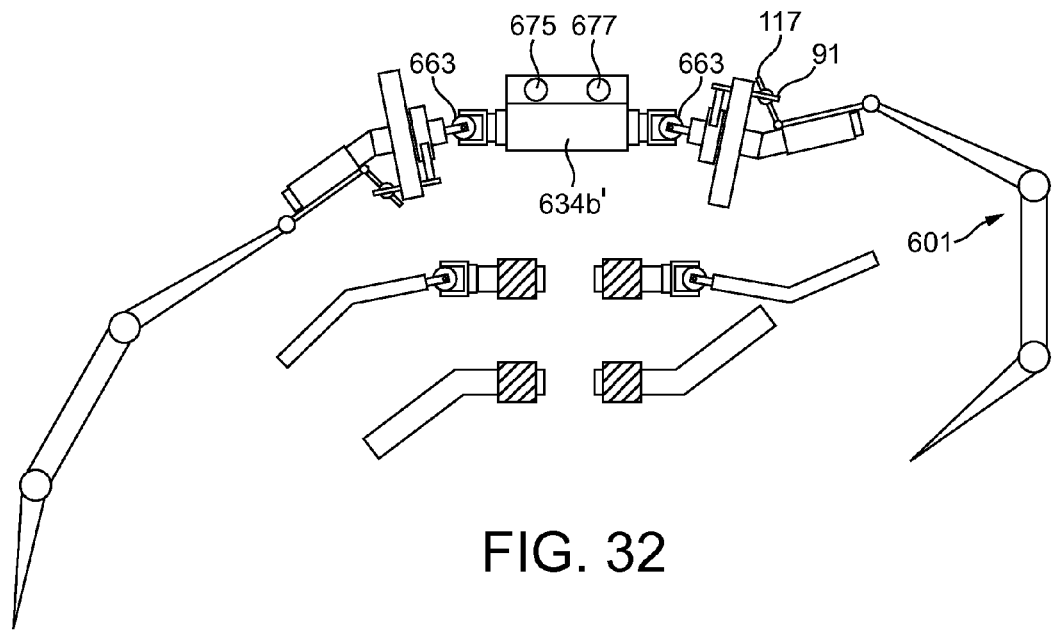
Figure 33:
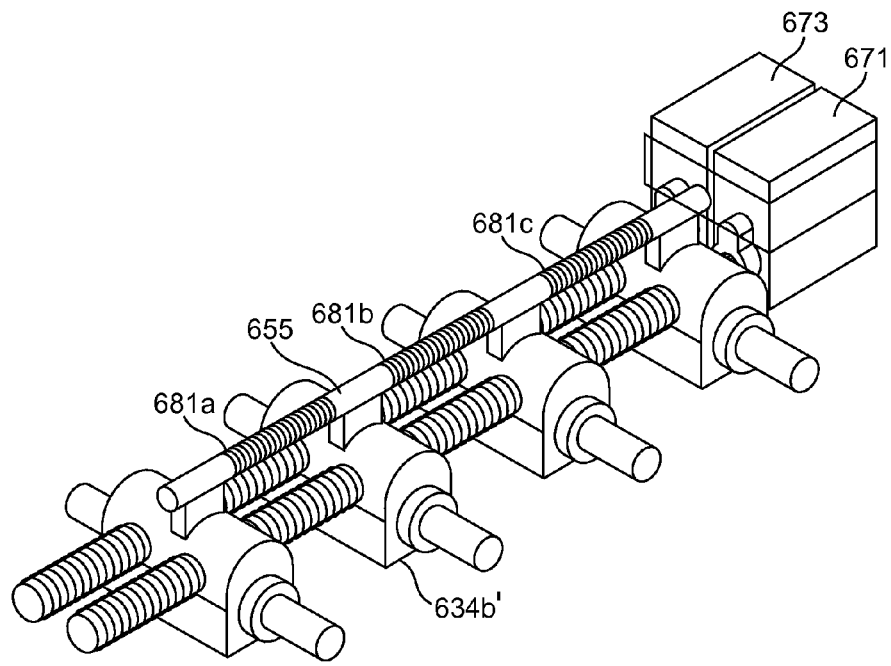
Figure 34:
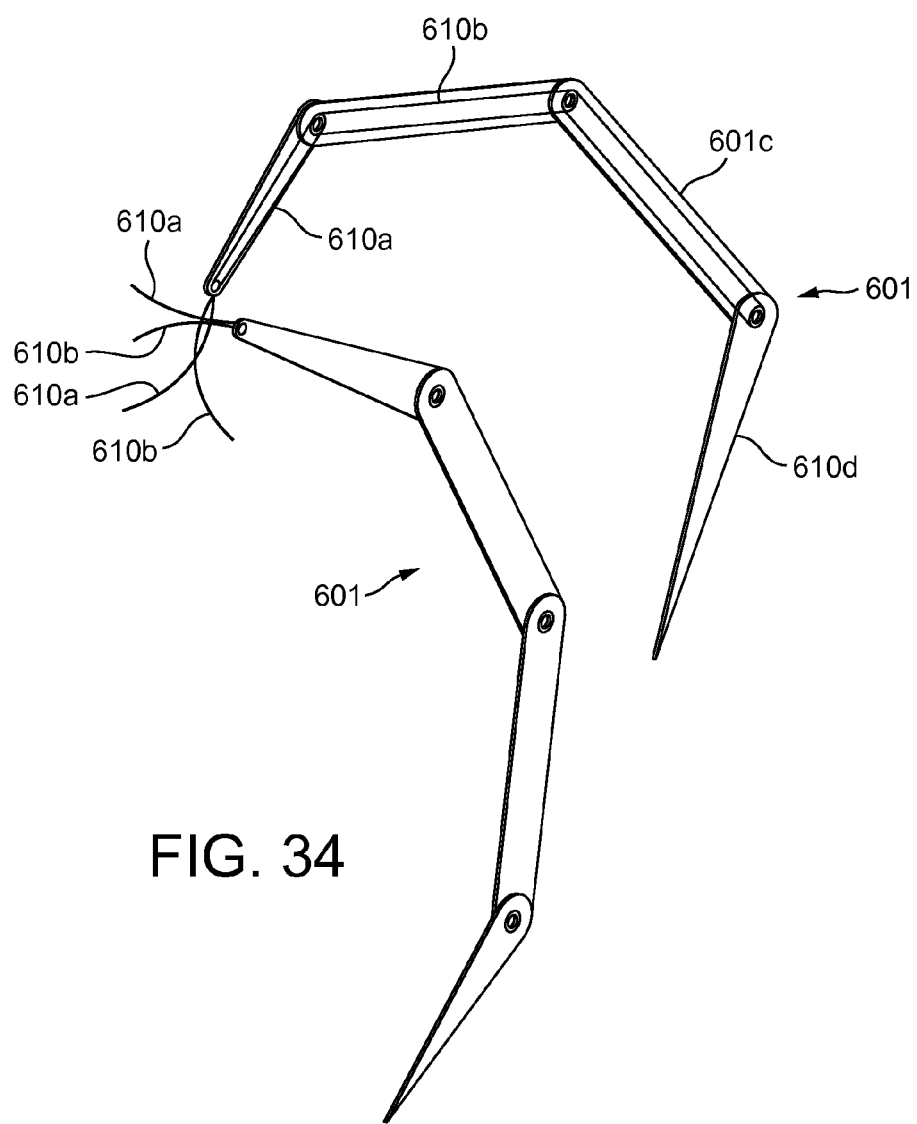

FIGS. 10a, 10b, 10c, and 10d are a plan-view of the further wing drive mechanism shown in FIG. 9;

FIGS. 11a, 11b, 11c, 11d, 11e, and 11f are a plan-view of a cam arrangement which can be used with the further wing drive mechanism shown in FIG. 9;

FIG. 12 is a front view of a further wing drive mechanism;

FIG. 13 is a perspective view of a first 'linear-type' wing drive mechanism;

FIG. 14 is a perspective view of a second 'linear-type' wing drive mechanism;

FIG. 15 is a plan view of a third 'linear-type' wing drive mechanism;

FIGS. 16a, 16b, and 16c are a simplified side-schematic view of the wing drive mechanism shown in FIG. 15;

FIG. 17 is a close-up view of part of the wing drive mechanism shown in FIGS. 15 and 16;

FIG. 18 is a front view of a mounting cage suitable for housing first and second wing drive mechanisms, particularly third linear-type wing drive mechanisms;

FIGS. 19, 19a, and 19b are a front view illustrating the connection of a single third linear-type wing drive mechanism within the mounting cage shown in FIG. 18;

FIG. 20 is partial perspective view of the wing drive mechanism shown in FIG. 6;

FIG. 21 is a perspective view of a leg drive mechanism;

FIGS. 22a and 22b are a schematic view of an articulated leg including a pulley-type control system;

FIGS. 23a, 23b, and 23c are a schematic view of a crank wheel for operating the pulley-type control system shown in FIG. 22;

FIG. 24 is a partial perspective view showing the leg drive mechanism of FIG. 21 in greater detail;

FIG. 25 is a schematic diagram of a walking device employing a plurality of leg drive mechanisms;

FIG. 26 is a perspective view of one gearbox of the walking device represented in FIG. 25;

FIG. 27 is a perspective view of the body section of the walking device represented in FIG. 25;

FIG. 28 is a rear view of the gearbox shown in FIG. 26, the gearbox being attached to two leg assemblies by an angled shaft system;

FIG. 29 is a rear view of the gearbox shown in FIG. 26, the gearbox being attached to two leg assemblies by a universal joint arrangement;

FIG. 30 is a perspective view of a modified gearbox for use with the walking device represented in FIG. 25;

FIG. 31 is a perspective view of a modified body section for use with the walking device represented in FIG. 25;

FIG. 32 is a rear view of the gearbox shown in FIG. 31, the gearbox being attached to two leg assemblies by a universal joint arrangement;

FIG. 33 is a perspective view of the modified body section shown in FIG. 31 with an additional track system provided thereon;

FIG. 34 is a perspective view of two adjacent articulated legs; and

Figure 35:
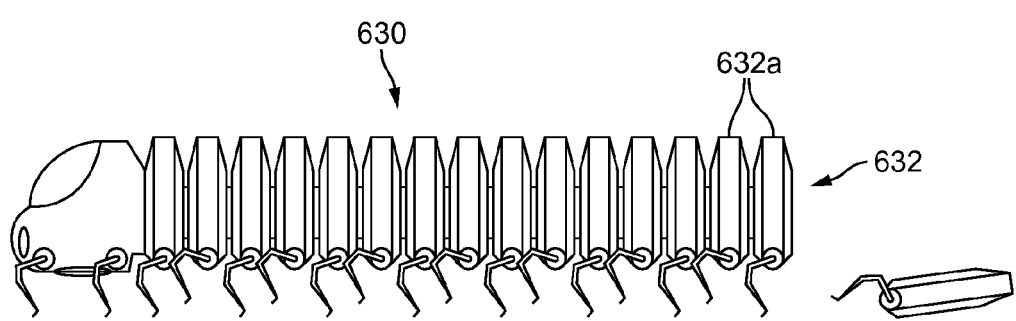

FIG. 35 is a side view of a further walking device employing a plurality of detachable body sections.

Figure 1:
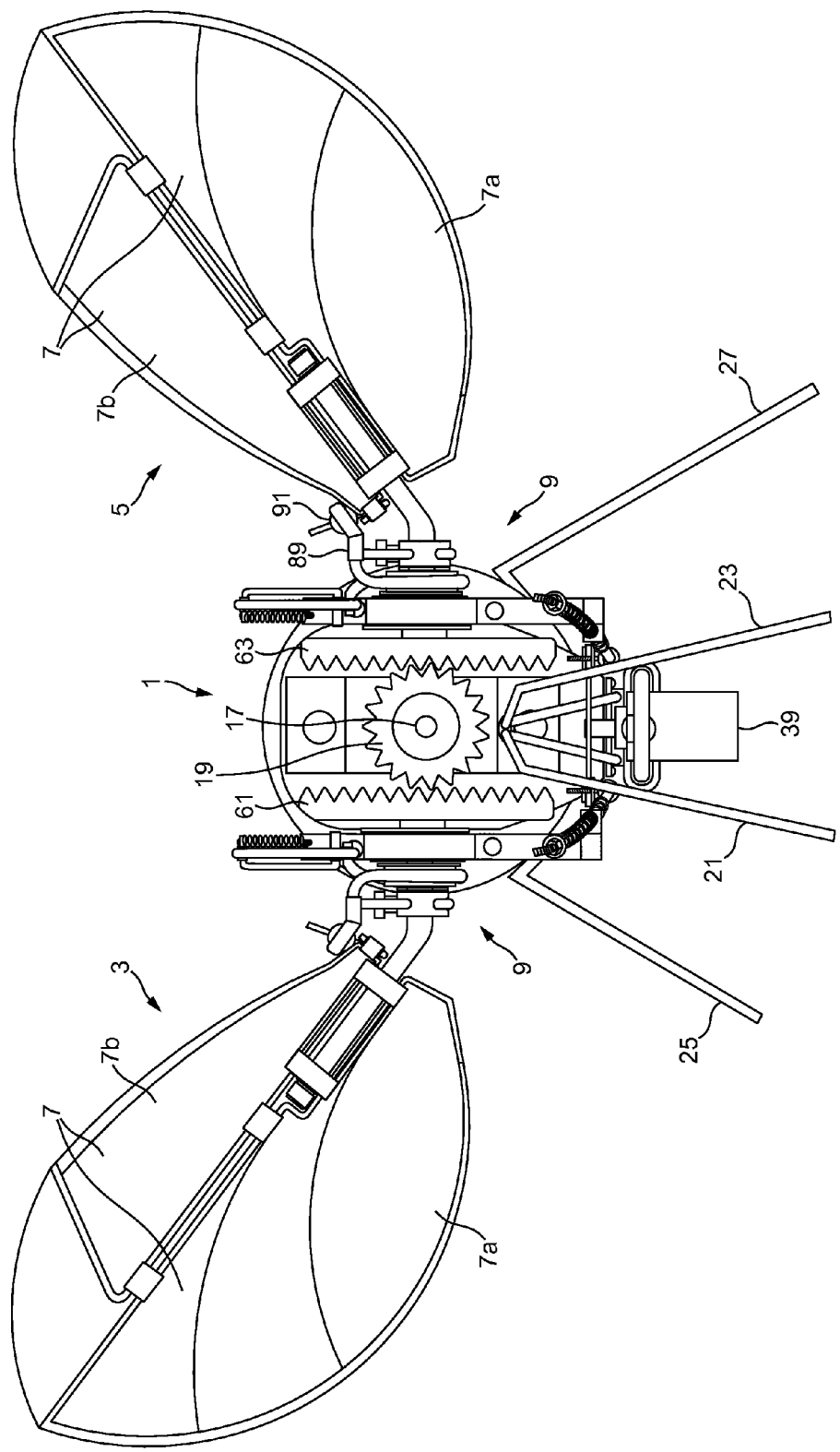
FIG. 1 is a front view of a flying device in accordance with the invention.
Figure 2:
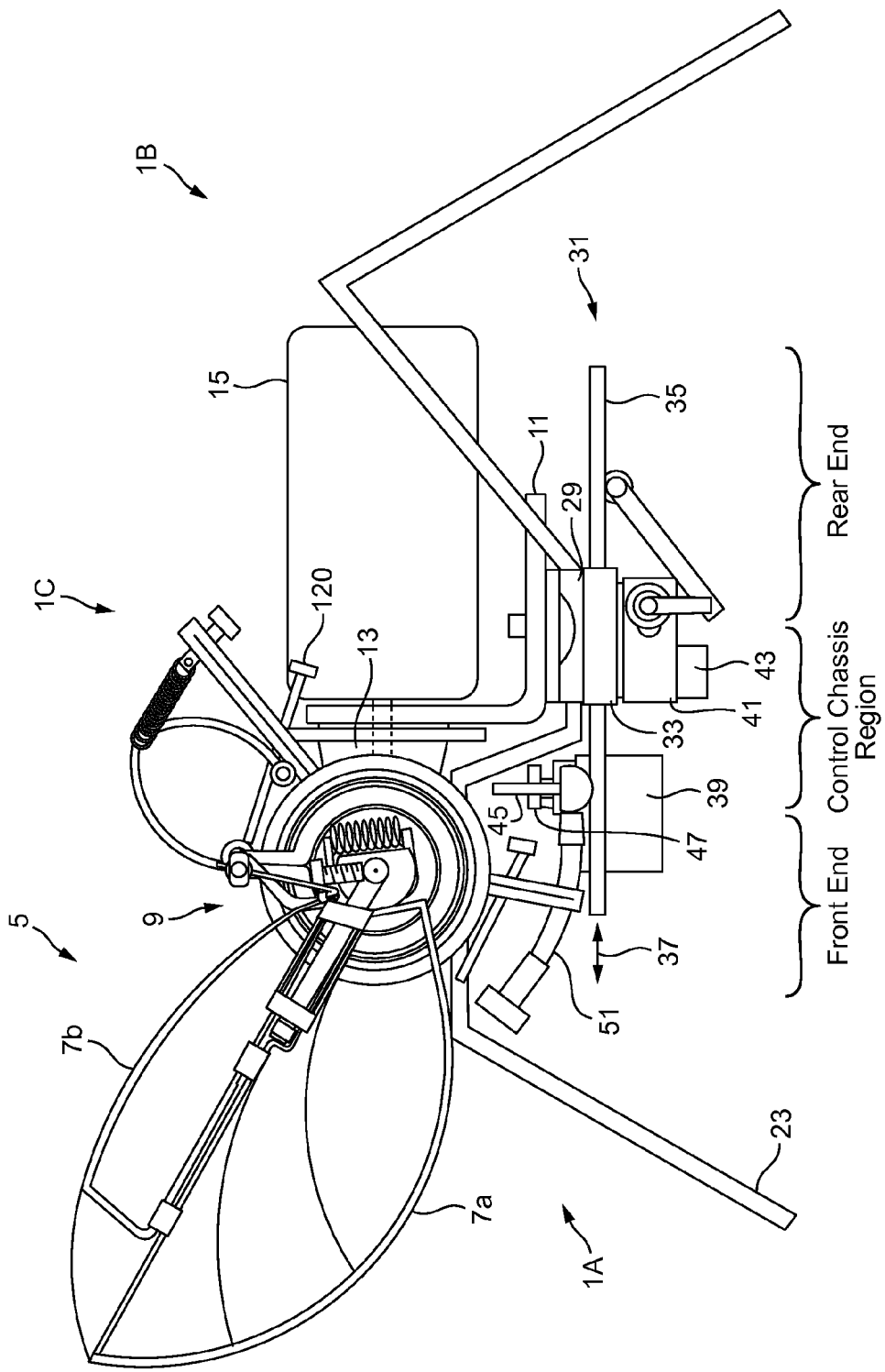
FIG. 2 is a side view of the flying device shown in FIG. 1.

Referring to FIGS. 1 and 2, a flying device comprises three main sections, namely a body section 1 and first and second wing apparatus 3, 5. The first and second wing apparatus 3, 5 are arranged in a substantially opposed relationship, either side of the body section 1. As will be explained in greater detail below, each wing apparatus 3, 5 comprises an articulated wing, having first and second wing portions 7a, 7b, and a wing drive mechanism 9 for imparting a cyclic movement on the wing. The wing drive mechanism 9 further acts to control the orientation of the first and second wing portions 7a, 7b with respect to each other during each cycle.

Referring particularly to FIG. 2, it is seen that the body section 1 has a front end 1A, a rear end 1B, and a central chassis region 1C. The chassis region is made up of a generally L-shaped member 11, and a generally U-shaped bracket 13, which is attached to a vertical part of the L-shaped member. Although the bracket 13 is slightly obscured by part of the second wing apparatus 5, it will be understood that the bracket extends from the L-shaped member 11, towards the front end of the body section 1.

At the rear end of the body section 1, a d.c. motor 15 is provided, which is attached to the vertical part of the L-shaped member 11, at the opposite side of the face on which the bracket 13 is fitted. The L-shaped member 11 has an aperture formed therein, and a drive shaft 17 (not shown in FIG. 2) of the motor 15 passes through the aperture and extends to a position within the bracket 13. Referring particularly to FIG. 1, a drive cog 19 is provided at the free-end of the drive shaft 17, inside the bracket. The operation of the motor 15, drive shaft 17 and drive cog 19 will be explained in greater detail below.

As will be seen in FIGS. 1 and 2, the body section includes four legs, i.e. two front legs 21, 23 and two rear legs 25, 27. The four legs 21, 23, 25, 27 are formed from metal rods which, at one end, are each welded to a metal block 29 which is itself attached, by screws, to the horizontal part of the L-shaped member 11. The two front legs 21, 23 extend from the block 29, towards a position slightly beyond the front end of the body section 1, and the two rear legs 25, 27 extend from the block 29 to a position in the region of the rear end. Although not shown in FIG. 1 or 2, feet can be provided at the ends of the legs 21, 23, 25, 27 if required so as to provide added stability. In use, the legs 21, 23, 25, 27 support the body section 1 when the flying device is located on a surface.

Figure 3:
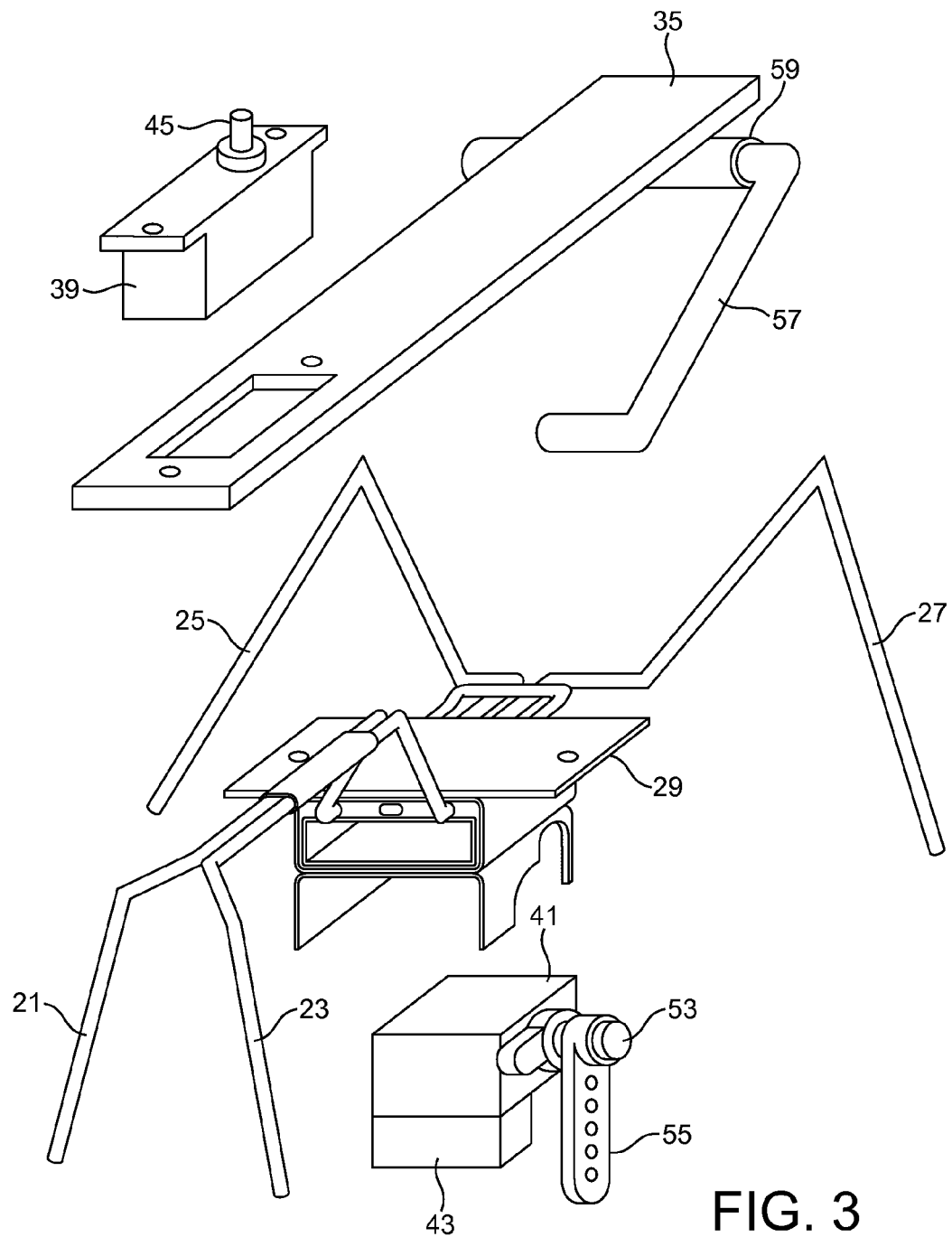
FIG. 3 is a perspective exploded view of a control mechanism of the flying device shown in FIGS. 1 and 2.

Referring to FIG. 2, a control mechanism 31 is provided at the lower part of the body section 1. Reference is also made to FIG. 3, which shows a perspective exploded view of the control mechanism 31. The control mechanism 31 is attached to the block 29 which, as explained above, is itself attached to the horizontal part of the L-shaped member 11. The control mechanism 31 includes a plastics sleeve 33 defining channel of rectangular cross-section. A rectangular plastics plate 35 is located within the sleeve 33, the plate being slideable within the channel in a forwards-backwards direction, as indicated by the arrow 37. Towards the front-end of the plastics plate 35 a first servo 39 is provided. At the underside of the plastics sleeve 33, a further, second servo 41, is provided. On the underside of the second servo 41, a radio frequency (r.f.) receiver/controller 43 is attached.

The first and second servos 39, 41 are arranged to control the orientation of the wings assemblies 3, 5 in two ways, as will be briefly described here.

Figure 4A:
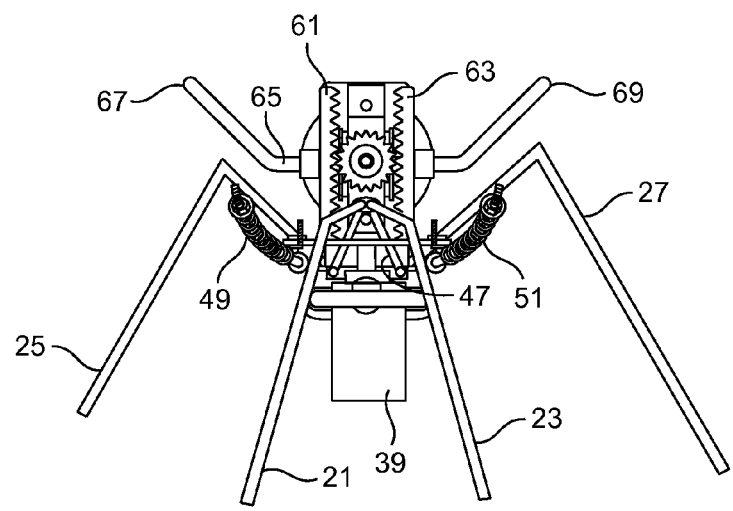
FIGS. 4a and 4b are, respectively, front and side views of the flying device with its wing parts removed.
Figure 4B:
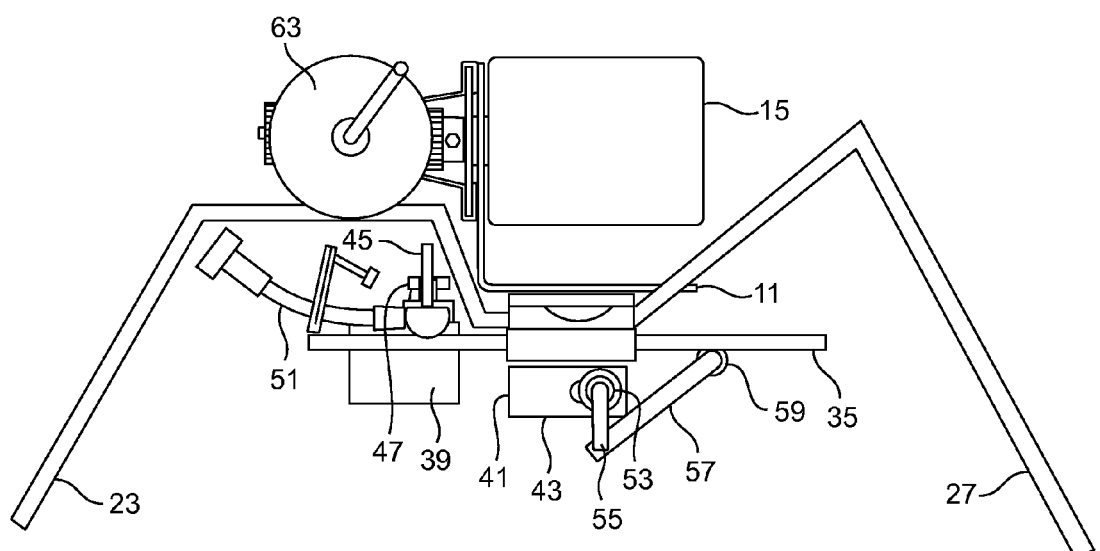

Referring to FIGS. 4a and 4b, which shows the flying device from the front and side view respectively with the wings removed, it can be seen that a short shaft 45 extends upwardly from the first servo 39, the shaft being attached to an arm 47 at a central point thereof. The first servo 39 causes the shaft 45 to rotate, to a limited extent, in both clockwise and anticlockwise directions. The end points of the arm 47 are linked, via a universal joint, to linkage members 49, 51 located on both sides of the body section. These linkage members 49, 51 are generally accurate in form and include a spring damping mechanism. As will be explained in detail below, the linkage members 49, 51 are connected to the first and second wing apparatus 3, 5 such that their positions can be altered. Rotational movement of the servo shaft 45 will cause corresponding rotation of the arm 47. Depending on the direction of movement, the arm 47 acts to move one of the linkage members 49, 51 in a forwards direction, and so one of the other linkage members 49, 51 in a backwards direction, thus changing the position of the first and second wing apparatus 3, 5 with respect to the body section 1. In use, this positional change in the wing apparatus' position will act to turn the flying device when flying in mid-air.

Referring now to FIGS. 3 and 4b, it will be seen that the second servo 41 has a short shaft 53 extending from one side thereof. The second servo 41 causes the shaft 53 to rotate to a limited extent in both clockwise and anticlockwise directions. The shaft 53 is attached to one end of an arm 55 which is rotatably linked, at its opposite end, to a piston arm 57. The piston arm 57 is bent at a further end and is attached, via a sleeve 59, to the plastics plate 35. Accordingly, movement of the second servo 41 causes the plastics plate 35 to slidably move within the plastics sleeve 33 in a reciprocating manner, either forwards or backwards. Since the first servo 39 is fixed to the plastics plate 35 and is linked to the wing apparatus 3, 5 by the linkage members 49, 51, forwards movement of the plastics plate 35 (due to the second servo 11) will move both wing apparatus' in a forwards direction, and backwards movement of the plastics plate will move both wing apparatus 3, 5 in a backwards direction. It will be appreciated, therefore, that the second servo 41 acts to control forwards and backwards movement of the flying device when in mid-air, depending on the rotational direction of the shaft 53.

It will also be appreciated that the flying device can hover when the first and second wing apparatus 3, 5 are in a 'neutral' position.

As mentioned above, the motor 15 has a drive shaft 17 the free-end of which is attached to a drive cog 19. The drive cog 19 forms part of a bevel gear mechanism which includes first and second drive wheels 61, 63 mounted opposite one another, either side of the bracket 13, and which are rotatable with a central axle 65 which passes through the drive wheels and the bracket. The skilled person may be more familiar with the terms 'bevel pinion' and 'crown wheels', when referring to the drive cog 19 and drive wheels 61, 63, respectively. As FIG. 1 shows, each drive wheel 61, 63 has a toothed inner rim with which the drive cog 19 meshes. Accordingly, when the drive cog 19 turns clockwise, in the view shown in FIG. 1, the first drive wheel 61 will rotate in the clockwise direction whilst the second drive wheel 63 will rotate in the opposite, anticlockwise direction (as in the view shown in FIG. 2). The axle 65 is joined to the second drive wheel 63, so that when the motor 15 operates, the axle likewise turns in the anticlockwise direction.

As is clear from FIG. 4a, the axle 65 has first and second free ends. These free ends form drive arms 67, 69 which comprise part of the wing drive mechanism 9. The free ends 67, 69 are bent at an angle of approximately 45 degrees from the axis of the axle 65, and are symmetrical about the body section 1, as shown in FIG. 1.

The structure and operation of one of the wing apparatus 3, 5 will now be described in detail. Specifically, the second wing apparatus 5 will be described. It will be appreciated that the first wing apparatus 3 will operate in the same way as the second, although the structure will be slightly different so as to operate on the left-hand side of the body section 1, rather than on the right-hand side.

Figure 5:
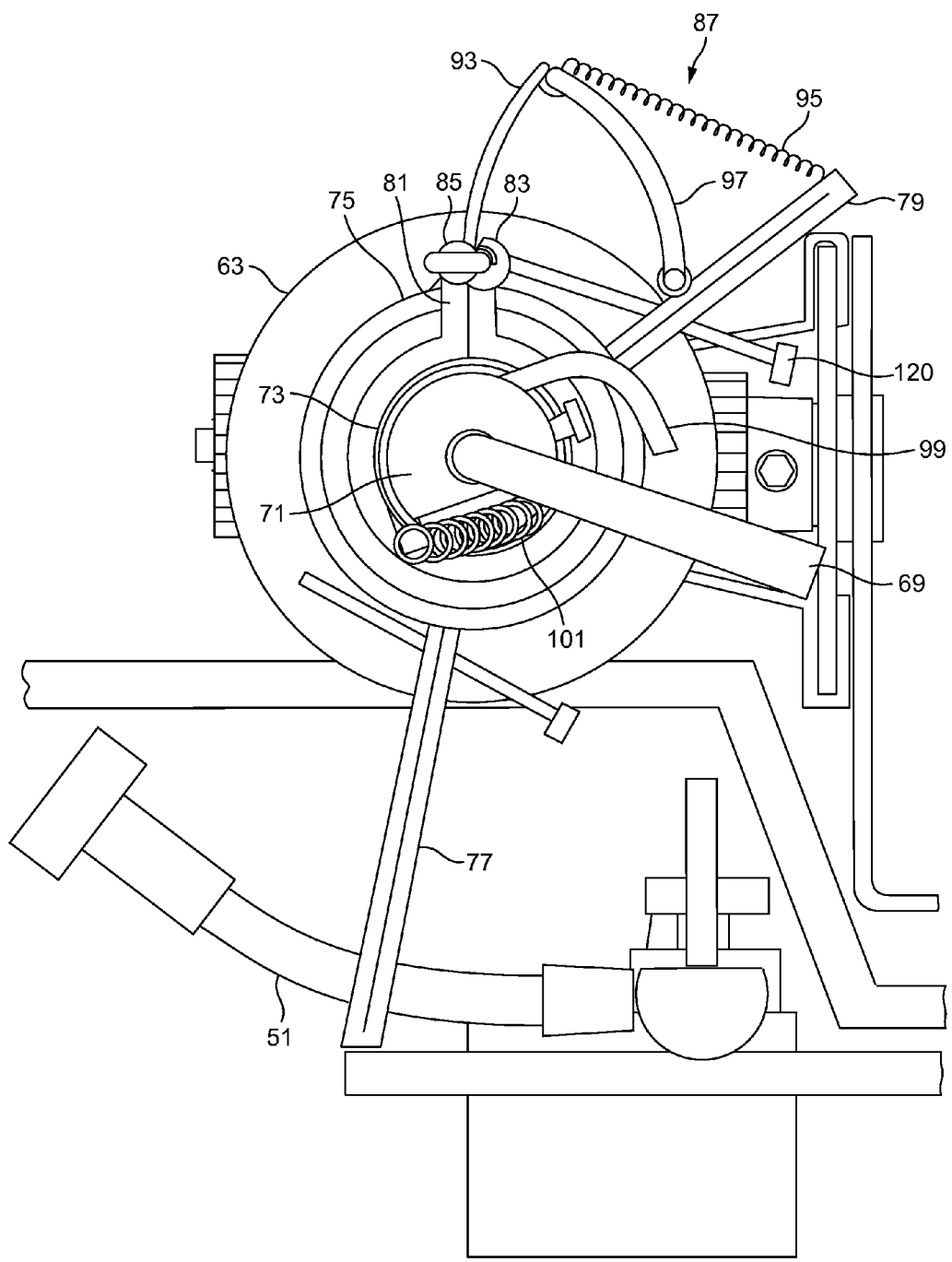
FIG. 5 shows a close-up view of a wing drive mechanism of the flying device.

As mentioned previously, each wing apparatus 3, 5 comprises an articulated wing and a wing drive mechanism 9. FIG. 5 shows the wing drive mechanism 9 of the second wing apparatus 5, the articulated wing to be mounted in the drive arm 69, not being shown. The drive arm 69 is shown extending generally rightwards from the second drive wheel 63. The drive wheel 63 has, formed thereon, a circular protrusion 71 surrounding the axle 65, which protrusion turns with the axle, and around which protrusion is located a bearing 73 which can turn independently of the axle. Located around the outside of the bearing 73 is located a so-called "anchor" 75. The anchor 75 comprises a sleeve with first and second spars extending radially therefrom. The first spar 77 extends in a generally downwards direction and is connected to the linkage member 51 at a position which is adjustable along the length of the linkage member. The second spar 79 extends in a generally upwards direction, towards the right-hand side of the drive wheel 63. Since the anchor 75 is fixed to the linkage member 51 by the first spar 77, it retains its position with respect to the rest of the wing drive mechanism 9 and does not turn with the axle 65 or the bearing 73.

The bearing 73 has a groove (not shown) extending circumferentially around its edge. A wing control mechanism 81 is fixed to the bearing 73 by means of the groove. The wing control mechanism 81 comprises a wire member having first and second free ends 83, 85, the wire member being wrapped around the bearing, and fixed within the groove. The first and second free ends 83, 85 are bent upwards from the point where they meet on the edge of the bearing. The first free end 83 (shown on the right hand side) is connected, via a joint, to a return mechanism 87, the structure of which will be explained below. The second free end 85 (shown on the left hand side) extends outwardly and away from the second drive wheel 63 thereby to provide an abutment surface 89. At the extreme end of the free end forming the abutment surface 89, a universal ball joint 91 is provided, the purpose of which will become clear later on in the specification. It may be useful to refer back to FIG. 1, as well as FIG. 5, in order that the structure of the wing control mechanism 81 can be fully appreciated.

The above mentioned return mechanism 87 comprises a link arm 93 which is attached to one end of an elastic member, in this case a coil spring 95, which is connected, at its other end, to the second spar 79 of the anchor 75. Thus, rotation of the bearing 73 in an anti-clockwise direction (which will result in anti-clockwise rotation of the wire member) will cause the link member 93 to tension the spring 95. The locus of movement of the link arm 93 during such movement is controlled by provision of a further member 97 which maintains a fixed distance between the link arm 93 and the second spar 79 of the anchor 75.

A cam 99 is provided on the protrusion 71 surrounding the axle 65, the cam extending outwards from the rim thereof, and being held in position on the protrusion by means of a small coil spring 101. The purpose of the cam 99 is to engage with the abutment surface 89 at the second free end 85 of the wire member on the bearing 73, so that, when the axle 65 (and so the protrusion 71) rotates, the cam 99 will, at a predetermined point in the rotational cycle of the axle, engage the abutment surface and cause the bearing to rotate anti-clockwise also. This will cause the coil spring 95 to become tensioned. The length of the cam 99 is arranged such that, at a further predetermined point in the cyclic movement of the axle 65, the cam will pass or slip beneath the abutment surface 89. Since the coil spring 95 will be tensioned, the effect of this will be for the bearing 73, and the control mechanism 87 located thereon, to return suddenly and rapidly backwards (in the clockwise direction) due to the urging nature of the spring.

It will be appreciated, therefore, that when the gear mechanism is operating the first and second drive wheels 61, 63, via the motor 15, the axle 65 and protrusion 71 will always rotate in the anticlockwise direction (when viewed from the side shown in FIG. 1). The bearing 73 and wing control mechanism 81, however, will turn both anticlockwise and clockwise during each cycle, due to the operation of the cam 99 on the abutment surface 89, and the spring 95 which acts to urge the bearing 73 to return to its original position. As will become clear, when each of the articulated wings 7 are attached to the wing drive mechanism 9, the resultant movement of the wings 7 acts to enable the wings to impart lift on the overall flying device in an efficient manner.

It is envisaged that the function carried out by the described return mechanism 87 with its spring 95 and cam 99 may be effected by other means.

Figure 5A:
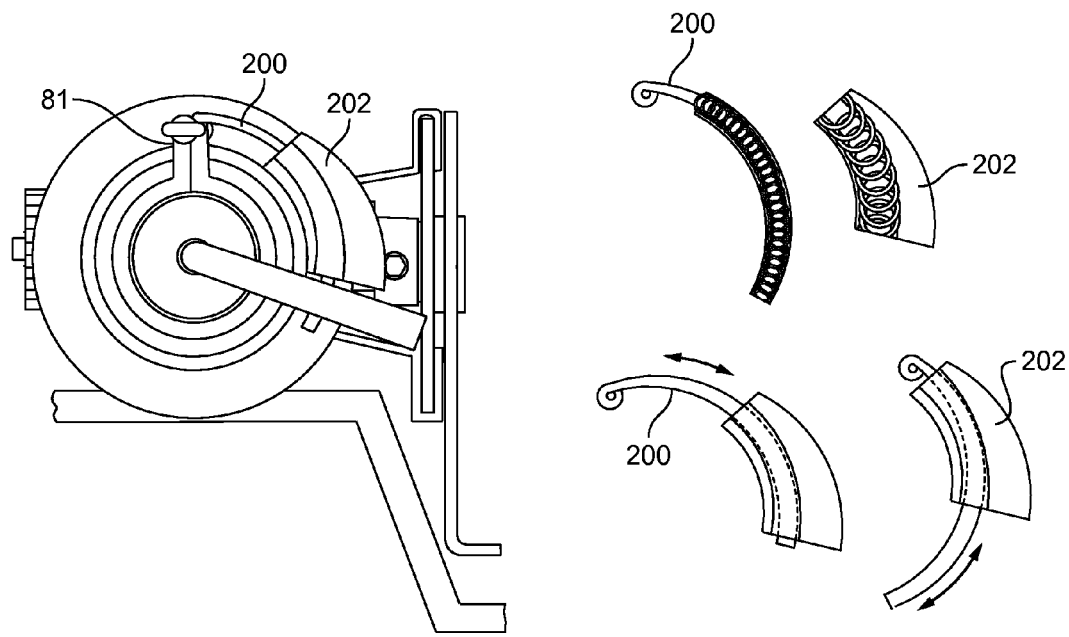
FIGS. 5a and 5b show respective modifications of the mechanism shown in FIG. 5.

FIG. 5a shows the wing control mechanism 81 connected to an operating member 200 of a linear motor 202, which will drive and subsequently release the (push and pull) bearing 73 to achieve the same effect on the wings 7. It will be appreciated that a linear motor can be selected that has the very rapid movement required, ie. at least 20 cycles per second.

Figure 5B:
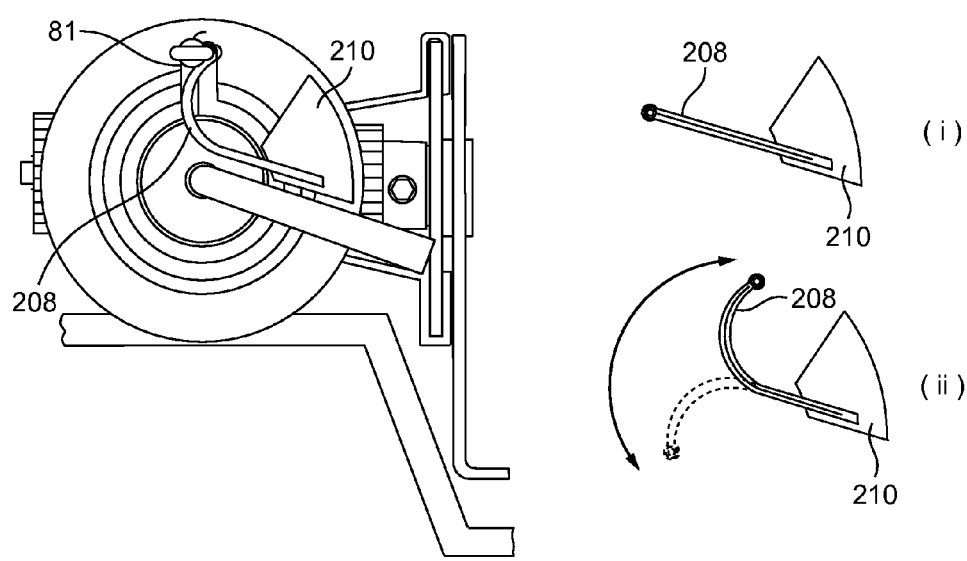

FIG. 5b shows yet another variation, wherein the wing control mechanism 81 is connected to an output member 208 of a prizo-electric actuator 210. FIG. 5b(i) shows the actuator 210 at rest, and FIG. 5b(ii) shows the actuator 210 in motion.

By applying an alternating current to the actuator 210, its output member 208 will be deflected one way and then the other, thus driving the control mechanism 81 forwards and then returning it. The frequency of movement and the length of travel of the member 208 is controlled by the frequency of the alternating current and its magnitude.

Referring now to FIG. 6, one of the articulated wings 7 is shown. As mentioned above, the wing 7 comprises first and second wing portions 7a, 7b. Each wing portion 7a, 7b is made of thin carbon fibre rods bent into shape to form a frame 103, 105. Within each frame is provided a web 107, 108, which can be in the form of a plastics sheet or other lightweight membrane secured to the edges of the frame to form the lifting surfaces. The first wing portion 7a is located to the rear of the second wing portion 7b, the overall appearance being similar to that of an aircraft wing having a main wing assembly and flaps located at one edge thereof. The two portions 7a, 7b are arranged to be moveable relative to one another.

The first and second wing portions 7a, 7b are connected by a hinge assembly 11 at one part, and by a clip 113 at the other. The clip 113 simply comprises a plastics member having two apertures through which part of the frame is threaded such that the frames 103, 105 can rotate within the aperture. The hinge assembly 111 comprises a member having two apertured paths 111a, 111b defined therein. At a rear part 115 of the hinge assembly 111, the first wing portion 7a is fixed. The frame 105 forming part of the rear of the second wing portion 7b passes through one of the apertured paths 111a of the hinge assembly 111 such that the second wing portion is able to move relative to the first wing portion 7a (which, as mentioned, is fixed to the hinge assembly). The other apertured path 111b of the hinge assembly 111, which is of a greater diameter than that through which the frame 105 of the second wing portion 7b is threaded, is provided for fitting the articulated wing 7 over the drive arm 69 of the wing drive mechanism 9 (as is indicated in FIG. 6).

Attached to a side part of the frame of the second wing portion is a control rod 117. As will be appreciated, forwards and backwards movement of the control rod 117 (as indicated by the arrows shown on FIG. 6) will cause the second wing portion 7b to move with respect to the first wing portion 7a, about the hinge assembly 111.

Referring to FIG. 1, which shows the articulated wings 7 in operative position on the body section 1 of the flying device, it will be seen that each wing 7 is placed over its respective drive arm 67, 69 by means of the hinge assembly 111, or more particularly, the larger diameter apertured path 111b of the hinge assembly. The wings 7 are not actually secured to the drive arms 67, 69, and are able to rotate about the axis of each drive arm. The control rod 117 of each wing is slidably located within a channel (not shown) in the universal ball joint 91 which is located at the end of the abutment surface 89 forming part of the control mechanism 81. It follows, therefore, that the operation of the wing control mechanism 81 will act to control the relative position of the second wing portion 7b with respect to the first wing portion 7a since the position of the control rod 117 will be determined by the motion of the control mechanism.

The operation of one of the wing drive mechanisms 9 and wings 7, (the second right-hand mechanism) when assembled, will now be described with reference to FIG. 7, which schematically shows its sequence of operation.

The purpose of the wing drive mechanism 9 (which includes the drive arm 69, the protrusion 71, the bearing 73 and the wing control mechanism 81) is to control the operation of the articulated wing 7 in a number of ways. Firstly, the bevelled gear arrangement causes the drive arm 69 to rotate, here in an anticlockwise direction.

Secondly, the wing control mechanism 81 acts to control the position of the wing 7 on the drive arm 69 (note that the wing is free to rotate about the axis of the drive arm) whilst the drive arm is rotating, and to control the relative positions of the first and second wing portions 7a, 7b with respect to each other whilst the drive arm is rotating. The overall effect is that the wing 7 will follow a predetermined cyclic motion both in terms of its motion with respect to the drive arm 69, and the relative motion between the two wing portions 7a, 7b.

In operation, there are four principal phases of wing operation. These phases will now be described with reference to FIGS. 6 and 7, which shows a partial side-view of the second wing assembly during a single cycle (i.e. a single rotation of the axle 65). The purpose of FIG. 7 is to show the relative positions of the first and second wing portions 7a, 7b with respect to each other (only one side of each frame 103, 105 being shown in FIG. 7), and the orientation of the overall wing 7 with respect to the axle 65, during each portion of a cycle.

Figure 7:
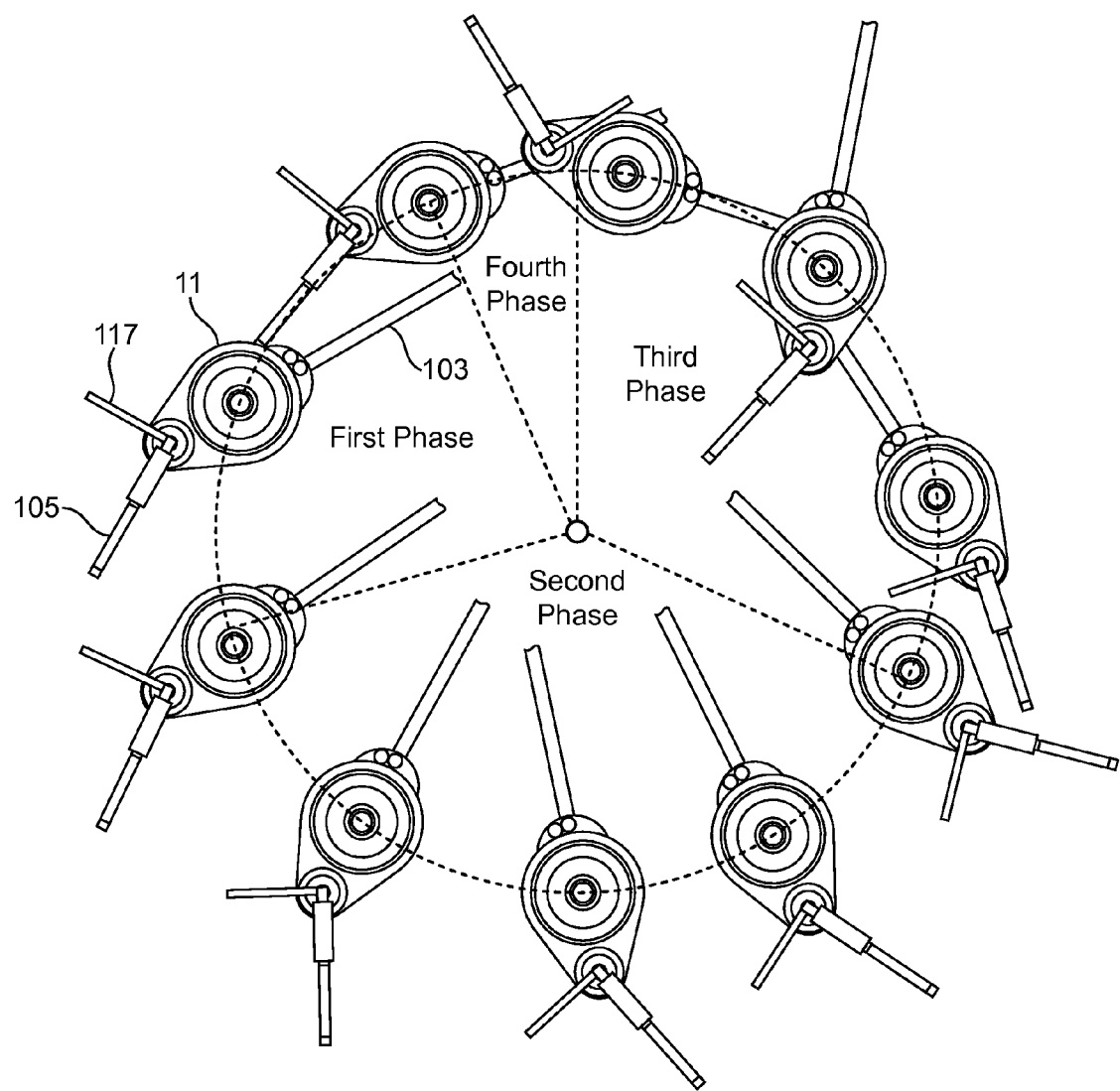
FIG. 7 is a schematic diagram showing the sequence of operation of the wing of the flying device.

In the first phase of the cycle, it can be seen that the first and second wing portions 7a, 7b are approximately 170° apart and the turning motion of the axle 65 not included in FIG. 7 imparts a cyclic motion on the wing 7 which moves around with the axle. This angle, forming a classic aerofoil shape, is effected by the position of the control arm 117 which is able to slidably move within the channel of the universal ball joint 91 (not shown in FIG. 7). At this time, the cam 99 on the protrusion 71 is not engaged with the abutment surface 89 of the wing control mechanism 81.

In the second phase, the cam 99 engages the abutment surface 89 on the control mechanism 81 which thereafter moves anticlockwise on its bearing 73, together with the axle 65. As mentioned above, during this phase, the coil spring 95 becomes tensioned. As FIG. 7 shows, the first and second wing portions 7a, 7b maintain their relative positions since the universal ball joint 91 turns with the control mechanism 81.

In the third phase, due partly to the tensioning of the coil spring 95 and partly to the size and shape of the cam 99, the cam slips under the abutment surface 89 and so the wing control mechanism 81 and bearing 73 suddenly return backwards due to the tensioned spring 95 releasing its stored energy. Since the universal ball joint 91 (which is on the end of the abutment surface 89) returns with the wing control mechanism 81, this sudden return movement causes the control arm 117 of the wing 7 to be pulled backwards and so the whole wing is rotated clockwise about the drive arm 69 (which itself continues to rotate anticlockwise with the axle 65). As a further consequence of the control arm 117 being pulled backwards by the wing control mechanism 81, the relative orientation of the first and second wing portions 7a, 7b also changes to be in the region of between 200° to 210°. This returning action is shown in FIG. 7.

It should be appreciated that the return action is very rapid, the speed being determined by the tensioning of the spring 87. All an observer will see is the sudden change of orientation of the two wing portions 7a, 7b. It is to be understood that this, third, phase will occupy significantly less time in the angle than the other phases. The return action is important in this particular 'flying application' since it enables efficient lift to be achieved, as will be explained.

In the fourth phase, the cyclic motion returns the first and second portions 7a, 7b of the articulated member back to the first orientation. This occurs as the wing 7 moves with the drive arm 69 and the control arm 117 again slidably moves within the channel of the universal ball joint 91.

The same operation applies to the opposite, first articulated wing, this being driven in unison with the second wing by the crown wheel and bevel pinion arrangement.

The effect of the above-described wing operation is to produce positive lift over the surface of the wings 7 for the majority of each cycle, thereby enabling the body section 1 to be lifted. During the first and second phases, it is clear that the wing 7 acts to push air down and to the rear of the body section, thus imparting positive lift. However, had the wings 7 continued to turn in the same direction, with the same relative orientation of the two wing portions 7a, 7b, the positive lift would become a negative lift as the wings would push the air upwards. Thus, the net effect would be no lift on the body section 1. However, here, due to the returning action of the wings 7 about the drive arm 69 and the change in orientation of the wing portions 7a, 7b, there is provided further positive lift. This can be seen in FIG. 7 (at the third cycle) where the returning action of the wing 7 acts to push air backwards and generally downwards. The repeating action of the wings 7 will result in positive lift being generated such that the overall flying device, including body section 1 and wings 3, 5, can lift-off a ground surface. The above four phases of movement occur for each cycle of the axle 65 (and so drive arm 69). Thus, when driven by the motor 15 (which may operate at a rate in the region of twenty revolutions per second) a large amount of positive lift is generated, and the flying device lifts off even though the body section 1 may be relatively bulky.

The above described operation of the wings 7 mimics the wing beat pattern of many flying species, such as a dragonfly.

The electrical parts of the flying device (i.e. the receiver/controller 43, the motor 15, and first and second servos 39, 41) are powered by a battery pack (not shown) which is preferably located on the body section 1 of the flying device. The receiver/controller 43 receives, via an antenna (not shown), control signals from a remote control device (not shown) which enables user-control of the motor's speed of operation, and so ultimately the speed at which the wings 7 'beat'. The remote control device also includes a joystick for controlling the front to back, and side to side movement of the flying device. The received signals are converted into (i) a power signal which is passed to the motor 15 for controlling its speed, (ii) a control signal which is fed to the first servo 39 to control side to side movement of the wings 7, and (iii) a further control signal which is fed to the second servo 41 to control front to back movement of the wings. When no directional control is imparted on the joystick of the remote control device, the first and second servos 39, 41 retain the control mechanism 31 at a neutral position which results in the flying device hovering in mid air. Left and right movement would result in the flying device turning in mid-air. By increasing the speed of the motor 15, the flying device will lift upwards, and by decreasing the speed of the motor, the flying device will move downwards, to land, for example.

The flying characteristic of the flying device can be modified since the control mechanism 31 each wing apparatus 3, 5 includes an adjusting screw 120, seen most clearly in FIGS. 2 and 5. The screw 120 is held in a threaded bore in the second spar 79 of the anchor 75. This adjusting screw 120 enables the 'attack' angle at which the wing 7 operates in the forwards direction to be modified. The adjusting screw 120 sets the position of the return mechanism 87 when it is not being turned by the cam 99, i.e. during the first phase of operation. When the return mechanism 87 moves backwards, the adjusting screw 120 limits the return length.

As disclosed, the drive of the device is provided by the single motor 15 and the bevel gear mechanism. However, it is envisaged that the gearbox arrangement may be dispensed with and a single motor may be arranged to drive the wing systems directly. This results in a simplified and lighter weight device.

In an alternative configuration, the motor 15 could be replaced by two separate motors, one being used to drive each wing drive mechanism. The two motors would be smaller in size. Such an arrangement would provide improved agility since the speed of each wing 7 could be controlled separately. Thus turning left and right could be effected in a different way and some of the control mechanism 87 described above would not be required to control left and right movement.

In a yet further configuration, power could be delivered not by an electrical motor, but by a fuel-based system for powering a small engine.

As will be understood, wing size and shape will have a direct bearing on the wing performance. By providing larger wings, it may be possible to lift a body having significant weight. The membrane of the wing could be made from conventional materials such as polythene, stretched over the wing frames and fixed in place by glue.

For testing purposes, a tuning device comprising a shaft having a tuning cog at one end thereof may be provided. This can be positioned between the first and second drive wheels, opposite the drive cog, so that the tuning cog meshes with the inner teeth of the drive wheels 61, 63. Thus, by turning the shaft, the drive mechanisms, and the position of the two wings 7, can be observed and any required adjustment made.

The motor 15 represented in the Figures is based on a 12 volt motor 15 having a no-load speed of 14,000 revolutions per minute. In fact, it is considered that only one third of this output is required, and so a smaller motor may be used.

Figure 8:
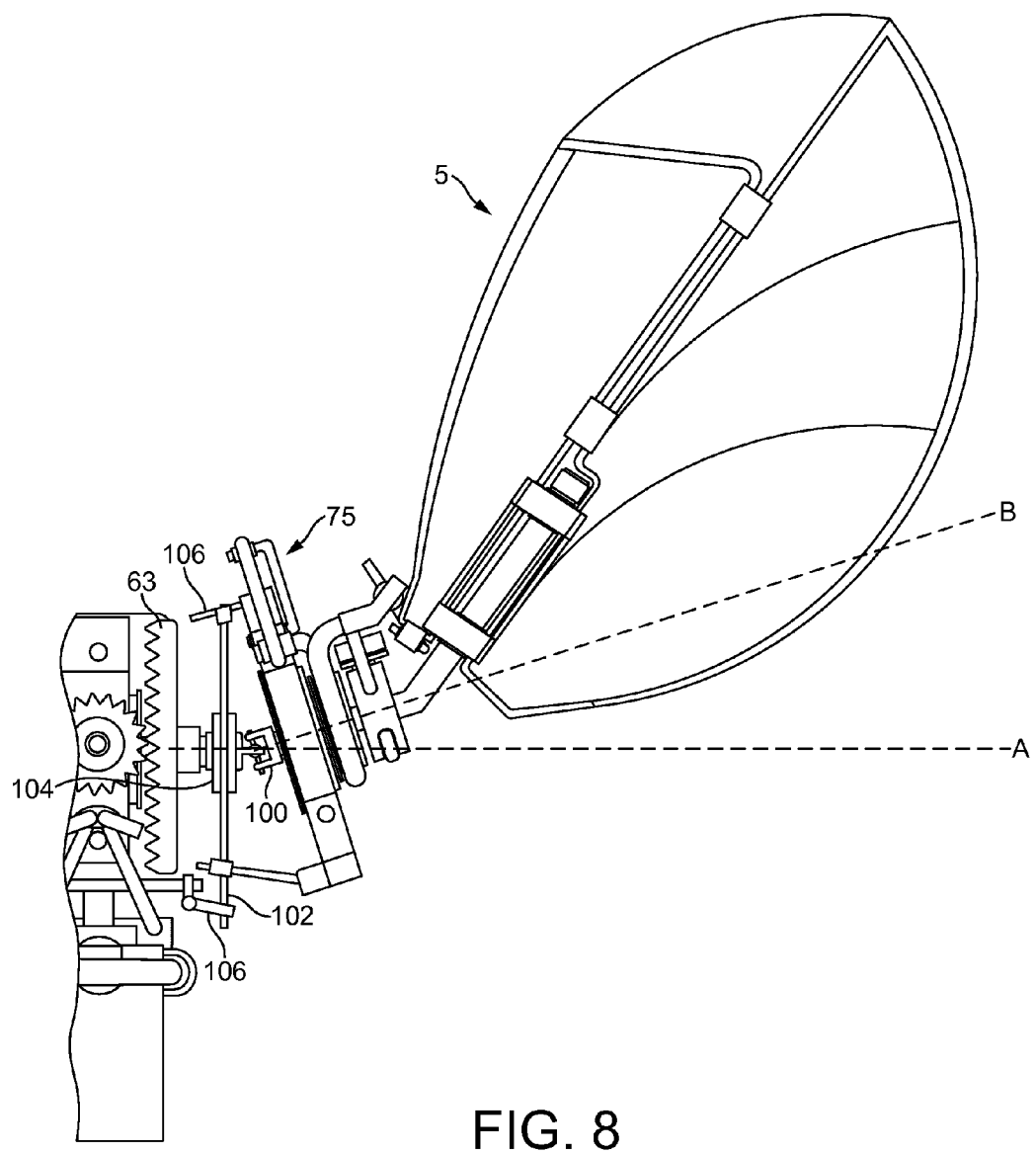
FIG. 8 is a front view of one side of a flying device that is modified with respect to the device shown in FIG. 1.

In a modification of the present assembly shown in FIG. 8, the flying device of FIG. 1 may be provided with a universal joint 100 interposed on each side between the bevel gear mechanism and the respective anchor 75. A thrust plate 102 is secured via a bearing 104 to the axle of the drive wheel 63, and a continuation of the axle provides the input to the universal joint 100, whose output is connected to the anchor 75, which carries the wing 5. The angle of inclination, up and down, backward and forward, of the joint 100 is adjustable by means of screws 106. This angle may then be fixed, or alternatively it may be adjustable during flight of the device. The line A in FIG. 8 indicates the angle of the wing 5 without the universal joint, or with the joint 100 set to a neutral position. The line B indicates the deflected angle of the wing 5 as adjusted by the universal joint 100. It will be appreciated that a complementary arrangement will be provided on the opposite side of the bevel gear mechanism in respect of the wing 3.

In this way, the eccentricity introduced into the movement of the wings 3,5 can result in them moving towards each other at the top of their paths of movement, and then moving downwards and away from each other.

As far as materials are concerned, clearly it would be advantageous for lightweight material to be used for the overall mechanism, such as a composite material which will also provide additional strength.

A modification of the wing drive mechanism 9 described above (with reference to FIG. 5) is shown in FIG. 9. This modified wing drive mechanism 250 is more straightforward in structure and operation, and can be produced efficiently and cheaply.

Referring to FIG. 9, the wing drive mechanism 250 does not utilise the second drive wheel 63 shown in FIG. 5, but a different assembly is employed. The different assembly comprises a central ring member 252 which rotates with the drive arm 69. Arranged concentrically around the central ring member 252 is a first bearing 260, which is itself surrounded by a first ring member 254. Arranged concentrically around the first ring member 254 is a second bearing 258, and arranged around the second bearing is a second ring member 256. Thus, the second ring member 256 is able to rotate independently of the first ring member 254, and both the first and second ring members are able to rotate independently of the central ring member 252.

A rod 262 extends outwardly from the first ring member 254, the rod including, at one end, a ball-joint 264 having formed therein a passage into which the control rod 117 of the wing portion (in this case the second wing portion) can be slidably located, in a manner corresponding to that described above with reference to FIG. 6.

A return mechanism 270 is provided on the wing drive mechanism 250. The return mechanism 270 comprises a first link member 270a which is pivotally mounted to the first ring member 254 by an abutment connection 257. A second, generally L-shaped link member 270b is attached at a first end to the first link member 270a by means of a joint 272a. The link member 270b has an inwardly extending part 270b' integrally formed therewith. The link member 270b is connected to the second ring member 256 by a pivot connection 272b.

The wing drive mechanism 250 further includes a cam arrangement (not shown) which will be described below with reference to FIG. 10.

Figure 10B:
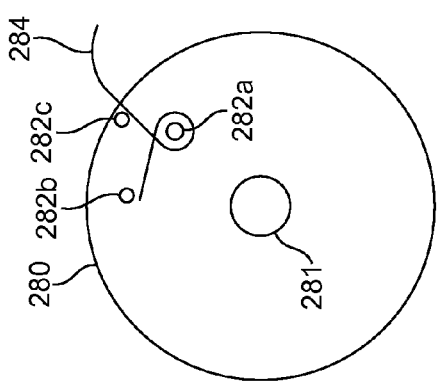
Figure 10C:
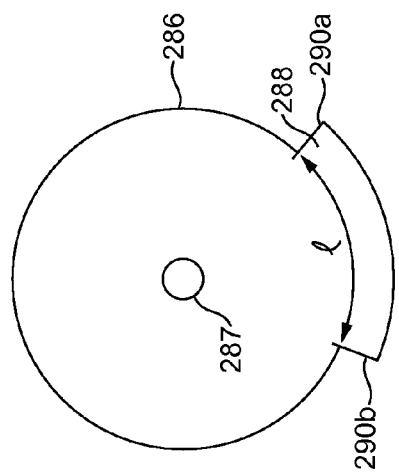
Figure 10A:
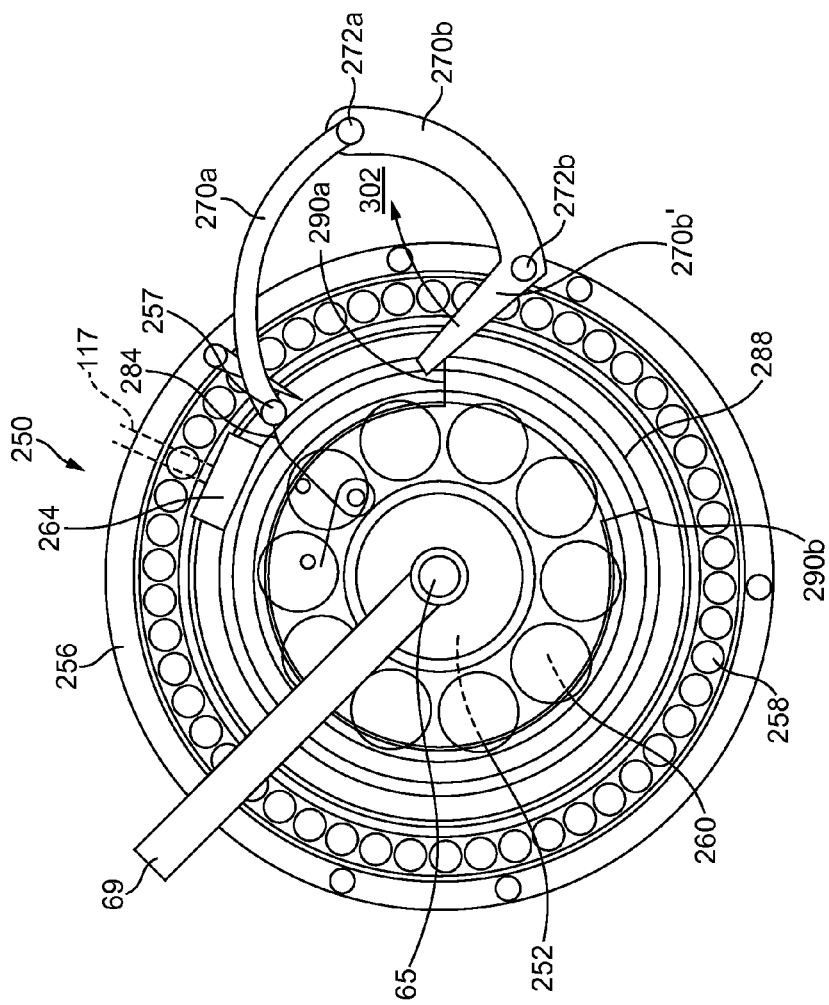

Referring to FIG. 10a, a plan view of the wing drive mechanism 250 is shown, the wing drive mechanism including a cam arrangement which comprises first and second disk members 280, 286 (shown separately in FIGS. 10b and 10c). First disk member 280, shown in FIG. 10b, comprises a generally planar disk having a central hole 281, three lugs 282a, 282b, 282c, and a tension spring 284 formed from a strip of metal. The tension spring 284 is bent such that it is located over the second, cental lug 282a, with one free end being situated adjacent the first lug 282b, and the other free end extending past the periphery of the planar disk, and adjacent the third lug 282c. Second disk member 286, shown in FIG. 10c, comprises a generally planar disk having a central hole 287, and a cam portion 288 extending from a periphery of the planar disk. The cam portion 288 is of predetermined length l, and has a leading edge 290a and a trailing edge 290b.

Referring back to FIG. 10a, the first disk member 280 is arranged over the axle 65, which passes through the central hole 281. Likewise, the second disk member 286 is arranged over the axle 65, which passes through the central hole 287. The second disk member is connected to the first disk member 280 such that the two disk members are able to rotatably move together, about the axle 65.

The operation of the wing drive mechanism 250 will now be described.

When the flying device is operated, i.e. driven by means of the motor or gear arrangements previously mentioned, the axle 65 rotates and the first and second cam members 280, 286 also rotate in unison with the inner ring member 252. It is assumed here that rotation will be in the anti-clockwise direction. As mentioned previously, a free end of the tension spring 284 extends beyond the periphery of the planar disks of the first and second cam members 280, 286, such that, as the free end reaches the abutment connection 257, the first ring member 254 begins to move in an anti-clockwise direction and the spring becomes tensioned (energy being stored therein). At almost the same time as the tension spring 284 becomes tensioned, the leading edge 290a of the cam portion 288 abuts the inwardly extending part 270b' of the link member 270b and thus causes the link member to rotate in the direction indicated by the arrow 302. This causes the first link member 270a to be pulled downwards and maintains the tension in the spring 284. As the first and second cam members 280, 286 continue to rotate in an anti-clockwise direction, the inwardly extending part 270b' of the second link member 270b slides along the peripheral surface of the cam portion 288 until the point where the trailing edge 290b is reached. At this point, the inwardly extending part 270b' returns backwards (i.e. in the direction generally opposite that indicated by the arrow 302) and the energy stored in the tension spring 284 is released. This release of energy causes the first ring member 254 to return, abruptly, in the clockwise direction.

Thus, in a single cycle of rotation of the cam arrangement (made up of the first and second cam members 280, 286) the first ring member 254 is caused to move in one direction, and then to return abruptly in the counter direction. Thus, the wing drive mechanism 250 achieves a similar movement action compared to that of the wing drive mechanism 9 shown in FIG. 5. It will be appreciated that since the control rod 117 of one of the wing portions will be slidably located within the ball joint 264 of the rod 262, movement of the first ring member 254 will act to control the orientation of the first and second wing portions 7a, 7b (with respect to one another) in a way corresponding to that achieved by the wing drive mechanism 9. However, the wing drive mechanism 250 achieves this control by means of a much more straightforward mechanism.

In order to stabilise the rotational movement of the second ring member 256, counter weights can be provided on the periphery of the ring member. The effect achieved in a manner corresponding to a balancing operation performed on a conventional wheel, e.g. on a car.

Figure 10D:
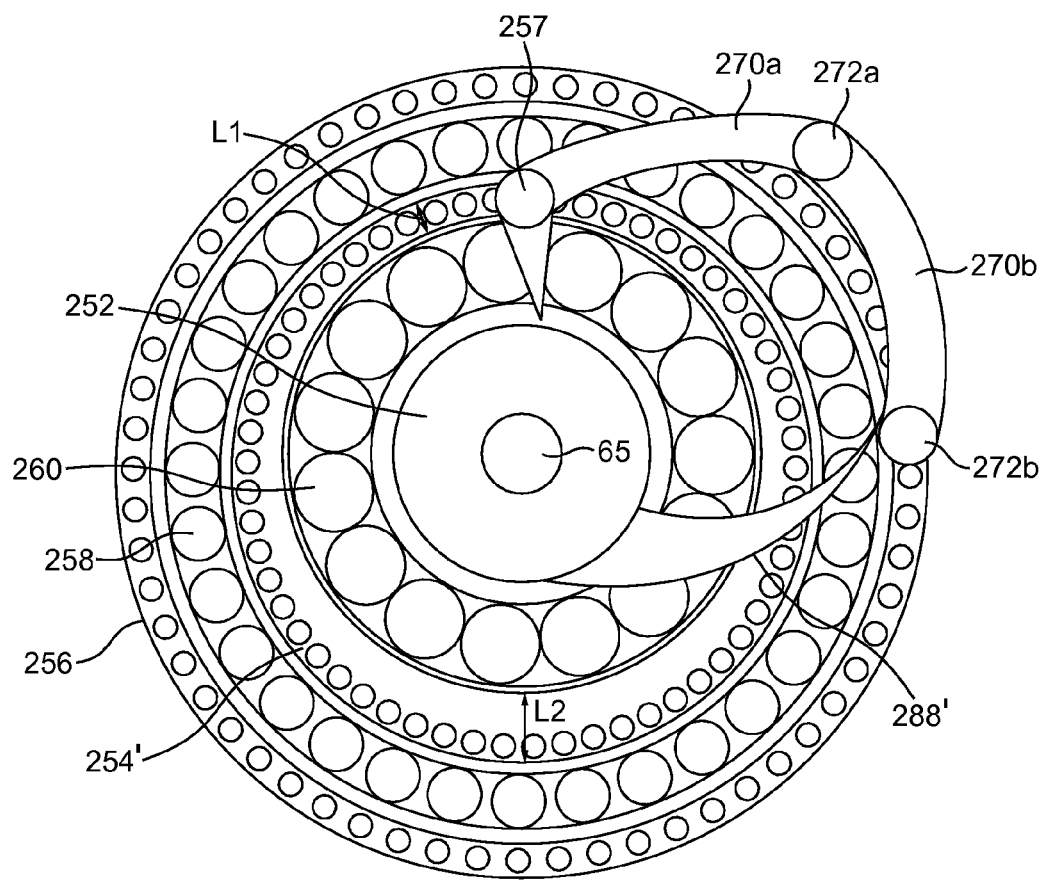

Referring to FIG. 10d, a modification of the wing drive mechanism 250 shown in FIGS. 9 and 10a to 10c is shown. The drive mechanism has the same construction as that shown in these Figures, except that the first ring member 254' is formed so as to be slightly off-centre from the central axle 65. Thus, it will be seen in FIG. 10d that the width of the exposed part of the first ring member 254' is greater at one side (indicated by $L_2$) than the exposed part which is diametrically opposite (indicated by $L_1$). Further, a different cam member 288' is employed, the cam member comprising a spur attached to the central ring member 252. In operation, the cam member 288' rotates, in this case in a clockwise direction, and strikes the pivot connection 272b which causes the link members 270a, 270b to extend in the same way as before, thus causing the required initial movement of the control rod 117 of one of the wing members. As the cam member 288' continues to rotate clockwise, the off-centre arrangement of the first ring member 254' will cause the pivot connection 272b to gradually move radially outwards. When the pivot connection 272b reaches the extreme tip end of the cam member 288' it is disengages from the cam member 288' and so abruptly returns backwards in a flick-type manner due to the stored energy in the link members 270a, 270b. Thus, the required return motion is imparted on the control rod 117 of the attached wing member.

It will be appreciated that the arrangement shown in FIG. 10d is less complex than that shown in FIGS. 9 and 10a to 10c.

Figure 11A:
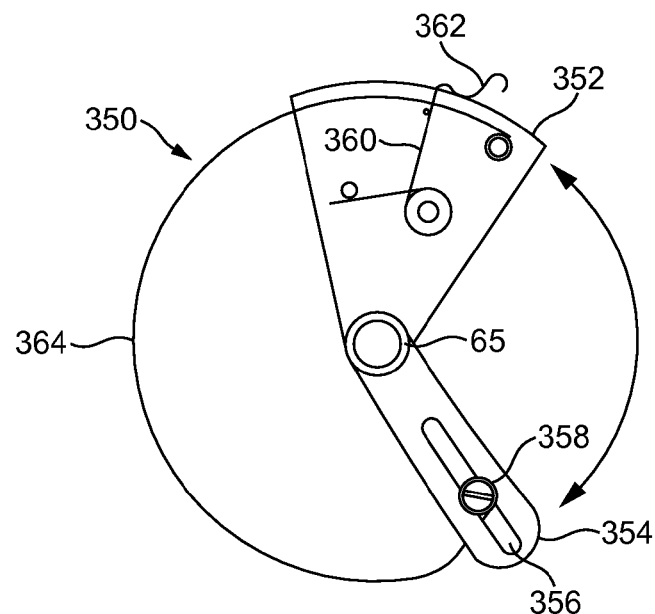

Referring to FIG. 11a, a further embodiment of a cam arrangement indicated generally by the reference numeral 350 is shown. In a manner corresponding to the cam arrangement described with reference to FIGS. 9 and 10, the cam arrangement 350 is positioned adjacent the wing drive mechanism 250. The cam arrangement 350 comprises a substantially triangular cam plate 352 and an elongate strike plate 354, both plates being arranged to rotate about the axle 65. The strike plate 354 has an elongate slot 356 formed therein, within which is provided a locking screw 358, the purpose of which will be explained below. Attached to one face of the cam plate 352 is a torsion spring 360, arranged in substantially the same way as the torsion spring 384 shown in FIG. 10, with the exception that the torsion spring 360 is formed with a cupped end 362. A cam guide rail 364 is provided in the form of a thin flat strip that extends perpendicular in the plane of FIG. 11a, and which is bent into an arcuate shape. The purpose of the cam guide rail 364 is to maintain the wing at a desired angle during an upstroke cycle of the wing.

Figure 11B:
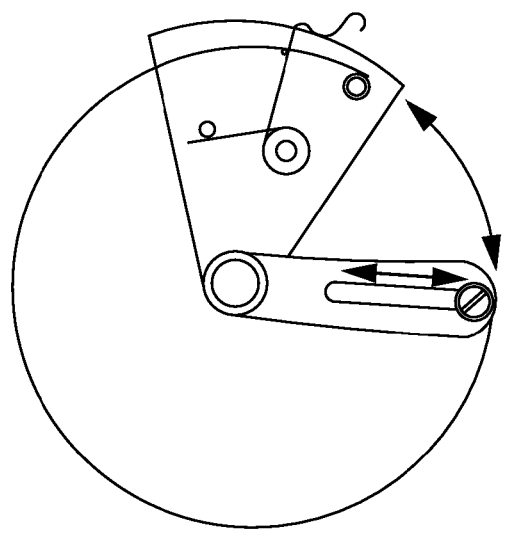

As FIG. 11b shows, the position of the strike plate 354 can be adjusted in relation to cam plate 354, and the locking screw 358 can be slidably moved within the slot 356 to a desired position. The screw 358 is then tightened to maintain its position within the slot.

A return mechanism 370 (shown in FIG. 11c) is also provided, the return mechanism being similar in construction to that described previously. The return mechanism 370 comprises a first link member 370a and a second, generally L-shaped link member 370b which is attached at a first end to the first link member 370a by means of a joint 372a. The generally L-shaped member 370b is made up of two portions 370b', 370b" which are integrally formed together, the second portion 370b" extending towards the axle 65.

The operation of the cam assembly 350 will now be described with reference to FIGS. 11c to 11f.

Figure 11C:
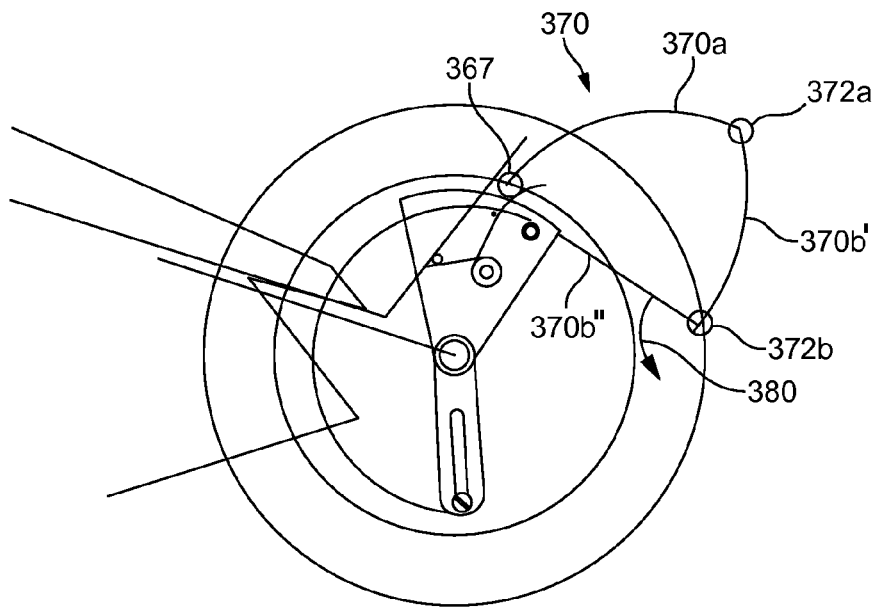

Referring to FIG. 11c, as the axle 65 rotates, the cam plate 352 also rotates and the cupped end 362 of the torsion spring 360 captures the rod 262 which extends out of the first ring member 254 of the wing drive mechanism 250. As the cam plate 253 continues to rotate, the torsion spring 360 moves in the same direction thereby causing the rod 262 to rotate also (in the manner described above with reference to FIGS. 9 and 10). Movement of the rod 262 causes the first link member 370a to be moved also, resulting in the inwardly extending part 370b' of the second link member 370b being moved in the direction indicated by the arrow 380. As the cam plate 352 continues to rotate, the striking plate 358 also rotates.

Figure 11D:
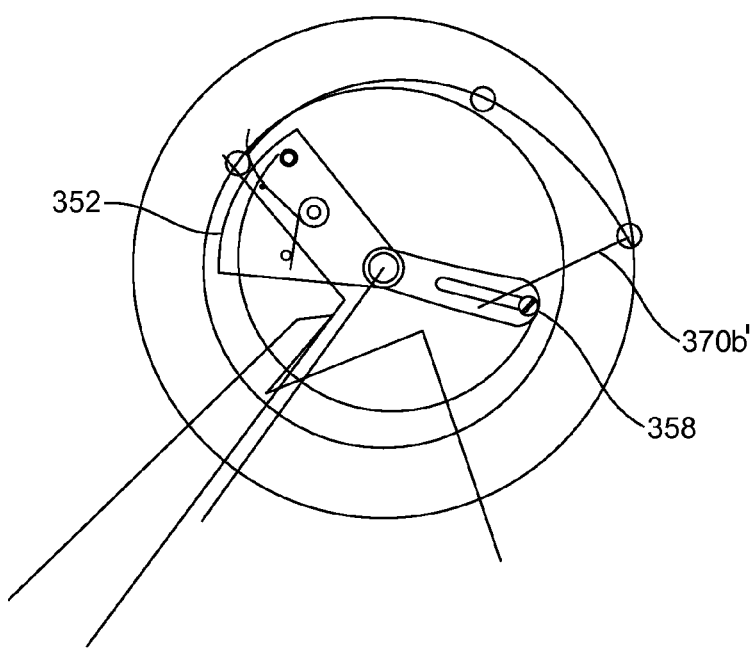
Figure 11E:
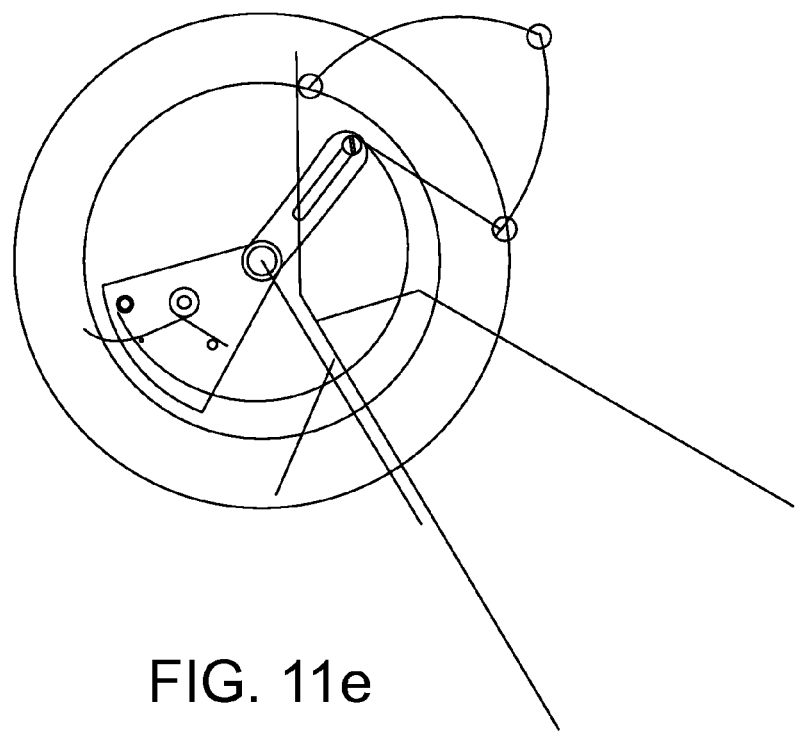
Figure 11F:
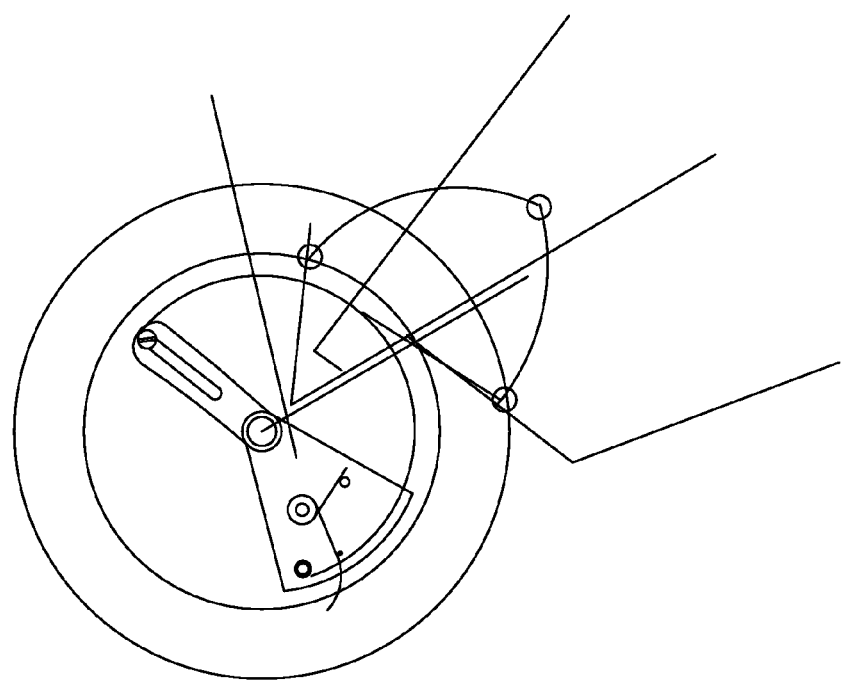

Referring to FIG. 11d, at a predetermined point in the rotation cycle, which is dictated by the relative angle between the cam plate 352 and the strike plate 354, the locking screw 358 within the slot 356 of the strike plate 354 comes into abutment with the inwardly extending part 370b' of the second link member 370b. As the strike plate 354 continues to rotate, the locking screw 358 presses against the inwardly extending part 370b' such that the rod 262 is released from the cupped end 362 of the torsion spring 360 and so the first ring member 254 returns abruptly backwards as stored energy us released from the torsion spring. The position of the components making up the cam assembly 350 and the return mechanism 370 after release is shown in FIG. 11e. The cycle then repeats itself, as indicated in FIG. 11f.

As will be appreciated, the position of the locking nut 358 along the slot 356 of the strike plate 354 will influence the time at which the rod 262 disengages the cupped end 362 of the torsion spring 360. Effectively, the position of the locking nut 358 determines the length of the flip cycle in relation to the overall rotation speed. As the locking nut 358 gets nearer to the axle 65, the resulting flip cycle becomes longer.

Referring to FIG. 12, a side view of a wing drive mechanism, including the cam arrangement of FIG. 11, is shown. The wing drive mechanism is substantially the same as that shown in FIG. 8. Here, however, the cam arrangement 350 is situated between the wheel assembly and the body of the flying device. In this case, the rod 262 extends through the wheel assembly so that the cupped end 362 of the torsion spring 360 can engage the rod.

A number of wing drive mechanisms have been described above, the mechanisms being arranged such that the wing portions 3, 5 fitted over the drive arm 69 of each of the left and right-hand mechanisms are moved over a generally rotary path. A number of wing drive mechanisms will now be described wherein the mechanisms are arranged such that the drive arm 69 of each of the left and right-hand mechanisms move in a generally linear path.

A first 'linear-type' wing drive mechanism 400 is shown in FIG. 13, this wing drive mechanism being arranged such that the wing portions 3, 5, which in the finished assembly are fitted over the drive arm 69, are moved along a linear path. This linear path is cyclic, the wing portions 3, 5 being arranged to move upwards and downwards, or indeed from side to side, in a reciprocating manner.

Referring to FIG. 13, this first linear-type wing drive mechanism 400 comprises a pancake motor 402 around which is fitted an outer ring 404. The outer ring 404 is connected to the periphery of the pancake motor 402 by means of two swivel joints 406', 406" which are located generally opposite one another. Thus, the pancake motor 402 is able to swivel relative to the outer ring 404. A shaft 416 protrudes from a center of the pancake motor 402, the shaft 416 and the drive arm 69 rotating together when the pancake motor is operated. A cam 412 is attached to one side of the shaft 402 so that the cam rotates with the shaft 402 (as indicated by the arrow 420). A guide member 408 spans the diameter of the outer ring and is fixed to the outer ring 402 at positions adjacent the swivel joints 406', 406". The guide member 408 comprises two upstanding parts 408a, 408b, and an arcuate central part 408c. The cam 42 is slidably engaged with the underside of the central part 408c of the guide member 408.

In use, the pancake motor 402 is operated so that the shaft 416 and the drive arm 69 rotate together. As the cam 412 rotates with the shaft 416, as indicated by the arrow 420, the slidable engagement with the central part 408c of the guide member 408 causes the pancake motor 402 to swivel about the two swivel joints 406', 406" relative to the outer ring 404 (the swivel motion being indicated by the arrow 422). The cam 412 slides along the central part 408c of the guide member 408 until the cam has completed a half rotation around the shaft 416. At this point, the cam 412 slides backwards along the underside of the central part 408c of the guide member 408 and the pancake motor 402 swivels about the two swivel joints 406', 406" in the opposite direction. The cyclic motion is repeated as the pancake motor 402 continues to rotate the shaft 416, the cam moving along the central part 408c of the guide member 408 in a reciprocating manner, as indicated by the arrow 424. The result is that the pancake motor 402, and so the drive arm 69, move back and forth in a linear manner due to the repeating swivel motion of the pancake motor 402 relative to the outer ring 404.

It will be understood that FIG. 13 shows the wing drive mechanism 400 from the inner side, that is from the side connected to the body section 1. A view of the outer side of the wing drive mechanism 400, namely the side projecting away from the body section 1, is not shown in the drawings, but it should be appreciated that it is substantially the same as the outer side of the wing drive mechanism 250 shown and described with reference to FIG. 9. The only substantial difference is that the outer ring 404 is connected to the second ring member 256 by the two swivel joints 406', 406".

Still referring to FIG. 13, a modification for use on the wing drive mechanism is represented by dotted lines. The modification comprises a control servo 430 which operates a control shaft 432 which is connected to the guide member 408. Specifically, operation of the control servo 430 causes the control shaft 432 to move inwards and outwards with respect to the motor 402, as indicated by the arrow 434. This modification also requires the upstanding parts 408a, 408b of the guide member 408 to be hingedly connected (not shown) to the outer ring 404. Thus, operation of the control servo 430 will cause the guide member 408 to be either pushed away from, or pulled towards, the control servo. As the pancake motor 402 is operated in the manner described above, the resultant reciprocating motion of the drive arm 69 is performed at a slightly different pitch angle. Thus, a wing portions 3, 5 fitted over the drive arm 69 will move at a different angle and thus the flying characteristic of the flying device can be adjustably controlled.

A second linear-type wing drive mechanism 500 is shown in FIG. 14. Referring to FIG. 14, the further wing drive mechanism 500 is similar to that shown in FIG. 13 in that the mechanism comprises a pancake motor 402 fixed within an outer ring 404 by swivel joints 406', 406" so that the pancake motor swivels back and forth relative to the outer ring in the direction indicated generally by the arrow 422. However, in this case, torsion springs (not shown) act on the swivel joints 406', 406", the purpose of which is explained below. A shaft 440, which is arranged to rotate with the drive arm 69, extends from the rear surface of the pancake motor 402. The shaft has a cam arm 442 extending radially therefrom. A guide member 444 spans the pancake motor 402, and is fixed to the outer ring 404 by two opposing upstanding members 444a, 444b, with a central spanning member 444c being connected therebetween. First and second strike members 446a, 446b extend downwards from the underside of the central spanning member 444c at suitably spaced positions such that, as the cam arm 442 rotates, it makes contact successively with each of the first and second strike members 446a, 446b.

In operation, when the pancake motor 402 is operated, the shaft 440 and the cam arm 442 rotate with the drive arm 69. Initially, the cam arm 442 contacts the first strike member 446a thereby causing the pancake motor 402 to swivel about the swivel joints 406', 406". Accordingly, the pancake motor 402 and the drive arm 69 move in a first linear direction. As the shaft 440, the cam arm 442, and the drive arm 69 continue to rotate past the first strike member 446a, the torsion springs act on the swivel joints 406', 406" to cause the pancake motor 402 to return towards its initial position. The cam arm 442 then continues its rotation to contact the second strike member 446b. The pancake motor 402 again swivels about the swivel joints 406', 406". Accordingly, the drive arm 69 moves in a second linear direction, opposite to the first direction mentioned above. Again, the torsion springs will act to cause the pancake motor 402 to return back to the initial position after the cam arm 442 has passed the second strike member 446b. The result is that the drive arm 69 moves in a reciprocating linear motion, which motion can be imparted on a wing portion fitted over the drive arm 69. The torsion springs can be suitably arranged so that the return motion of the pancake motor 402 occurs at a resonant frequency which is appropriate such that a reciprocity linear motion is achieved.

A third linear-type wing drive mechanism 500' is shown in plan view in FIG. 15. This third linear-type wing drive mechanism 500' is shown enclosed within a mounting cage 510, this mounting cage being described more fully below with reference to FIG. 18. Referring back to FIG. 15, part of the mounting cage 510, namely a mounting ring 512, is shown located around the circumference of the modified wing drive mechanism 500'.

The third linear-type wing drive mechanism 500' is arranged to enable adjustment of the angle of the reciprocating linear motion provided by the second linear-type wing drive mechanism 500 described previously. Such angle adjustment is preferable for providing controllable motion of an overall flying device employing such wing drive mechanisms. In other words, in order for such a flying device to move upwards, downwards, sidewards, or even to rotate, it is useful for adjustment of the or each wing drive mechanism provided on such a flying device to be catered for. Since a number of components used in the second linear-type wing drive mechanism 500 are the same as those used in the third linear-type wing drive mechanism 500', like reference numerals are used.

The third linear-type wing drive mechanism 500' does not use a pancake motor (as used in the mechanism shown in FIG. 14). Accordingly, the mechanism 500' is much simpler and lighter to produce. Instead, the third linear-type wing drive mechanism 500' is driven from a central motor (not shown) which, in fact, drives two such modified wing drive mechanisms 500' (i.e. a right and a left-handed mechanism)—see FIG. 18. This is performed in a manner similar to that used to drive the wing drive mechanism 9 described previously with reference to FIG. 1. This drive is illustrated by FIG. 16 which is a simplified side-schematic view of the third linear-type wing drive mechanism 500' in three different positions. Although FIG. 16 will be discussed in greater detail below, it is to be noted that a drive shaft 440 extends upwards from a central motor, represented by the numeral 'M', by means of a universal joint 530.

Referring back to FIG. 15, an outer ring 404 of the third linear-type wing drive mechanism 500' is mounted on a bearing ring 462 such that it can rotatably move in relation to the mounting ring 512.

The plan view shown in FIG. 15 shows the inner side of the wing drive mechanism 500' which is to be attached to the central motor that drives the mechanism. Although the drive arm 69' over which a wing portion will be attached is not seen in FIG. 15, although this can be seen in the side-schematic view of FIG. 16.

Referring to FIG. 15, a cam arm 442 is arranged on the drive shaft 440. Rotation of the drive shaft 440 results in the cam arm 442 periodically contacting first and second strike members 470, 472. (As well as having no pancake motor,) a different guide member 460 is also provided. Over the guide member 460 is slidably mounted the first and second strike members 470, 472 which are retained either side of a cam carriage 464 onto which is mounted the cam arm 442. The cam carriage 464 is also slidably mounted over the guide member 460. First and second retaining members 466, 468 retain the first and second strike members 470, 472 in fixed relation to the cam carriage 464 with first and second springs 474, 476 being interposed between the first and second strike members and the cam carriage 464. Referring to FIG. 16, it can be seen that the guide member spans across the outer ring 404 in an arcuate manner. The first and second abutment members 466, 468 (adjacent to which are the first and second strike members 470, 472) and the cam carriage 464 are shown in the above-mentioned fixed relationship, with the first and second springs being covered by a sleeve 532.

Referring to both FIGS. 15 and 16, the above-mentioned contacting action between the cam arm 442, and the first and second strike members 470, 472, results in a linear reciprocating motion being imparted on the drive arm 69'. Thus, when the cam arm 442 rotates and contacts the first strike member 470, the second spring 476 becomes compressed as the cam carriage 464 is forced against it. This results in linear motion being imparted on the drive arm 69' in a first direction, as indicated in FIG. 16(b). As rotation of the cam arm 442 continues, at the time when the second strike member 472 is contacted, the first spring 474 becomes compressed as the cam carriage 464 is forced in the opposite direction. This results in linear motion being imparted on the drive arm 69' in a second direction, as indicated in FIG. 16(*c*). As rotation of the cam arm 442 repeats, a reciprocating linear motion results.

Referring back to FIG. 15, a control servo 480 is attached to the outer ring 404 of the modified wing drive mechanism 500', a control arm 482 extending from the control servo 480 and being fixed to the second retaining member 468. Accordingly, operation of the control servo 480 will cause slidable movement of the second retaining member 468, and thus of the entire assembly comprising the first retaining member 466, the first strike member 470, the first spring 474, the cam carriage 464, the second spring 476, and the second strike member 472, along the guide member 460. This results in adjustable movement of the drive arm 69 (not shown in FIG. 15) which enables the flying characteristic of a flying device employing the third linear-type wing drive mechanism 500' to be adjusted.

A further control servo 484 is attached to the mounting ring 512, the further control servo being arranged to cause rotation of the modified wing mechanism 500', in relation to the mounting ring 512, over the bearing means 462.

Thus, two control mechanisms are provided that enable the relative position of the modified wing mechanism 500' to be adjusted in relation to the mounting ring 512.

For completeness, FIG. 17 shows a detailed view of the cam carriage 464, shown in plan view in FIG. 15 and in schematic view in FIG. 16. It will be noted that a rod 520 extends outwardly from the drive arm 69', the rod including, at one end, a ball-joint 522 having formed therein a passage into which the control rod 117 of a wing member can be slidably located. As will be appreciated from the description above, movement of the rod 520 will result in relative movement between the first and second wing portions of such a wing member.

As briefly mentioned above, FIG. 18 shows a mounting cage 510 which is particularly useful for holding a pair of the wing drive mechanisms shown in FIG. 15. The mounting cage 510 forms the body section 1 of a flying device, e.g. as fully described above. The mounting cage 510 comprises a pair of opposing mounting rings 512 within which can be positioned respective opposing wing drive mechanisms, i.e. one right-hand mechanism and one left-hand mechanism. Two wing drive mechanisms 500' shown in FIG. 15 are fitted within the mounting cage 510 by means of fixing the outer ring 404 of the mechanism to the inner surface of a respective mounting ring 512. It will also be seen that two rear spars 513 extend downwards from the top region of the mounting rings 512 towards an underside surface 514. A top surface 515 connects the top region of the mounting rings 512. A motor component 516 is shown positioned within the mounting cage 510 so as to illustrate one possible mounting position of the motor. A motor shaft 516*a* of the motor component 516 is shown, the shaft being configured for appropriate connection to a respective drive shaft 440 (see FIG. 16) of a left and right handed wing drive mechanism, e.g. via a universal joint.

FIG. 19 shows a third linear-type wing drive mechanism 500' adjacent the mounting cage 510, the arrow 560 indicating that, in the assembled article, the universal joint 530 is connected to the motor shaft 516*a* of the motor component 516. As mentioned above, the outer ring 404 of the wing drive mechanism is connected with the inner surface of the mounting ring 512. The wing drive mechanism 500' shown has a wing member located over the drive arm 69'. It will be appreciated that in a complete flying device, two such wing drive mechanism 500' will be provided on opposing sides of the mounting cage 510.

FIG. 19A shows an further flying device 650 which is constructionally different to that described previously. The further flying device 650 comprises a body 652, and first to fourth wings 654, 656, 658, 660 which are connected to the body by respective wing shafts 655, 657, 659, 661. The wing shafts 655, 657, 659, 661 are mounted on the outer casing of the body 652 by means of bearings. For ease of explanation, only two bearings 675, 676, corresponding respectively to the first and second wing shafts 655, 657 are shown. Each bearing 657, 676 is connected to the body 652 by a respective pivot screw 682, 683. The further flying device 650 is arranged to mimic the flying characteristic of a butterfly, hence the four winged arrangement.

FIG. 19B shows the body 652 of the further flying device 650 in greater detail. Two solenoids 672 are provided within the body 652, each solenoid having a piston arm which is caused to move forwards and backwards in a controlled reciprocating manner. The piston arm of the solenoid 672 on the left-hand side of the body 652 is attached at one end to a crank arm 680 of the first wing shaft 655, and at the other end to a crank arm 681 of the second wing shaft 657. Attachment between the piston arms and the crank arms 680, 681 is made by means of universal joints. The piston arm of the solenoid 672 on the right-hand side of the body 652 is attached to respective control arms of the third and fourth wing shafts 659, 661 in a similar manner.

Movement of the solenoid pistons results in each wing shaft 655, 657, 659, 661 being moved in two orientations. For simplicity, only the operation and movement of the first and second wing shafts 655, 657 will be described here in detail, although the same principles apply to the operation and movement of the third and fourth wing shafts 659, 661.

Firstly, it will be appreciated that backwards/forwards movement of the piston on the left-hand side of the body 652 will cause the wing shafts 655, 657 to move about the pivot screws 682, 683 in a reciprocating forwards/backwards motion, as indicated by the arrows labelled 680. Also, the force exerted by the piston on the crank arms 680, 681 will cause rotation of the wing shafts 655, 657 within their respective bearings 675, 676. Accordingly, in a single backwards stroke of the solenoid piston, the first and second wings 654, 656 will be caused to move in a forwards direction and also to rotate such that the wings are arranged at an angle of "attack". When the solenoid piston returns in a forwards stroke, the first and second wings 654, 656 will return to their original positions. As this motion repeats, the wing beat pattern of a butterfly is achieved, which can cause a lifting motion to be imparted on the body 652 if the stroke rate of the solenoids 672 is sufficient.

It will be appreciated that control of the flying device 650 can be achieved by suitably controlling, amongst other things, the stroke rate of the solenoids 672.

A further embodiment, a walking device is provided. The walking device comprises a body section and two articulated legs. The body section 1 is substantially the same as that described above, and shown in the Figures in relation to the flying device, except that the four legs 21, 23, 25, 27 of the flying device are not required, and the body section 1 is turned upside down. The two articulated legs take the place of the wings 7 described above, each leg comprising an upper and lower leg part held together by a joint. In use, the legs are positioned on a surface, e.g. the ground, and the cyclic motion of the drive arms cause movement along the ground. The return motion of the control mechanism during each cycle acts to provide extra impetus to each leg and so provides for a more efficient, walking motion. Two or more pairs of legs, together with a suitable number of drive mechanisms could also be provided on the body section. Each drive mechanism could be operated from a single motor or engine using a multilink worm drive or gear box. In this way, the device mimics a walking insect, such as a beetle.

A specific form of leg mechanism for use on a walking device will now be described with reference to FIGS. 20 to 24. A specific form of walking device will be described with reference to FIGS. 25 to 27.

FIG. 20 is a partial perspective view of the articulated wing 7 as described above with reference to FIG. 6, the operation of which is useful for understanding the operation of the leg mechanism which will be described below. Although the construction and operation of the articulated wing 7 has already been described in detail, it will be recounted that the wing includes a hinge assembly 111 which is slidably located over the drive arm 69, with first and second wing portions 7a, 7b being attached to the hinge assembly in such a way that they move relative to each other in a jointed or articulated manner. Indeed, it will be recalled that, during each cycle of the drive arm (which can be rotary or linear, depending on the form of drive mechanism used), the control rod 117 (which is driven by the control mechanism 81) moves through a predetermined path so as to cause the first and second wing portions 7a, 7b to move relative to each other in a predetermined way so as to cause aerodynamic lift.

Referring now to FIG. 21, a leg mechanism 600 is shown. The leg mechanism 600 is made up of the hinge assembly 111 described above, and, in place of a wing, a leg assembly 601. As with the articulated wing 7 shown in FIG. 6, the control rod 117 moves within a universal ball joint 91 to produce a predetermined movement on an active shaft 602. This movement is substantially a reciprocating backwards and forwards movement, as indicated by the arrow 603, although the control rod 117 does actually have some side-to-side motion. The active shaft 602 passes through a rear portion of the hinge assembly 111, generally parallel to the drive arm 69, and is connected to the leg assembly 601 by means of a clip 604.

The leg assembly 601 comprises four leg sections 601a–d which are connected to one another by three joints 602a–c. The first leg section 601a is connected to the active shaft 602 of the hinge assembly 111 by means of the clip 604. As will be appreciated, movement of the control rod 117 during each cycle of the drive arm 69 will result in a generally backwards-forwards motion of the leg assembly 601 so such as to produce a 'sweeping' motion, as indicated generally by the arrow 605. This sweeping motion can be utilised to import motion on a body by means of the leg contacting an underlying surface.

In addition to the 'sweeping' motion mentioned above, the joints 602a–c are operated so as to generate relative movement between two or more of the four leg sections 601a–d. This adds extra impetus to the overall movement during each backwards-forwards sweep of the leg assembly. Although not specifically indicated in FIG. 21, this relative movement is achieved by means of a pulley system which is connected to each of the three joints 602a–c and operated by the active shaft 602.

The principle of operation of the pulley system mentioned above is shown schematically in FIG. 22. In FIG. 22, only three leg sections 6 are shown, namely the first to third leg sections 601a–c, although the principle is easily extended to the fourth section 601d. As will be seen in FIG. 22a, a first cord 610a extends along the length of the first leg section 601a, is wrapped around the first joint 602a, continues along the length of the second leg section 601b, is wrapped around the second joint 602b, and continues along the length of the third leg section 601c whereafter it is connected to the third joint 602c. A second cord 610b is arranged in the same manner, except that the second cord extends along the opposing length of each leg section 601a–c compared to the first cord 610a, and is wrapped around each joint 602a–c in the opposite direction. In operation, it will be understood that a pulling force exerted on the second cord 610b and an opposing force exerted on the first cord 610a (the forces being indicated by the arrows thereon) will result in the articulated leg sections 601a–c moving generally downwards, as indicated by the arrow 612. FIG. 22b is similar to FIG. 22a, except that the forces exerted on the first and second cords 610a, 610b are reversed. In this case, the net result is that the leg sections 601a–c move generally upwards, as indicated by the arrow 613.

The above-described pulley system is arranged on the leg assembly 601 and operated by means of attaching free ends of the first and second cords 610a, 610b to a crank wheel 616 (not shown in FIG. 21 or 22). The principle of operation is illustrated in FIG. 23. As FIG. 23 shows, the first cord 610a is fixed to a first point A on the crank wheel 616, and the second cord 610b is fixed to a second point B on the crank wheel. The first and second cords 610a, 610b pass opposing edges of 617 of a cable tidy block 617. The centre of the crank wheel 616, indicated by the point X, denotes the point along which the longitudinal axis of the active shaft 602 passes. Accordingly, the backwards-forwards motion of the active shaft 602 results in opposing forces being exerted on the free end of the first and second cords 610a, 610b. FIG. 23a shows the crank wheel 616 at its 'neutral' point whereby there is no movement. FIG. 23b shows the crank wheel 616 when turned clockwise by the active shaft 602, this movement resulting in the first cord 610a being pulled, and an opposing force being exerted on the second cord 610b. The opposite condition exists in FIG. 23c, since the crank wheel 616 is turned in the anti-clockwise direction.

FIG. 24 shows, in greater detail, the attachment of the crank wheel 616 to the active shaft 602 of the hinge assembly 111. The active shaft 602 passes through the crank wheel 616 and into the clip 604. As is shown, the first and second cords 610a, 610b are wound around the crank wheel 616 (to which they are fixed in the manner shown in FIG. 23), pass around the cable tidy block 617, and extend to the first leg section 601a.

As will be appreciated, during each cycle of the drive arm 69, the control rod 117 moves in a predetermined manner which results in a corresponding movement of the leg assembly 601. This movement combines both the above-mentioned 'sweeping' motion caused by the simple backwards-forwards movement of the active shaft 602, and the further movement whereby the leg assembly flexes upwards and downwards due to the reciprocating clockwise-anti-clockwise motion of the crank wheel 616 which operates the pulley mechanism described above. This further movement defines a walking gait of the leg mechanism 600 and adds extra impetus to the amount of motion energy that can be transmitted to an underlying contact surface. When a plurality of such leg mechanisms 600 are employed on a walking device, the device exhibits a more efficient movement across an underlying surface.

The movement of the leg assembly 601 can be defined not only by the movement of the control rod 117, but also by the shape and size of the crank wheel 616.

FIG. 25 shows a walking device 628 employing eight separate leg assemblies, each being in the form of the leg assembly 601 described above (with obvious modifications to suit each respective leg assembly to right or left-handed operation). The walking device 628 comprises a central body section 630 which is made up of a head 632 connected to a first gearbox 634a. The first gearbox 634a is connected to a second gearbox 634b by a first shaft 635a, the second gearbox 634a being connected to a third gearbox 634c by a second shaft 635b, and the third gearbox 634c being connected to a fourth gearbox 634d by a third shaft 635c. The attachment between each shaft 635a–c and the gearboxes 634a–d is jointed such that the body section 630 has a degree of flexibility and therefore turn sideways, upwards and downwards.

The walking device 628 utilises, for driving each leg assembly 601, a drive mechanism 636 which is the same as the wing drive mechanism 250 shown and described with reference to FIG. 9. Any of the various wing drive mechanisms described above (with reference to FIGS. 5 to 19) can be adapted to drive a walking device, such as that shown in FIG. 25. A leg assembly simply replaces the articulated wing assembly.

Although the walking device 628 has eight leg assemblies connected thereon, alternative arrangements can be used. For example, interleaved leg assemblies can be used, or an odd number of assemblies can be positioned on one side of the body section 630, with an even number being positioned on the opposing side of the body.

An alternative arrangement to the body section 630 shown in FIG. 25 can involve the use of two generally parallel shafts, instead of using a single shaft interconnecting each pair of gearboxes. Of course, each gearbox would have to be adapted to receive two drive shafts and each drive shaft can be flexible to allow turning of the walking device 628.

Referring now to FIG. 26, which shows a close-up view of the second gearbox 634b, it will be seen that the gearbox is of the single shaft type, i.e. a longitudinal drive shaft made up of a number of sections is used to drive each of the first to fourth gearboxes 634a–d. Indeed, the first and second shafts 635a, 635b are shown. Referring to FIG. 27, all four gearboxes 634a–d and their interconnecting shafts 635a–c are shown. The interconnecting shafts 635a–c are of a flexible type to allow some bending movement. Also shown is a single radio-controlled drive servo 657. A servo shaft 659 is driven by the drive servo 657 in either a clockwise or anti-clockwise direction. This rotation is transmitted firstly to the third shaft 635c, and then the second and first shafts 635b, 635b. Drive arms 651, 653 of the first to fourth gearboxes 634a–d rotate in response to the rotation transmitted to the drive shafts. Thus, each gearbox 634a–d drives two leg assemblies, as indicated in FIG. 25.

Referring to FIG. 28, a rear view of the second gearbox 634b is shown. Right and left-handed leg assemblies 601, 602 are shown connected to the second gearbox 634 via respective drive mechanisms. Indeed, the left-handed leg assembly 603 described above is shown connected to the drive mechanism 636 described previously. A single channel 661 is shown in the second gearbox 634b, the channel being arranged to receive the second shaft 635b. The second gearbox 634b is arranged to drive the right and left-handed leg assemblies 602, 603 via respective angled drive shafts 69 which are bent at opposing angles. FIG. 29 is similar to FIG. 28, except that the connection between the second gearbox 634b and the drive mechanisms is by means of a respective universal joint 663. The angle at which the right and left-handed leg assemblies 602, 603 are disposed is set by connecting part of the respective drive mechanisms to some fixed part of the body at the appropriate angle. The use of a universal joint provides for easy adjustment.

Referring to FIG. 30, a close-up view of a modified second gearbox 634b' is shown. In this case, it will be seen that the gearbox 634b' is of a dual shaft type, i.e. two generally parallel and longitudinal shafts, made up of a number of sections, are used to drive each gearbox. Indeed, each of first to fourth gearboxes 634a'–d' are arranged to receive two such longitudinal shafts. Each longitudinal shaft drives only one transverse drive arm of the respective gearbox, i.e. so that in FIG. 30, a left-handed longitudinal shaft 665 drives a left-handed drive shaft 653' and a right-handed longitudinal shaft 667 drives a right-handed drive shaft 651'. Referring to FIG. 31, four modified gearboxes 634a'–d' and their interconnecting shafts (including the left and right-handed longitudinal shafts 665, 657) are shown. Also shown are two radio-controlled drive servos 671, 673, each operating in a manner described above in relation to the singe drive servo 657 shown in FIG. 27. Independent operation of the two drive servos 671, 673 means that drive shafts on the left and right-hand sides of the modified first to fourth gearboxes 634a'–d' can be driven independently. Thus, for example, it is possible to turn the drive shafts on the left-hand side (and so the drive mechanisms of the leg assemblies attached thereto) in one direction, whilst either keeping the drive shafts on the right-hand side static, or driving them slower than the rate of rotation of the left-hand side, or even in the opposite direction to achieve an overall turning motion.

Referring to FIG. 32, a rear view of the modified second gearbox 634b'is shown. Right and left-handed leg assemblies 601, 602 are shown connected to the second gearbox 634 via respective drive mechanisms. Indeed, the left-handed leg assembly 603 described above is shown connected to the drive mechanism 636 described previously. A single channel 661 is shown in the second gearbox 634b, the channel being arranged to receive the second shaft 635b. The second gearbox 634b is arranged to drive the right and left-handed leg assemblies 601, 662 via a respective universal joint 663.

Movement of the walking device 628 can be catered for by means of attaching a track system on one side of the body section 630. Track attachment means 655 are shown located on the top surface of the gearbox shown in FIGS. 26 and 30. As shown in FIG. 33 a number of flexible track sections 681a–c can be arranged between the track attachment means' of each gearbox 634a'–d'. Further first and second servos (not shown) can be connected to the front track section so as to invoke an initial left/right or up/down movement of the first shaft 635a in the appropriate direction. In a similar way to the turning motion of coupled units of a train, the subsequent shafts of the body section 630 will also turn and the walking device can therefore move over and around obstacles.

FIG. 34 shows two adjacent leg assemblies 601 (as described above) and their respective first and second cords 610a, 610b which control part of their movement, as also mentioned above.

FIG. 35 shows a further walking device 630 employing a plurality of leg assemblies 601, this further device employing a different body section 632. In this case, the body section 632 is made up of separate sectioned parts 632a which are detachable from one another in response to a remote control signal. Thus, the walking device 630 is useful in hazardous situations where it is desirable to avoid human intervention. For example, the walking device 630 can be used to detect landmines, for example, by remotely operating the device and causing it to walk towards a suspected landmine. A camera can be fitted to the walking device 630 and the images derived therefrom can be remotely analysed. In the event that a landmine is suspected, one of the sectioned parts 632a can be detached from the remainder of the body section 632 so that the detached part is situated on, or is close to, the landmine. The walking device can then walk away from the landmine. The separated body section may include a small explosive charge that can then be remotely detonated thereby to enable safe disposal of the landmine.

Given the ability of the mechanism to simulate the operation of a wing beat or leg movement of an insect, the drive mechanism may be referred to as a "thorax digit emulator".

Additional components could be added to the body section 1, such as cameras or recording devices, such that the flying or walking device can be moved to inaccessible areas or terrain, whereafter images or sound can be recorded.

A further flying device will now be briefly described. The flying device is similar to that described previously with reference to FIGS. 1 to 9. The flying device is arranged to mimic the flying action of a wasp and comprises an active wing, a control mechanism, and motor.

There may be provided a front race gear fixed in position without a fixing screw and having a tuning fork. The race gear may have nineteen teeth. When the tuning fork is in position, the tuning fork allows the mechanism to be cranked by hand for tuning purposes. A motor can be provided with a no-load speed of 14,000 rpm. The mechanism may be overpowered and so can use just one-third of the motor's full output to enable optimum lift and performance. The mechanism can be directly driven by means of replacing the motor and a gear assembly with a simple motor or model engine having extended shafts at both ends that can be used as wing shafts. Left-handed and right-handed drive mechanisms can be directly driven by separate motors with an electronic synchronous control. This will permit a great deal of agility and manipulation, similar to that exhibited by insects like the damsel fly or the goliath beetle. The flying device could also be powered by a model aircraft glow plug engine. The motor speed can be controlled by a third radio channel via a micro rc speed controller.

The wing drive mechanism may be installed on a gear assembly with the above-mentioned tuning fork inserted with the race gear. The gear assembly can consist of a brass plate bent around a 12 mm brass tube that acts as a bearing housing for the wing shaft. Four millimetre brass tube forms the mount for a race gear at the front. The mounting plate is drilled to fit the mounting screw holes and the driveshaft on the motor. The whole gear assembly is put into a jig and welded with soft solder. The gear housing is secured to the motor by standard mounting screws.

The motor can be bolted to a gear assembly frame together with the main drive gear. The gear assembly frame serves to mount each wing shaft and to provide a clockwise rotational force onto it. An installed drive shaft can be held in position with two 12 mm flange bearings having a 4 mm bore. The shaft is free to rotate, only supported by the bearings. One flange bearing is provided on either side of the gear assembly frame. The main drive gear is connected directly to the motor driveshaft by grubscrews. An identical race gear is put on the 4 mm tube protruding from the front of the gear assembly, this gear being free moving. The drive shaft comprises a 2 mm diameter steel wire having sections of brass tubing welded over it, each section of brass tubing having various lengths and widths. At a point along the drive shaft, each end of the shaft is bent symmetrically, in this case at 40°, allowing space for gears and bearings to be placed over the shaft. The race gear is mounted at the front of the gear assembly frame. A main wing shaft gear can be directly welded to the wing shaft. Intersecting with the main wing shaft an identical wing shaft race gear is provided on the other side of the wing shaft, serving to balance the gear assembly. With the aid of washers and a 4 mm bore clip for securing the race gear, the gear assembly can be oiled and tested at maximum power. The wing shaft drive gear may be welded directly to the wing shaft at the point of equilibrium. This is to allow other mechanisms to fit equally on both sides of the wing shaft. An identical gear is positioned on the other side and is free moving so as to balance the gear assembly. At this point, a locking washer can be used to secure the floating gears so the motor can be operated to test the balance of the gear assembly. The wing shaft can run only in a clockwise direction in order for the mechanism to operate.

An anchor mechanism can be provided which forms part of the drive mechanism for the flying device. An anchor component is mounted on a 19 mm diameter bearing having an 8 mm bore which is mounted to the drive shaft gears. As the name suggests, the anchor is kept in a stationary position by a coupling and damper assembly which is connected to a lower arm of the anchor. The wing shaft gears and the wing shaft are free to rotate. The anchor component's upper arm includes a linear muscle arm coupling, muscle spring adjustment screw, and return angle adjustment screw. The anchor is held in position and can be manipulated forwards or backwards around the wing shaft by control servos. This allows adjustment of the position of the linear muscle anchor points which enables steering of the overall mechanism. The muscle component can comprise a 12 mm flange bearing having a 4 mm bore, a wing coupling ball joint, and a linear muscle arm. The linear muscle bearing assembly can be installed on a wing shaft next to the anchor bearing assembly. The linear muscle bearing is free to move around the wing shaft, and is restricted by the linear muscle arm and the return angle adjustment screw. The linear muscle bearing is held in the rest position by the spring. The linear muscle and wing shaft serve to guide the angle and change the shape of the active wing during each rotation.

A cam component can be provided for a control mechanism part of the above-mentioned wing drive mechanism, which can be a spring-loaded cam. The cam is installed on a shaft over the linear muscle bearing, and is secured to the wing shaft by a cam bolt. The cam rotates in an anti-clockwise manner. As the cam strikes the linear muscle, it forces it to rotate around the drive shaft until the linear muscle is fully extended or is stopped by an adjustment screw. When the cam is shown the linear muscle is able to return to its original position. This cycle is repeated up to and over 20 times per second. In summary, the cam is fitted to the wing shaft after the linear muscle bearing, and is secured to the shaft by the cam screw. The cam serves to secure the linear muscle and anchor bearings in place on the wing shaft. The cam also pushes the linear muscle around the wing shaft to the point where the linear muscle arms are fully extended. The wing shaft and cam move in a constant clockwise motion and cause the cam to release the linear muscle bearing so as to quickly return it to its rest position. At this stage, the mechanism can be tuned, powered-up, and tested for speed and balance. Wing arm angle, spring strength, return angle, and down-stroke length can be tuned according to the desired species, or tuned for maximum efficiency.

An active wing can be provided for being positioned on the drive mechanism. The active wing may be in the classic aerofoil shape. The active wing can be in a negative aerofoil shape, after the linear muscle has returned to its rest position. The active wing can also be in a neutral position. This occurs only in transition from the negative aerofoil shape to the positive aerofoil shape. A wing stub of the wing shaft and an active wing coupling can be provided. The wing stub consists of a one-piece wire frame which is furnished and reinforced with brass tubing and solder. Extension rods comprising carbon fibre rods that are strong, flexible, and lightweight are bonded to the wing stub by resin and carbon fibre thread. The active wing can be installed on the shaft and the active wing coupling connected to a linear muscle ball joint bearing. The wing can be kept in place on the wing shaft by appropriately sized spacers located either side of the wing bearing. The position of the wing on the wing arm is crucial to the final shape and angle of the wings during operation.

In one cycle of the active wings operation, the wing shape and position changes and the linear muscle is able to return to its rest position by the return spring. The wing shape adopts a negative aerofoil shape, prior to returning rapidly to the classic aerofoil shape. The cam releases the linear muscle which quickly returns to the rest position causing the wing to rotate on the wing shaft. For a split second the wing assumes a negative aerofoil shape due to the angle of the wing shaft and the active wing coupling. This movement produces a powerful upwards force to the rear half of the mechanism which can be balanced by addressing the strength of the linear muscle spring. This balances the horizontal hold of the mechanism wing in a classic aerofoil shape at the start of the up-stroke.

There may be provided a control mechanism developed to control the above-mentioned flying device. The control mechanism operates by manipulating the lower anchor arm of the anchor component, differentially for left and right movement and together for backwards and forwards movement, or a combination of both forms of movement.

A miniature electronic linear motor or piezo actuator can replace the linear muscle arm component that manipulates the linear muscle bearing, eliminating the need for a return spring. This can dramatically reduce the load on the main drive motor thus increasing speed and efficiency, possibly by up to 100%. It would also eliminate the need for control servos as the electronic linear motors or piezo actuator stroke length and power can be directly controlled via a micro receiver.

The flying or walking devices described above may be used for anything from personal transportation, as an autonomous courier, a miniature spy or surveillance drone, with the aid of existing technology. The devices can be modified to take a side fin component instead of a wing, e.g. for use in manned or autonomous submersible, or for being strapped to a diver's back to provide propulsion.

The individual components that make up the drive mechanisms (e.g. the anchor, linear muscle and cam) can be modified to take up any position order or place on the wing shaft, and not necessarily in the order illustrated.

The invention claimed is:

1. Drive assembly comprising an articulated member having first and second portions arranged such that the portions move relative to each other, and a drive mechanism for imparting motion to the articulated member, the drive mechanism comprising: a drive member for imparting a cyclic motion on the articulated member; and a control member for controlling, in a predetermined manner, the relative position of the first and second portions during each cycle of the cyclic motion of the articulated member, wherein the drive mechanism is arranged such that, during each cycle of the articulated member, the control member operates on the articulated member in two phases, the control member moving in a first direction during the first phase, and in a second, generally opposite direction, during the second phase, wherein the drive mechanism is arranged such that, during the first phase of operation of the control member, the drive member is engaged with the control member such that the drive member moves in generally the same direction as the control member, wherein the drive mechanism is arranged such that, at the beginning of the second phase of operation of the control member, the control member becomes disengaged from the drive member and thereby returns in the second, generally opposite, direction.

2. An assembly according to claim 1, wherein the drive mechanism further comprises an elastic member arranged such that, during the first phase of operation of the control member, the elastic member becomes tensioned due to the motion of the control member, the elastic member thereafter causing the control member to return in the generally opposite direction at the beginning of the second phase of operation of the control member.

3. An assembly according to claim 2, wherein the elastic member comprises a coil spring.

4. An assembly according to claim 1, wherein the drive mechanism is arranged such that the drive member follows a generally rotary, preferably circular cyclic motion.

5. An assembly according to claim 1, wherein the drive member is engaged with the first portion of the articulated member.

6. An assembly according to claim 5, wherein the drive member is movably engaged with the first portion of the articulated member such that the first portion can move about the axis of the drive arm in a predetermined manner during each cycle of the cyclic motion of the drive member.

7. An assembly according to claim 1, wherein the articulated member forms an articulated wing, the first and second portions each comprising a frame within which is defined a web, whereby the apparatus is arranged to provide lift.

8. An assembly according to claim 7, wherein each web comprises a lightweight plastics material which is secured to the frame.

9. An assembly according to claim 1, wherein the articulated member forms an articulated leg, the first and second portions moving relative to each other so as to impart movement of the apparatus over any surface in contact with the leg.

10. A moveable device comprising at least one assembly according to claim 1; and a motor for imparting motion into the drive member of the drive mechanism of the assembly.

11. A moveable device according to claim 10, further comprising a control system for varying, at least, the speed of the motor.

12. Drive assembly comprising: an articulated member having first and second portions arranged such that the portions move relative to each other, and a drive mechanism for imparting motion on the articulated member, the drive mechanism comprising:
   (a) drive means for imparting a cyclic motion on the articulated member, each cycle comprising four phases, and
   (b) return means, wherein the articulated member, the drive means and the return means are arranged such that:

in the first phase of movement, the drive means imparts a cyclic motion on the articulated member, in a first sense, whilst the first and second portions of the articulated member are maintained substantially in a first orientation with respect to each other;

in the second phase of movement, the drive means engages and moves the return means, in the first sense, against a resisting force of the return means;

in the third phase of movement, the drive means disengages the return means which due to the resisting force, returns to its previous state, thereby causing:

(a) the articulated member to be moved in a contrary sense, and (b) the first and second portions of the articulated member to be arranged substantially in a second orientation with respect to each other; and in the fourth phase of movement, the cyclic motion returns the first and second portions of the articulated member back to the first orientation;

wherein the drive means comprises a longitudinal arm defining an arm axis, the articulated member being attached to the arm by means of a sleeved portion such that the articulated member may rotate about the arm axis during each cycle.

13. An assembly according to claim 12, wherein the return means comprises a moveable abutment surface attached to an elastic member fixed to a non-moving part of the assembly, the drive means engaging and moving the abutment surface during the second phase of movement thereby to cause the elastic member to become tensioned, the elastic member thereafter returning the abutment surface back to its original position when the drive means is disengaged from the abutment surface.

14. An assembly according to claim 13, wherein the return means further comprises a universal joint, and the second portion of the articulated member comprises a spar extending from the second portion and having a free end which is slidably located in the universal joint.

15. An assembly according to claim 12, wherein the sleeved portion attachment between the articulated member and the arm is arranged such that the articulated member may slidably move along the arm axis during each cycle.

16. An assembly according to claim 12, wherein the drive means further comprises a cam arranged to engage and move the abutment surface during the second phase of movement.

17. An assembly according to claim 12, wherein the articulated member comprises an articulated wing, the first and second portions each comprising a frame within which is defined a web, whereby the assembly is arranged to provide lift.

18. An assembly according to claim 12, wherein the articulated member comprises an articulated leg assembly, the first and second portions moving 25 relative to each other so as to impart movement of the assembly over a surface in contact with the leg.

19. A flying device comprising two assemblies each according to claim 17, each assembly being mounted substantially symmetrically about a longitudinal axis of the device.

20. A flying device according to claim 19, further comprising a motor for driving the two drive means; and a control system for controlling the speed of the motor.

21. A flying device according to claim 20, wherein the generally opposite articulated wings are arranged such that their orientation with respect to each other can be varied under the control of the control system.

22. A flying device according to claim 20 wherein the control system is operated by means of a remote wireless link.

* * * * *